(12) United States Patent
Iizumi et al.

(10) Patent No.: US 10,620,384 B2
(45) Date of Patent: Apr. 14, 2020

(54) ADJUSTABLE POLARITY FIBER OPTIC CONNECTOR ASSEMBLIES WITH PUSH-PULL TABS

(71) Applicant: SENKO Advanced Components, Inc., Marlborough, MA (US)

(72) Inventors: Kenji Iizumi, Tokyo (JP); Kazuyoshi Takano, Southborough, MA (US); Man Ming Ho, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/178,043

(22) Filed: Nov. 1, 2018

(65) Prior Publication Data

US 2019/0219775 A1    Jul. 18, 2019

Related U.S. Application Data

(63) Continuation-in-part of application No. 15/819,629, filed on Nov. 21, 2017.

(60) Provisional application No. 62/691,463, filed on Jun. 28, 2018, provisional application No. 62/511,303, filed on May 25, 2017.

(51) Int. Cl.
   *G02B 6/38* (2006.01)

(52) U.S. Cl.
   CPC ......... *G02B 6/3831* (2013.01); *G02B 6/3857* (2013.01); *G02B 6/3893* (2013.01); *G02B 6/3821* (2013.01); *G02B 6/3825* (2013.01); *G02B 6/3885* (2013.01)

(58) Field of Classification Search
   CPC .......................... G02B 6/3879; G02B 6/3826
   See application file for complete search history.

(56) References Cited

U.S. PATENT DOCUMENTS

| | | | |
|---|---|---|---|
| 6,017,153 A | 1/2000 | Carlisle et al. |
| 6,174,190 B1 | 1/2001 | Tharp et al. |
| 6,364,537 B1 | 4/2002 | Maynard |
| 6,783,280 B2 | 8/2004 | Viklund |
| 6,863,556 B2 | 3/2005 | Viklund et al. |
| 7,297,013 B2 | 11/2007 | Caveney et al. |
| 7,588,373 B1 | 9/2009 | Sato et al. |
| 7,959,455 B1 | 7/2011 | Armstrong et al. |
| 8,152,385 B2 | 4/2012 | De Jong et al. |
| 8,221,007 B2 | 7/2012 | Peterhans et al. |
| 8,727,638 B2 | 5/2014 | Lee et al. |
| 8,864,390 B2 | 10/2014 | Chen et al. |
| 9,448,370 B2 | 9/2016 | Xue et al. |
| 9,465,172 B2 | 10/2016 | Shih |

(Continued)

FOREIGN PATENT DOCUMENTS

DE    202009019167 U1    7/2017

*Primary Examiner* — Ellen E Kim
(74) *Attorney, Agent, or Firm* — Edward S. Jarmolowicz, Esq.

(57) ABSTRACT

A fiber optic connector with a rotatable connection member for converting the connector from a first polarity to a second polarity, and a manipulator assembly comprising a tab member and a locking member movable between a locked position and an unlocked position, the manipulator assembly being coupled to the connection member such that the manipulator assembly and the connection member rotate conjointly about the axis of rotation, and when in locked position connector polarity cannot be changed.

20 Claims, 64 Drawing Sheets

(56) References Cited

U.S. PATENT DOCUMENTS

| | | | |
|---|---|---|---|
| 9,971,102 B2* | 5/2018 | Raven | G02B 6/3893 |
| 10,120,140 B2 | 11/2018 | Goldstein et al. | |
| 2005/0213891 A1 | 9/2005 | Hardcastle et al. | |
| 2013/0163934 A1 | 6/2013 | Lee et al. | |
| 2014/0169727 A1 | 6/2014 | Veatch et al. | |
| 2016/0216458 A1 | 7/2016 | Shih | |
| 2016/0327757 A1 | 11/2016 | Lee | |
| 2016/0349458 A1* | 12/2016 | Murray | G02B 6/3825 |

* cited by examiner

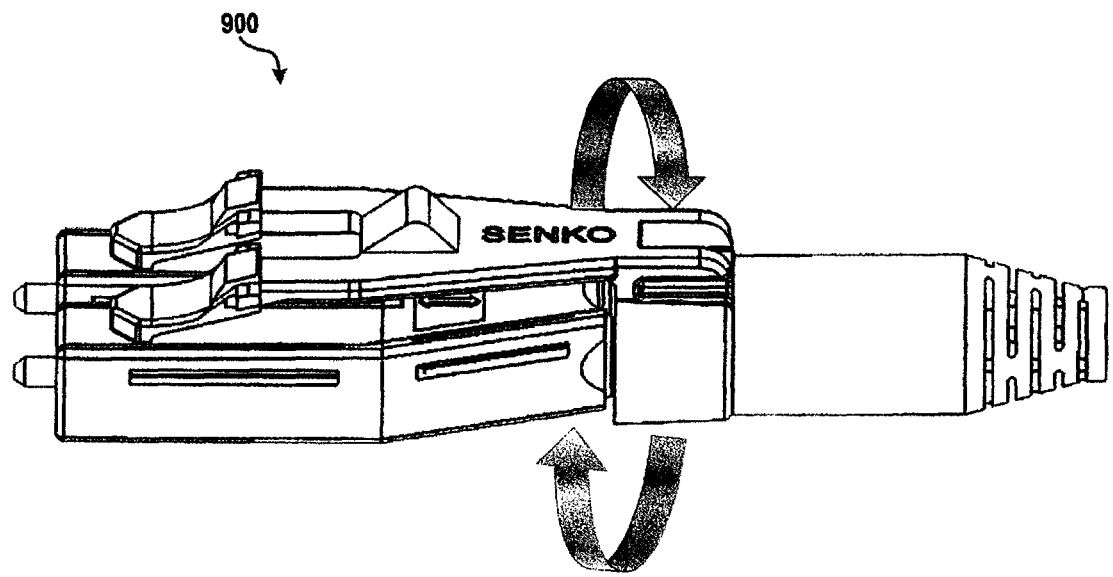
FIG. 9A
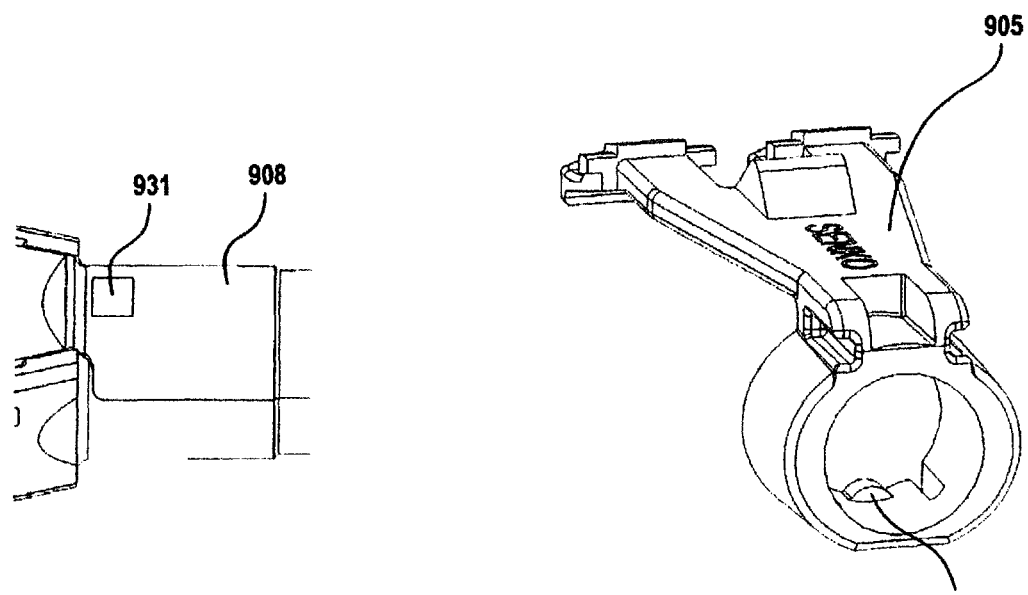
FIG. 9B
FIG. 9C

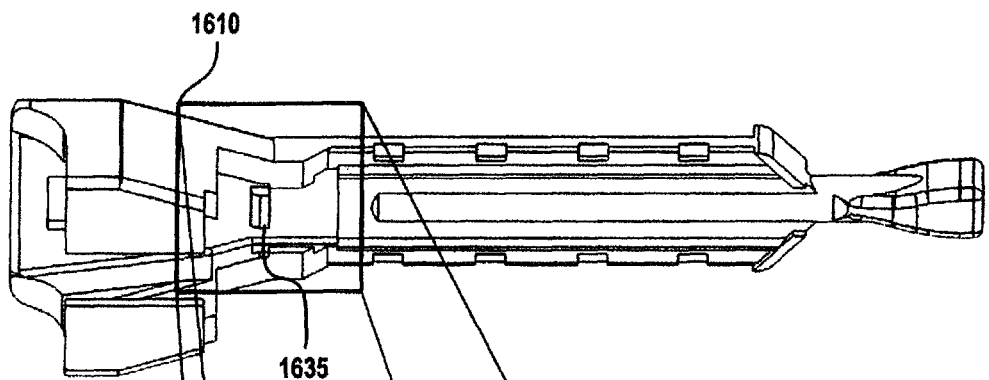
FIG. 16A
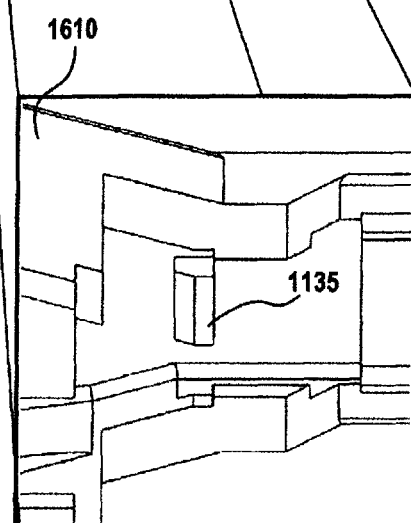
FIG. 16A.1
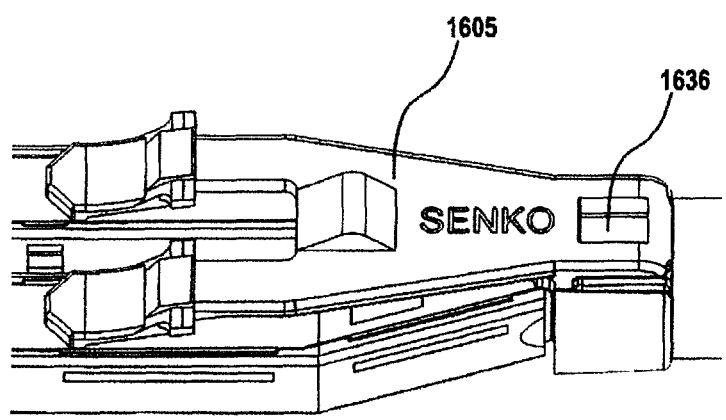
FIG. 16B

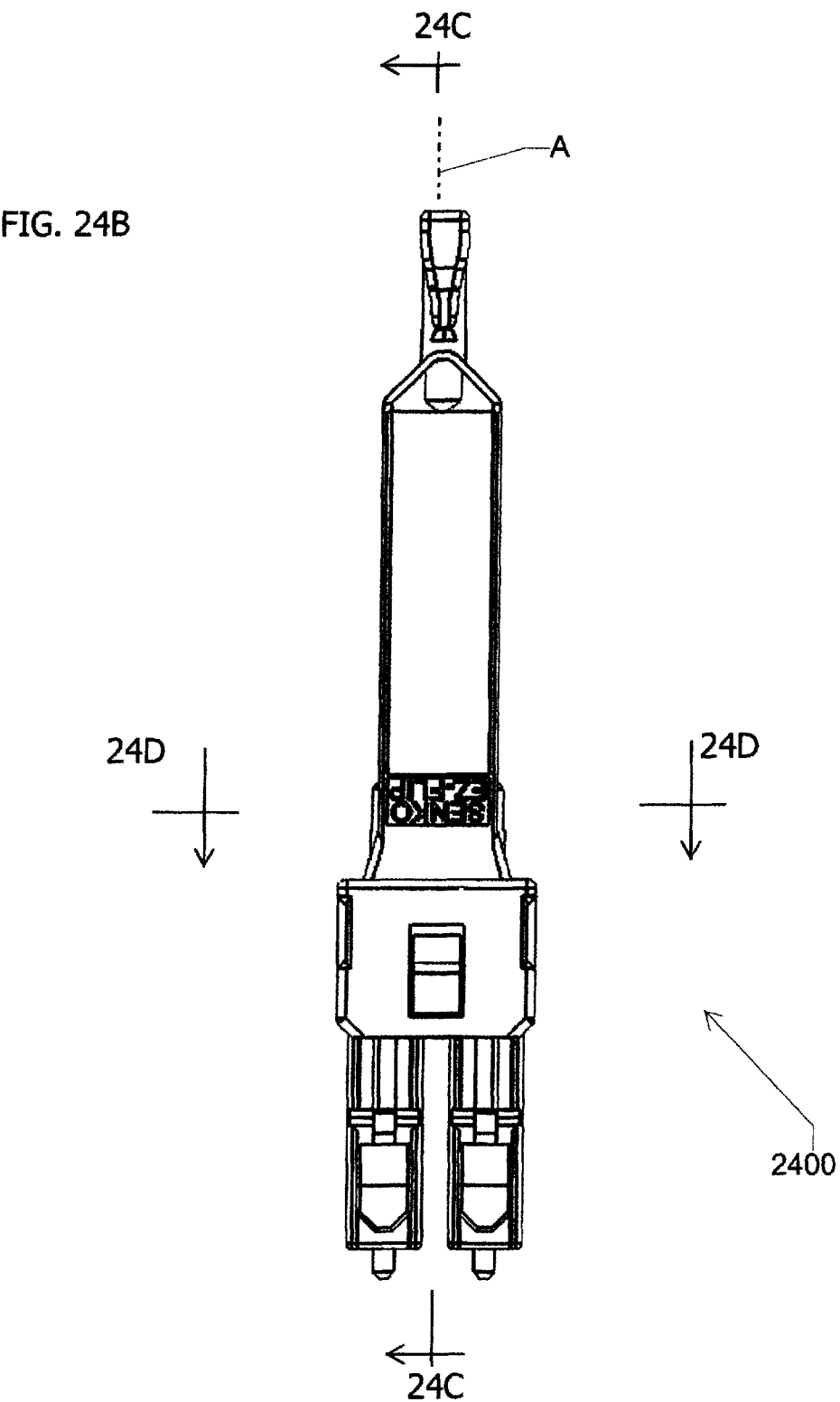

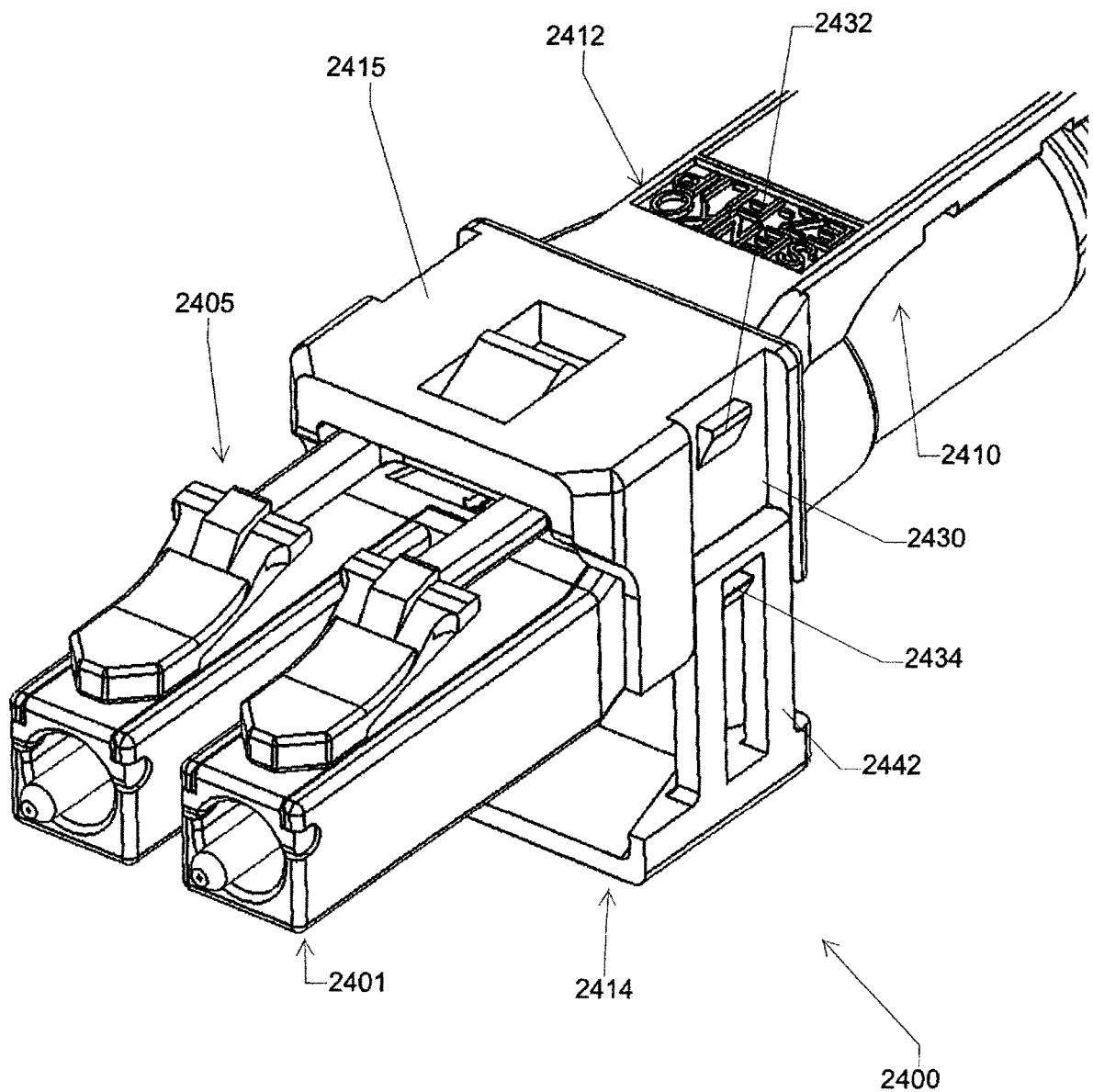

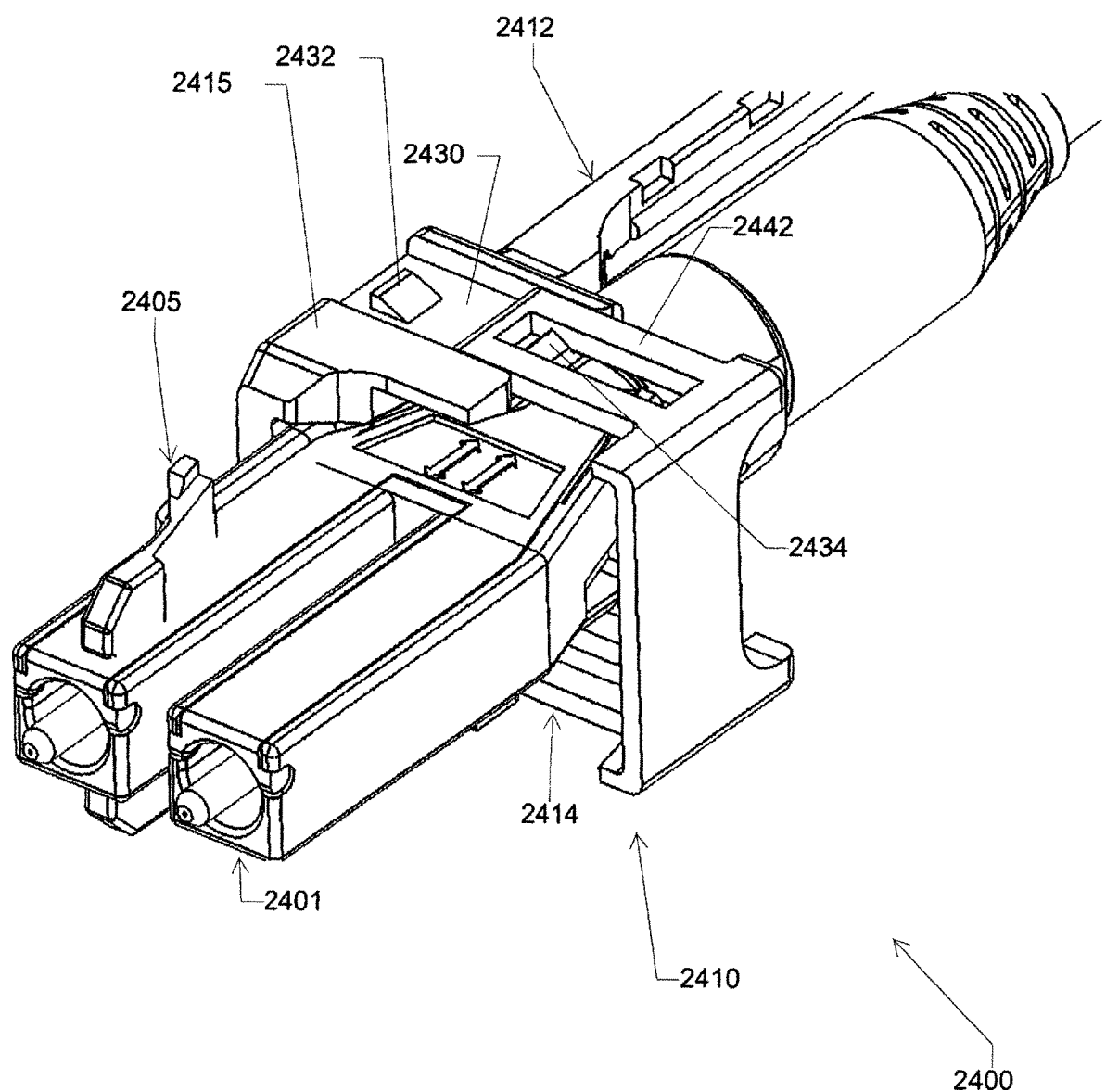

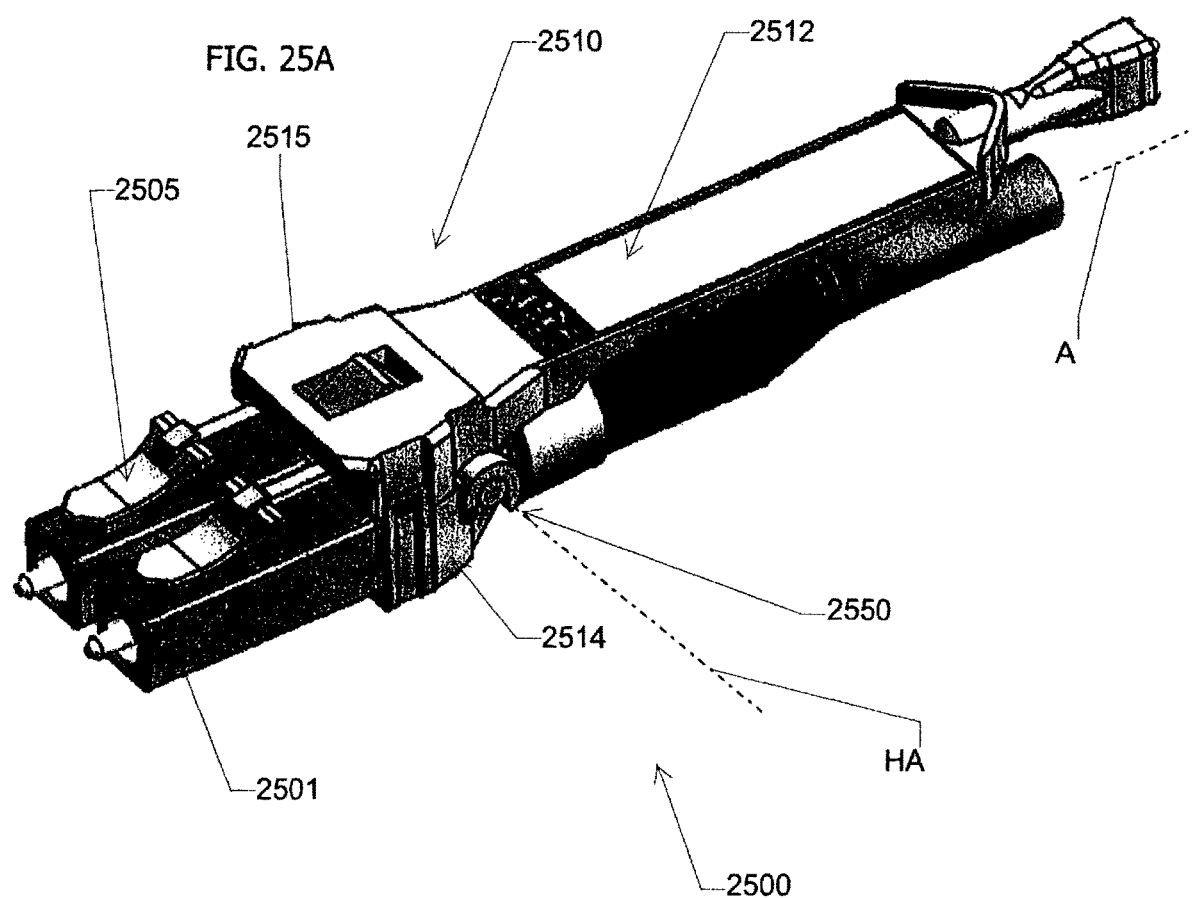

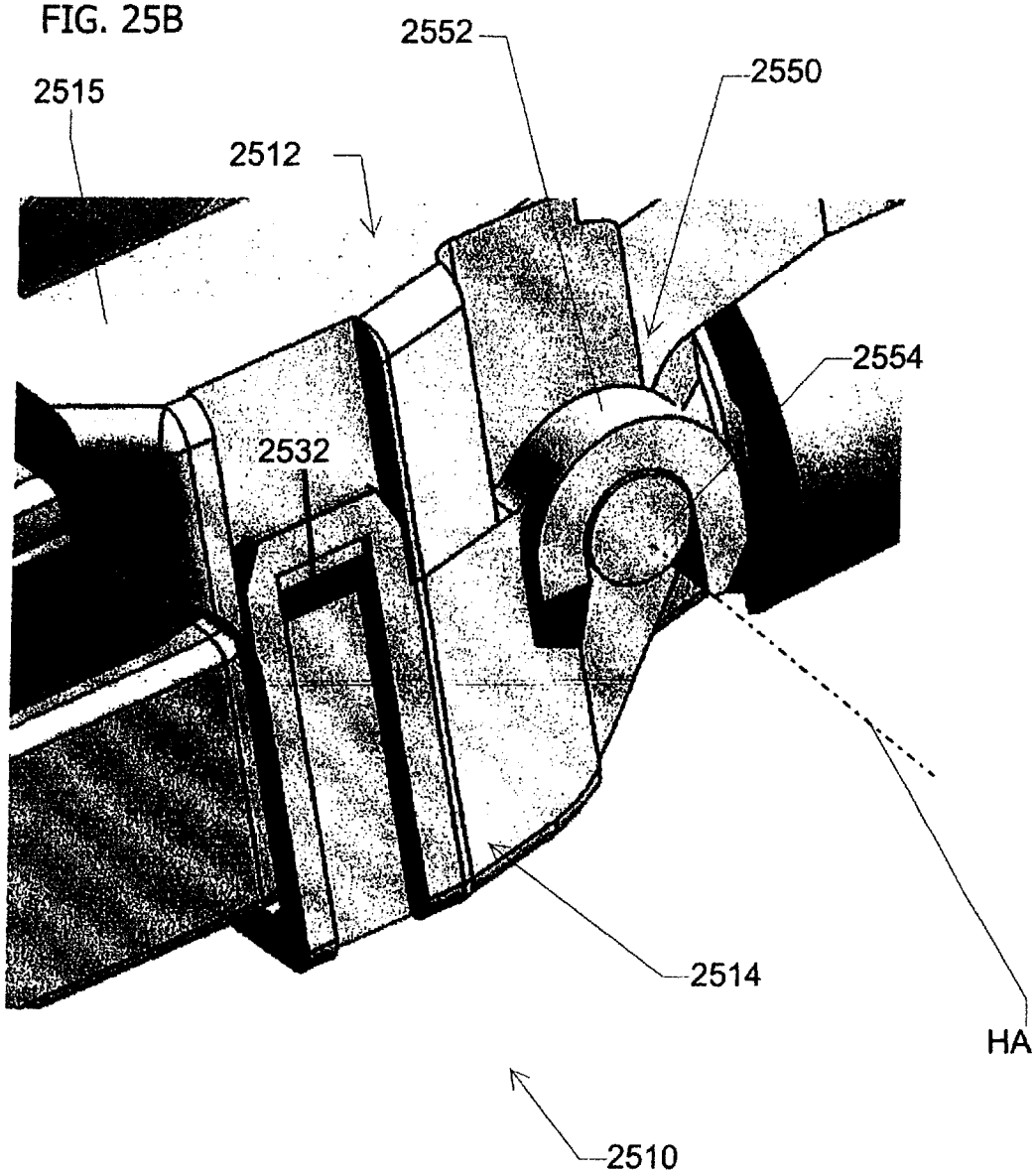

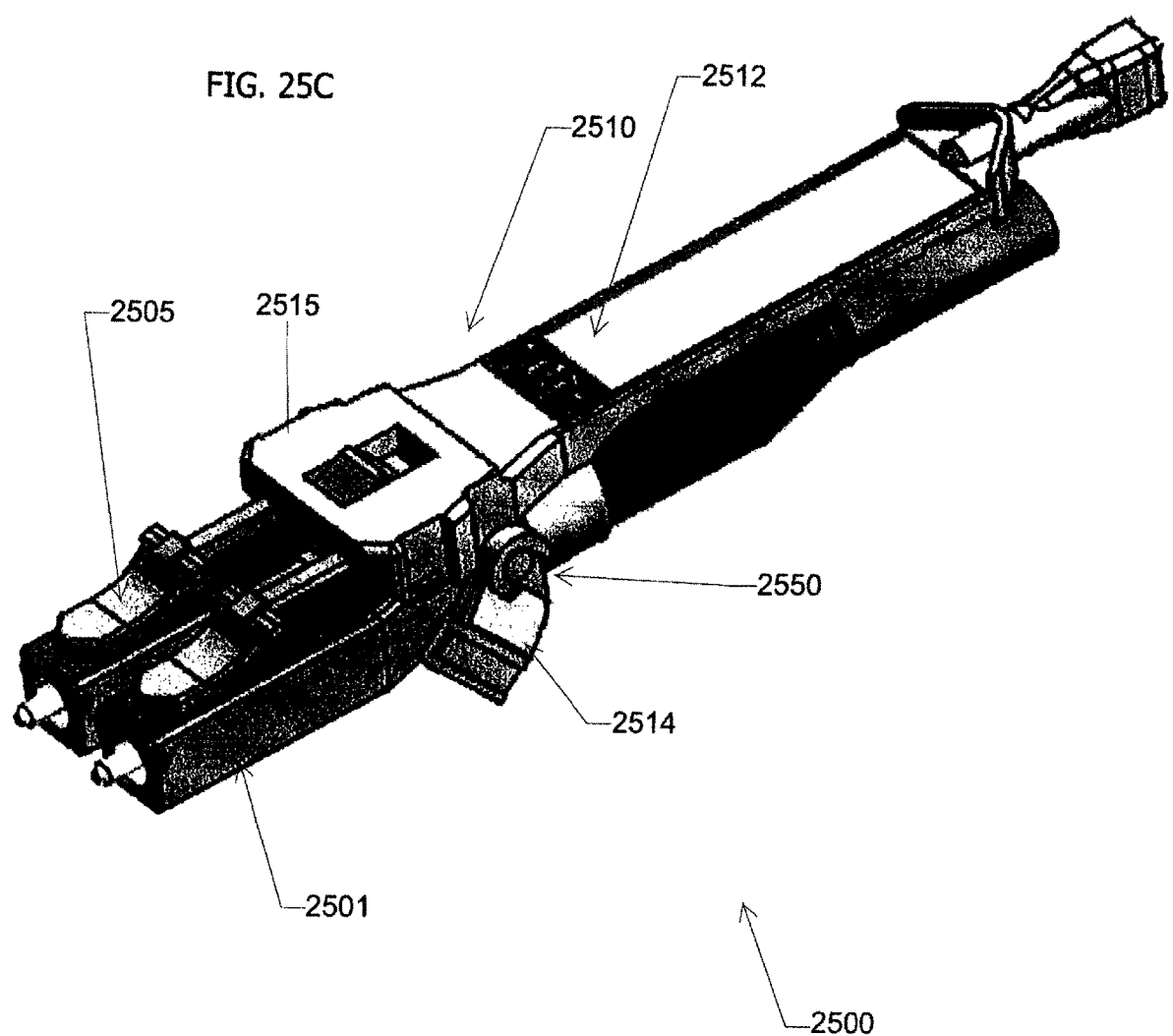

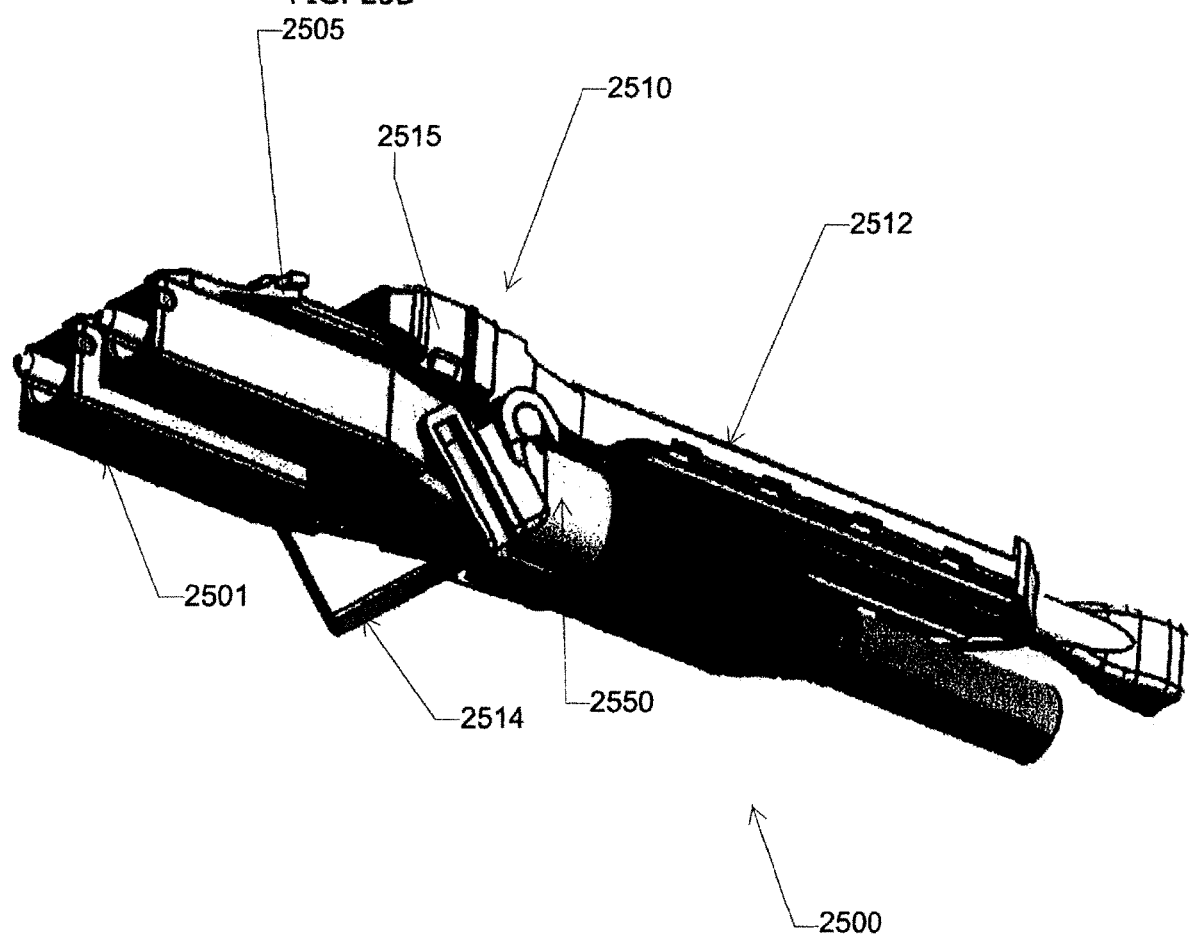

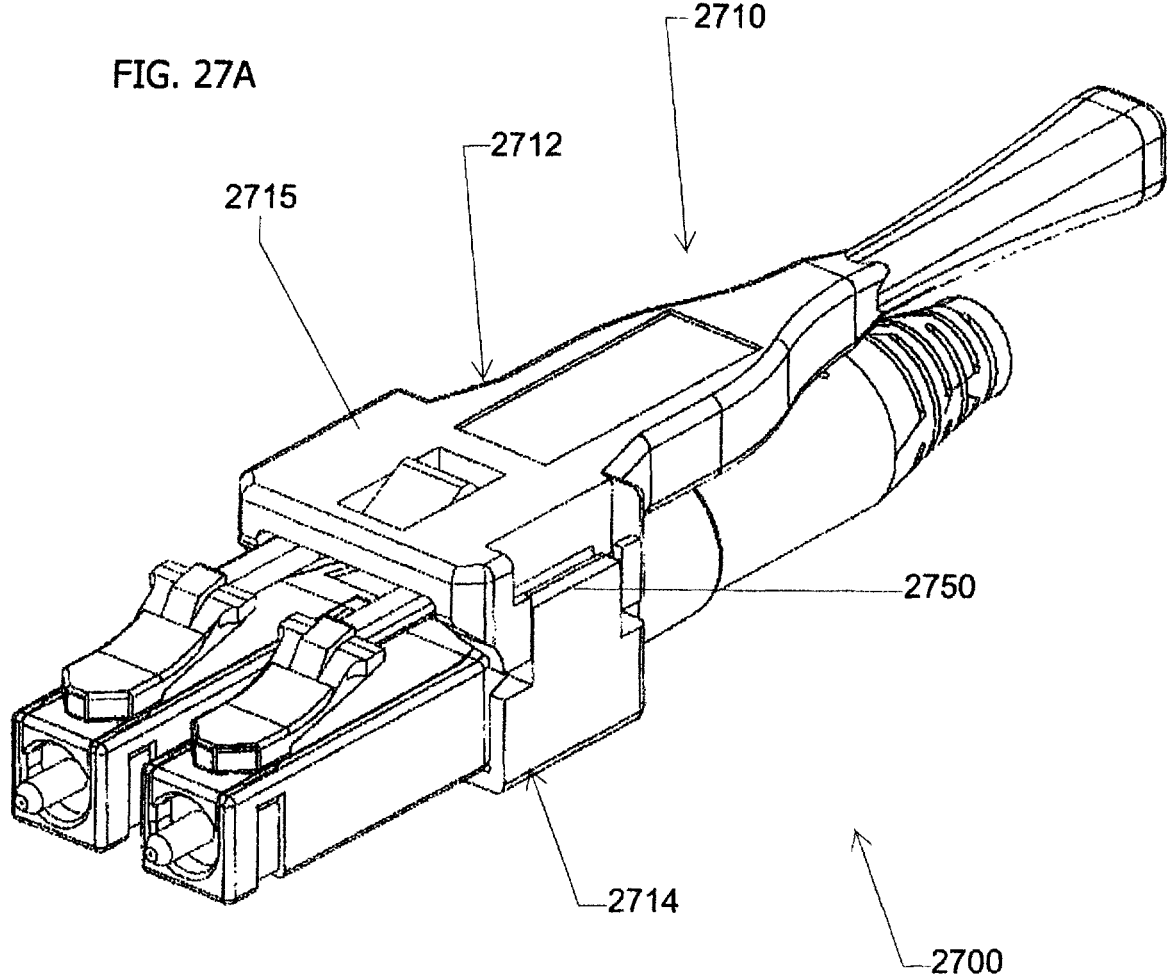

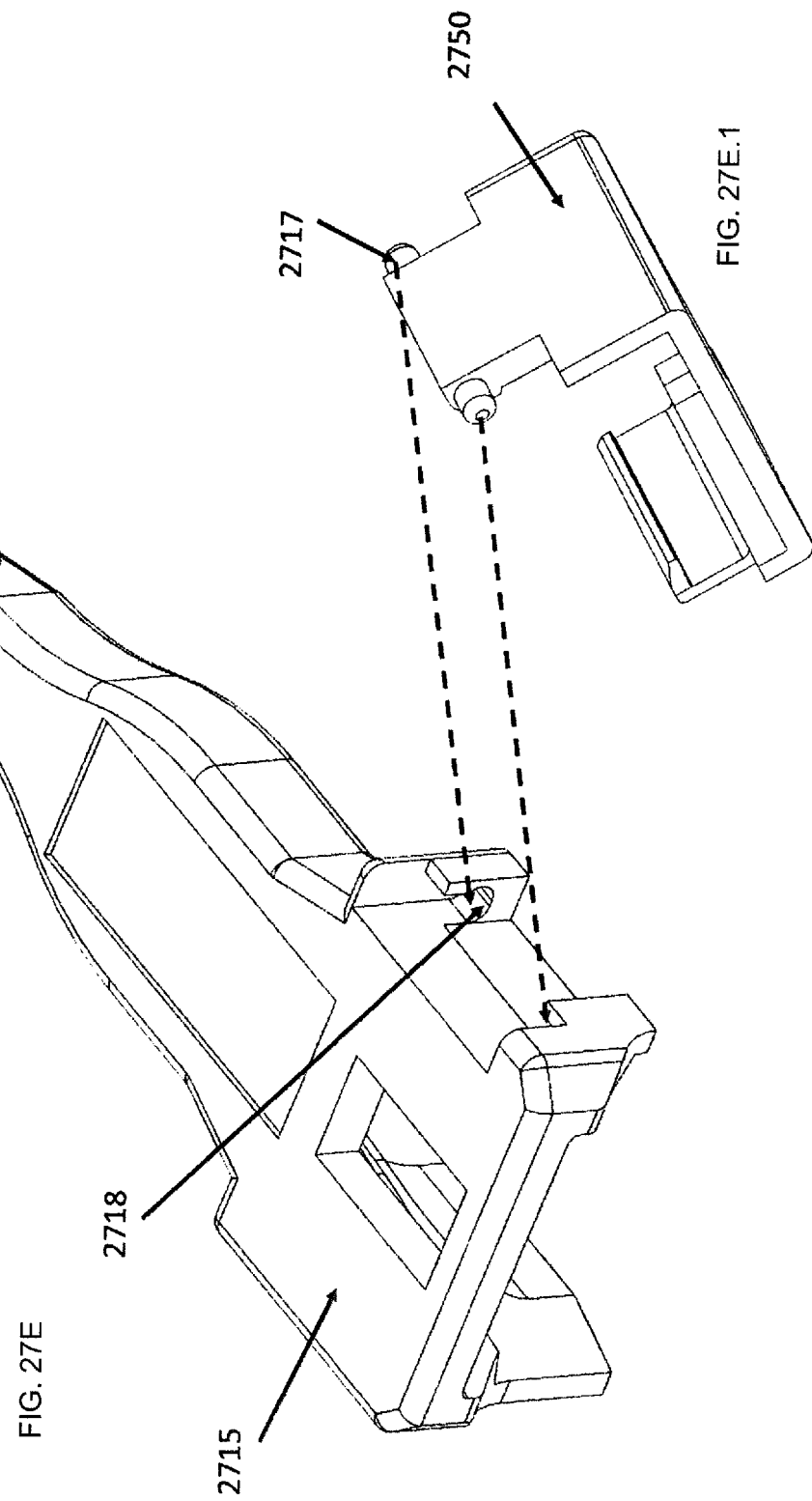

ADJUSTABLE POLARITY FIBER OPTIC CONNECTOR ASSEMBLIES WITH PUSH-PULL TABS

CROSS REFERENCE TO RELATED APPLICATIONS

The present application is a CIP of U.S. patent application Ser. No. 15/819,629, filed Nov. 21, 2017, and entitled "Adjustable Polarity Fiber Optic Connector Assemblies with Push-Pull Tabs," which claims priority to U.S. Provisional Patent Application 62/511,303 filed May 25, 2017, and entitled, "CLIP ON PUSH/PULL TAB", and the present application further claims priority to U.S. Provisional Patent Application 62/691,463 filed Jun. 28, 2018, and entitled "Adjustable Polarity Fiber Optic Connector Assemblies with Push-Pull Tabs".

BACKGROUND OF THE INVENTION

The present disclosure relates generally to fiber optic connectors. The prevalence of the Internet has led to unprecedented growth in communication networks. Consumer demand for service and increased competition has caused network providers to continuously find ways to improve quality of service while reducing cost. Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

Accordingly, there is a need for fiber optic connectors that will meet the needs of future developments allowing fir smaller footprints, easier implementation, and easy field modification.

BRIEF SUMMARY OF THE INVENTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

BRIEF DESCRIPTION OF THE SEVERAL VIEWS OF THE DRAWING

The above and other objects of the present invention will become more readily apparent from the following detailed description taken in connection with the accompanying drawings.

FIG. 9A depicts a potential polarity change of the connector assembly according to an embodiment.

FIG. 9B depicts a recess on the housing of the connector assembly according to an embodiment.

FIG. 9C depicts a protrusion on the latching component according to an embodiment.

FIG. 16A depicts a detailed view of a small recess on the push-pull tab according to an embodiment.

FIG. 16A.1 depicts zoomed view of FIG. 16A.

FIG. 16B depicts a perspective view of the top of the latching component according to an embodiment.

FIG. 24B is a top plan view of the optical fiber connector of FIG. 24A;

FIG. 24J is an enlarged fragmentary perspective of front end portion of the optical fiber connector of FIG. 24A illustrating the manipulator assembly in an unlocked configuration at a first polarity orientation;

FIG. 24K is an enlarged fragmentary perspective similar to FIG. 24J illustrating the manipulator assembly in an orientation between the first polarity orientation and a second polarity orientation;

FIG. 25A is a perspective of another embodiment of an optical fiber connector;

FIG. 25B is an enlarged fragmentary perspective of a portion of the optical fiber connector of FIG. 25A illustrating a side of a manipulator assembly thereof in a locked configuration;

FIG. 25C is a perspective of the optical fiber connector of FIG. 25A illustrating the manipulator assembly in an unlocked configuration;

FIG. 25D is another perspective of the optical fiber connector of FIG. 25A illustrating the manipulator assembly in the unlocked configuration;

FIG. 27A is a perspective of another embodiment of an optical fiber connector illustrating a manipulator assembly thereof in a locked configuration;

FIG. 27E is a perspective view of proximal end of manipulator assembly with recesses for accept side hinge of FIG. 27E.1;

FIG. 27E.1 is a perspective view of side hinge;

Corresponding reference characters indicate corresponding parts throughout the several views of the drawings.

DETAILED DESCRIPTION OF THE INVENTION

Figure 1:
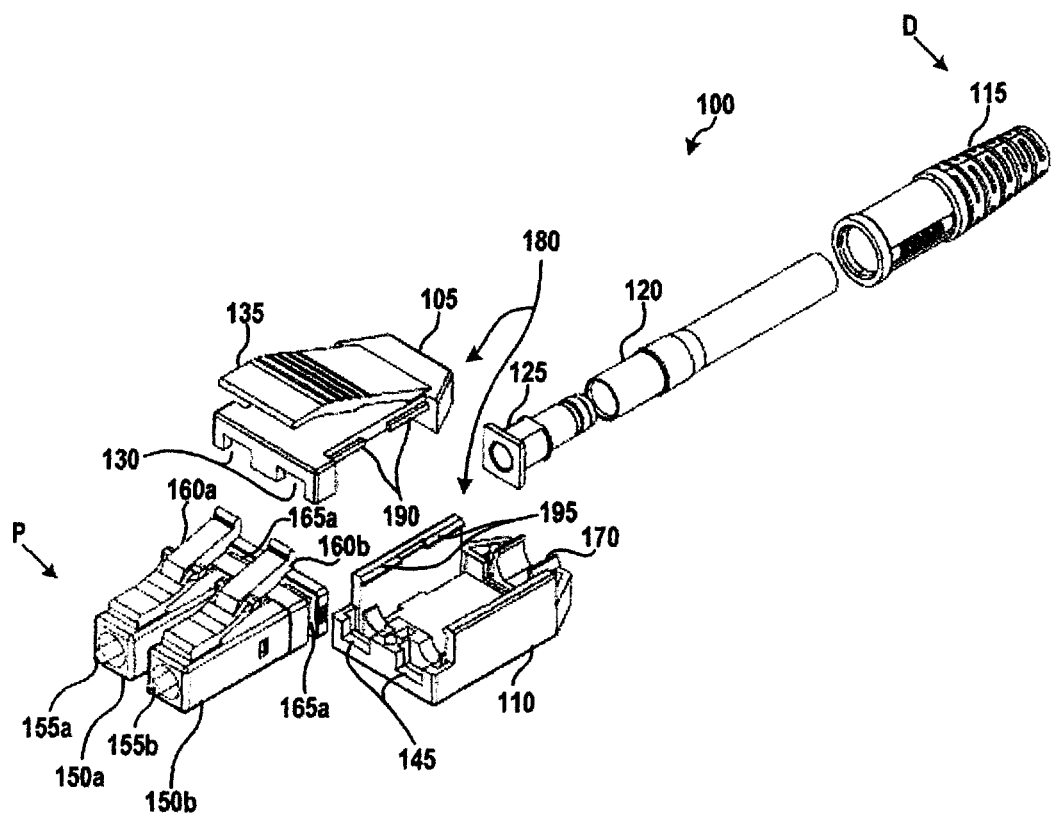
FIG. 1 depicts an exploded view of a connector assembly according to an embodiment.

The reliability of communication infrastructure depends on secure and accurate connections between components, such as cable segments, network equipment, and communication devices. Large-scale data communication systems use fiber optic cables for data transmission between components. The fiber optic cables may be terminated by connector assemblies. Duplex connector assemblies, such as an LC connector assembly, may include a receiving optical fiber (typically labeled as "A") and a transmitting optical fiber (typically labeled as "B"). Such duplex connector assemblies may connect with an adapter having corresponding receiving (or "A") and transmitting ("B") ports. A duplex connector assembly is generally configured such that the receiving optical fiber connects with the transmitting port of the adapter and the transmitting optical fiber connects with the receiving port of the adapter.

A duplex connector assembly has a polarity based on the relative orientation of the receiving optical fiber and the transmitting optical fiber. Similarly, a corresponding adapter may have a polarity based on the relative orientation of the receiving port and the transmitting port. If the polarity of the connector assembly corresponds to the polarity of the adapter, the connection between the connector assembly and the adapter may successfully communicate data over the fiber optic cables joined by these two components. However, particularly in large installations, the polarity of the connector often does not correspond with the polarity of the adapter, leading to cross over and other communication issues. The connector assembly cannot simply be rotated to a correct polarity, as the connector assembly includes elements configured to secure the connector assembly to the adapter which prevent rotation.

Conventional techniques for changing an incorrect polarity of a connector assembly involve difficult and time consuming methods. For example, an installer may be required to remove the existing, incorrect connector assembly and prepare a new connector assembly on site. Other methods involve the use of special tools or high-cost connector components that may also require twisting or rotating the fiber, which may lead to damaged connections. Accordingly, telecommunication network providers would benefit from a connector assembly configured to allow for the efficient and effective changing of the polarity of the connector assembly on-site.

The described technology generally relates to connector assemblies (for example, a plug, male connector, connector, or the like) having an adjustable polarity. In general, the connector assemblies have a plurality of orientations, alignments, or other physical attributes that cause the connector assemblies to have a plurality of polarities. In some embodiments, the connector assembly may only fit into and/or correctly connect with an adapter (for instance, a receptacle, female connector, adapter, or the like) in one or more of the polarities. The polarity of the connector assembly may be based on the relative orientation of components of the connector assembly, such as ferrules, a housing, a latch, a frame, or the like. For example, a connector assembly configured according to some embodiments may include two ferrules, a transmission ferrule and a receiving ferrule that may be arranged in one of a first polarity and a second polarity in order to form a successful connection with a corresponding adapter.

The connector assemblies and other data transmission elements described according to some embodiments herein may be connected within a network, which may include any type of network capable of transmitting signals, electricity, or any other type of transmission medium. For instance, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the sealable connector assemblies may be configured to connect cable segments and/or devices within a fiber optic network using various standard connector types and/or adaptors, including, but not limited to, LC, ST, SC, FC, DIN, D4, SMA, E2000, Biconic, FullAXS, OCD, small form-factor pluggable (SFP), MPO and/or copper-type network connections, such as RJ-45 type connectors. In some embodiments, the connector assembly may include a duplex LC-type connector and the connector assembly adaptor may include an SFP adaptor. In some embodiments the connector assembly may include a LC-type uniboot connector. In some embodiments, the connector assembly may include a unibody connector, for instance, that includes a round fiber optic cable.

FIG. 1 depicts an exploded view of an illustrative connector assembly according to a first embodiment. As shown in FIG. 1, a connector assembly 100 may include a housing 180 formed from a top housing component 105 and a bottom housing component 110. The housing 180 may include a "closed" configuration when the top housing component 105 is coupled to the bottom housing component 110 and an "open" configuration when the top housing component 105 is not coupled to the bottom housing component 110. The top housing component 105 and the bottom housing component 110 may be securely coupled to each other using various means, such as a snap-fit, a friction-fit, or the like.

In some embodiments, the top housing component 105 may include one or more top projections 190 configured to engage corresponding locking projections 195 on the bottom housing component 110. As the top housing component 105 is being pushed onto the bottom housing component 110, the top projections 190 engage the locking projections 195, which may include a slanted top surface such that the force of the projections against the locking projections causes the side walls of the bottom housing component to extend outward to facilitate the movement of the projections past the locking projections and into the interior of the housing 180. When the top projections 190 have passed the locking projections 195, the side walls of the bottom housing component 110 return to their original position and the locking projections are positioned over the top projections, preventing movement of the top housing component 105 in an upward direction. Accordingly, the top housing component 105 is securely coupled to the bottom housing component 110. The top housing component 105 may be removed from the bottom housing component 110 using various processes, including prying on a portion of bottom housing component. For example, an installer may manually spread locking projections 195 apart and lift the top housing component 105 to remove the top housing component from the bottom housing component 110.

A cable (not shown) may extend through a boot 115 into the connector assembly 100. The cable may include two optical fibers (for instance, a transmitting optical fiber and a receiving optical fiber) terminating at a first ferrule 155a and a second ferrule 155b. For example, the first ferrule 155a may be coupled to a terminal end of a transmitting optical fiber and the second ferrule 155b may be coupled to a terminal end of a receiving optical fiber, or vice versa. A crimp ring and/or crimp tube 120, which may include a material, such as a heat-shrink material, may encase a portion of the cable and a crimp ring 120 may be secured to the cable. A back post 125 may engage the crimp ring 120 at a distal (D) end thereof. In some embodiments, as the crimp ring 120 is secured to the cable, the crimp ring may prevent movement of the back post 125 and, therefore, the housing 180, toward the distal (D) end of the connector assembly 100. In some embodiments, the back post 125 may be molded or otherwise affixed to a portion of the top housing component 105 or the bottom housing component 110. The back post 125 may be arranged within a channel 170 formed in the housing 180. In some embodiments, the back post 125 may be affixed to the channel 170 within the bottom housing component 110, such as through a snap-fit, a friction-fit, adhesive, or the like.

The first ferrule 155a and the second ferrule 155b may be arranged within a first plug frame 150a and a second plug frame 150b, respectively. The first plug frame 150a and the second plug frame 150b may be independent from each other. The top housing component 105 and the bottom housing component 110 may include recesses 130, 145 at a proximal (P) end thereof that are configured to engage corresponding channels 165a, 165b formed in the distal (D) end of the first plug frame 150a and the second plug frame 150b. In this manner, the first plug frame 150a and the second plug frame 150b may be secured within the connector assembly 100 when the housing 180 is in the closed configuration. In some embodiments, the first plug frame 150a and the second plug frame 150b may be coupled to the top housing component 105 and/or the bottom housing component 110 within the recesses 130, 145, such as through a snap-fit, friction-fit, or the like.

The first plug frame 150a and the second plug frame 150b may include a locking latch 160a, 160b configured to releasably couple the connector assembly 100 to a complementary adapter (not shown). The locking latches 160a, 160b may be depressible and may have sufficient flexibility such that the connector assembly 100 may be released from the adapter when the latch is activated with a moderate pressing force. The top housing component 105 may include a thumb latch 135 configured to engage the locking latches 160a, 160b. The thumb latch 135 may be positioned on the housing 180 such that individual locking latches 160a, 160b may be triggered by a single thumb latch 135 on the housing.

The thumb latch 135 may be configured to depress the locking latches 160a, 160b at substantially the same time.

Figure 2A:
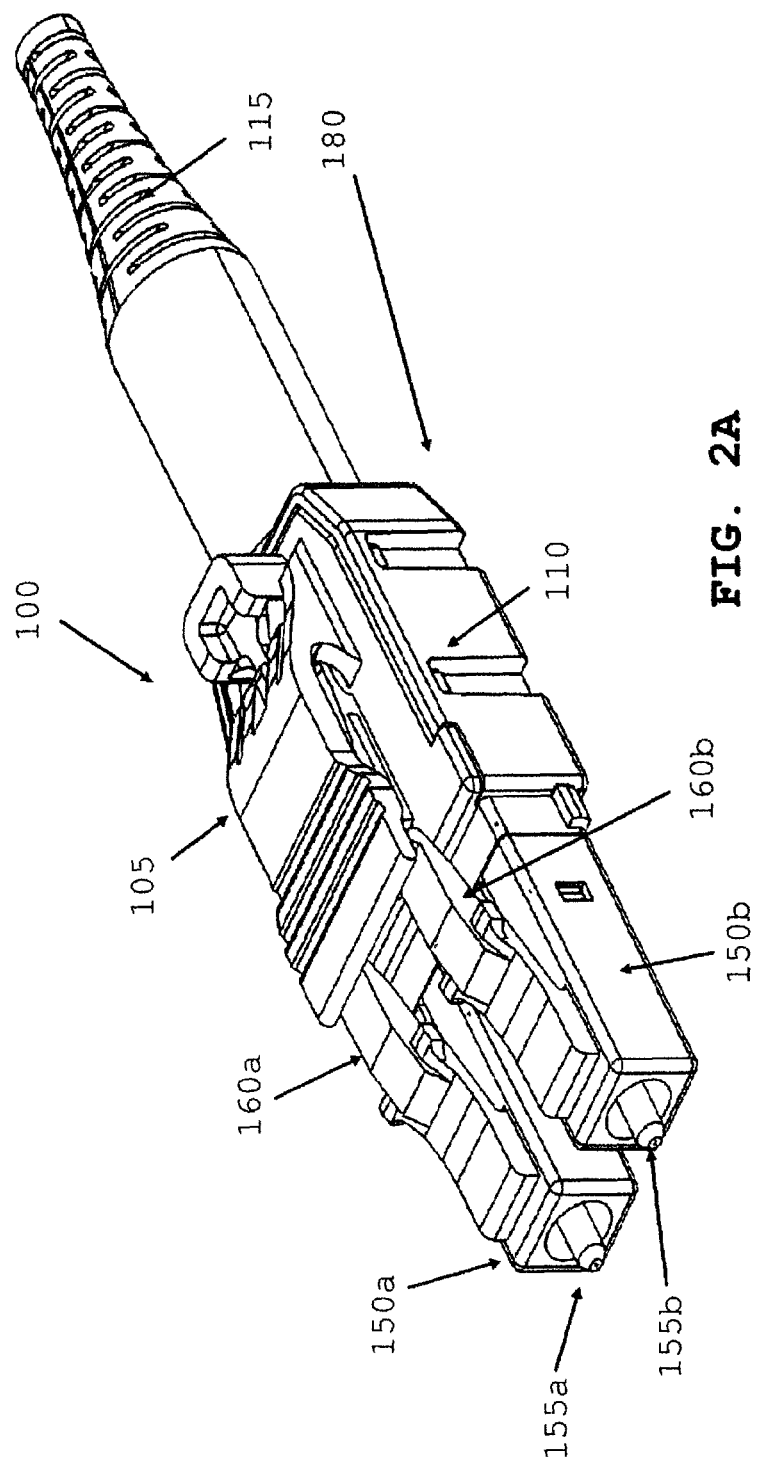
FIGS. 2A-2C depict an illustrative connector assembly according to an embodiment.
Figure 2B:
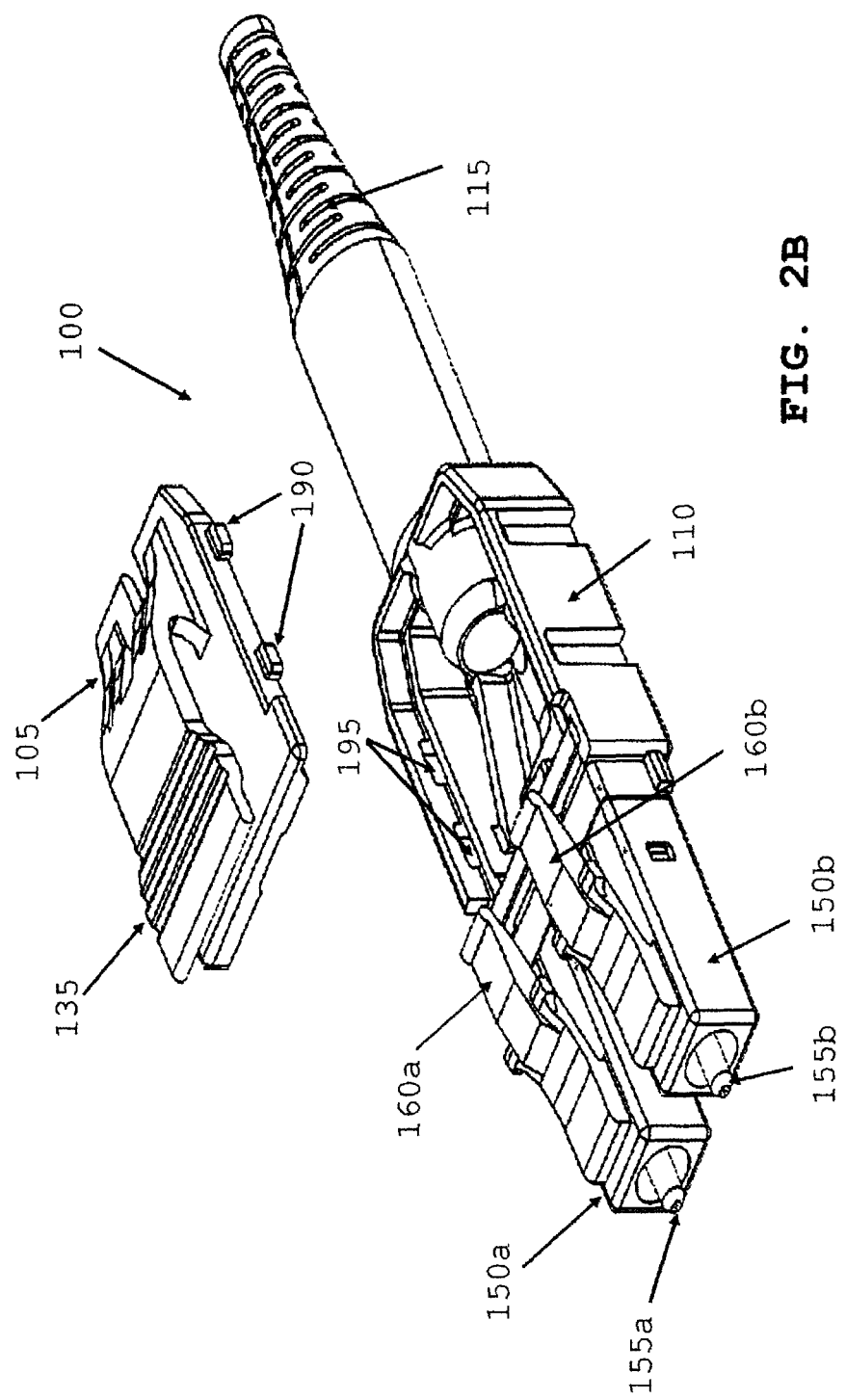
Figure 2C:
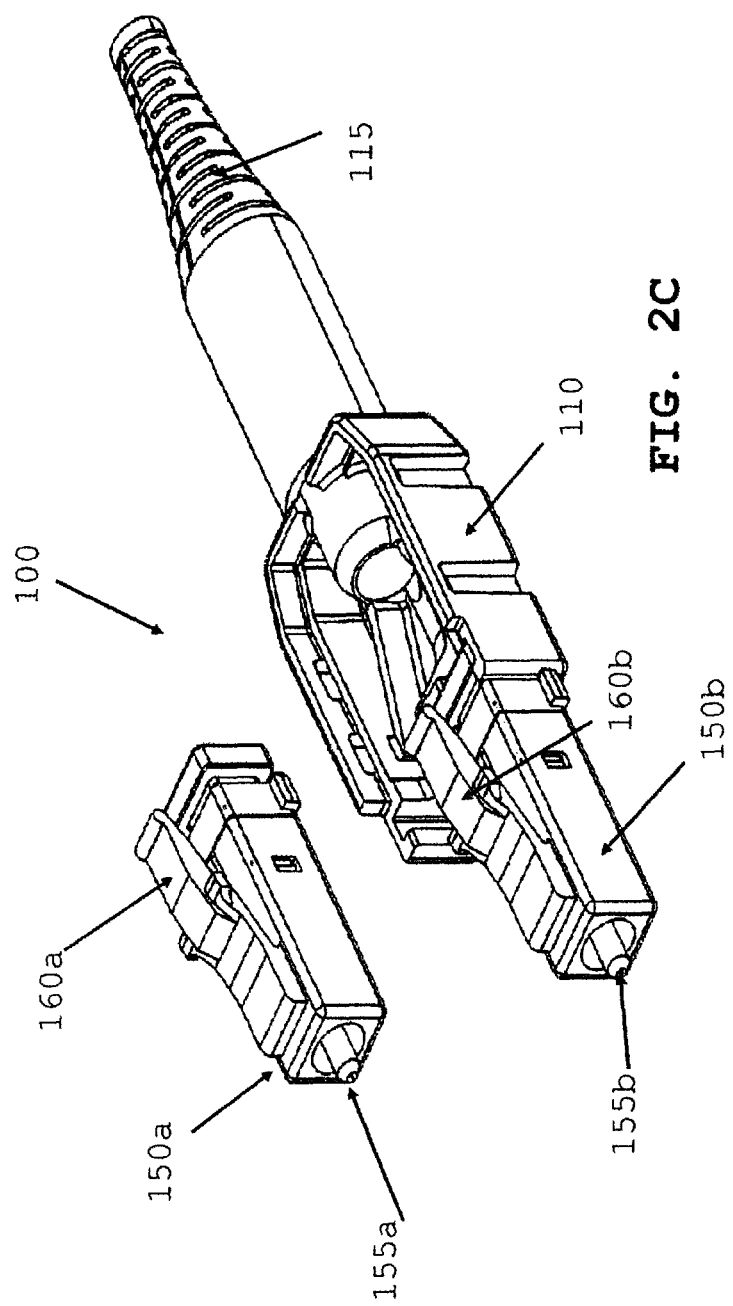

FIGS. 2A-2C depict an illustrative connector assembly according to the first embodiment. FIG. 2A depicts the connector assembly 100 with the housing 180 in the closed position and having a first polarity in which ferrule 155a is located on the left and ferrule 155b is located on the right. Locking latches (160a, 160b) are shown attached to respective plug frame (150a, 150b). In FIG. 2B, the housing component 180 is in the open configuration in which the top housing component 105 has been disconnected from the bottom housing component 110 exposing the interior of the housing and allowing access to the first plug frame 150a and the second plug frame 150b. As shown in FIG. 2C, the first plug frame 150a and the second plug frame 150b may be independently moved from the bottom housing component 110 when the housing 180 is in the open configuration. Accordingly, the position of the first plug frame 150a and the second plug frame 150b and, therefore, the first ferrule 155a and the second ferrule 155b, may be switched within the connector assembly 100. In this manner, the connector assembly 100 may be adjusted to have a second polarity in which ferrule 155a is located on the right and ferrule 155b is located on the left. Once the polarity of the connector assembly 100 has been adjusted, the top housing component 105 may be coupled to the bottom housing component 110 and the connector assembly may be connected to a corresponding adapter.

Figure 3A:
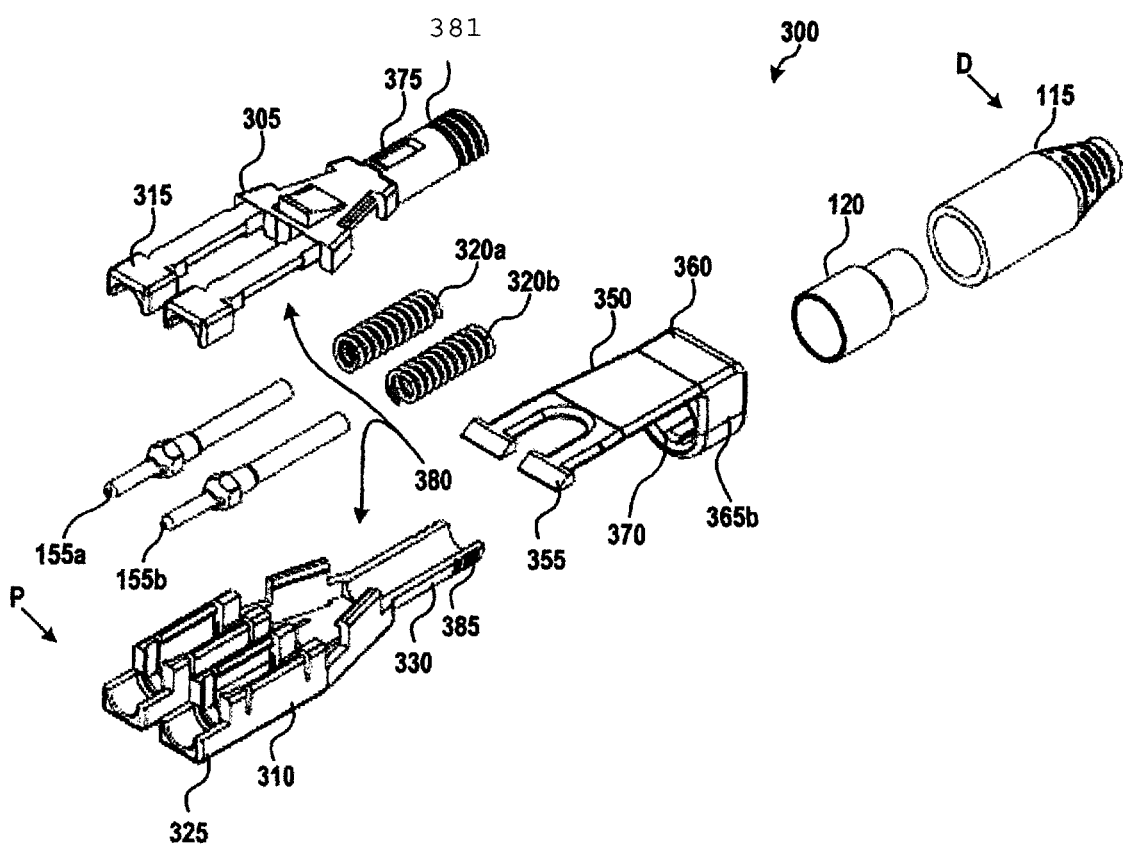
FIG. 3A depicts an exploded view of a connector assembly according to an embodiment.

FIGS. 3A-3F depict an illustrative connector assembly according to a second embodiment. In particular, FIG. 3A depicts an exploded view of an illustrative connector assembly according to the second embodiment. A connector assembly 300 may include a frame (or "housing") 380 configured to securely house a first ferrule 155a and a second ferrule 155b, springs 320a, 320b, and other internal components not shown in FIG. 3A. Distal end 330 of bottom frame 310 holds the optical fibers. The frame 380 may include a top frame component 305 configured to be coupled to a bottom frame component 310, both of which may include a back post portion 381, 385 and a plug frame portion 315, 325. At least a portion of the plug frame portion 315, 325 may be configured to engage and/or be inserted into a corresponding port of an adapter. The top frame component 305 and the bottom frame component 310 may be securely coupled to each other using various means, such as a snap-fit, a friction-fit, an adhesive, or the like.

A cable (not shown) may extend through a boot 115 into the connector assembly 300. The cable may include two optical fibers (for instance, a transmitting optical fiber and a receiving optical fiber) terminating at the first ferrule 155a and the second ferrule 155b. For example, the first ferrule 155a may be coupled to a terminal end of a transmitting optical fiber and the second ferrule 155b may be coupled to a terminal end of a receiving optical fiber, or vice versa. A crimp ring 120 may be secured to the cable. The post portion 381, 385 may engage the crimp ring 120 at a distal (D) end thereof. As the crimp ring 120 is secured to the cable, the crimp ring may prevent movement of the post portion 381, 385 and, therefore, the frame 380, toward the distal (D) end of the connector assembly 300.

A latch component 350 may include a ring portion 360 arranged around a distal (D) end of the frame 380. The latch component may include a thumb latch 355 configured to releasably couple the connector assembly 300 to a complementary adapter (not shown). The thumb latch 355 may be depressible and may have sufficient flexibility such that the connector assembly 300 may be released from the adapter when the latch is activated with a moderate pressing force.

Figure 3B:
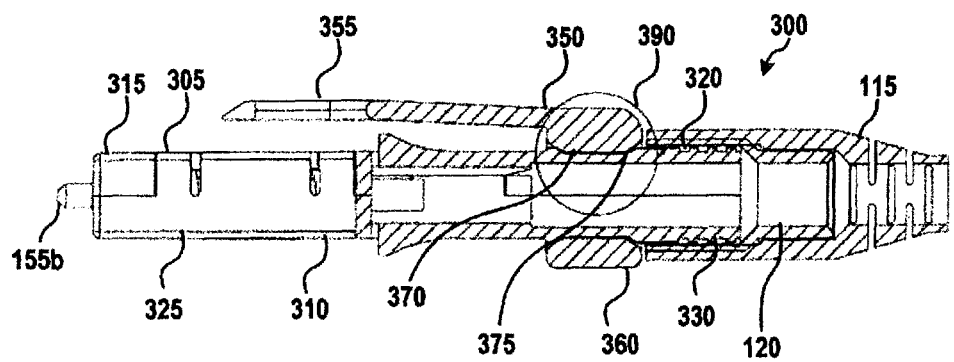
FIG. 3B depicts a cross-sectional view of a connector assembly according to an embodiment.
Figure 3C:
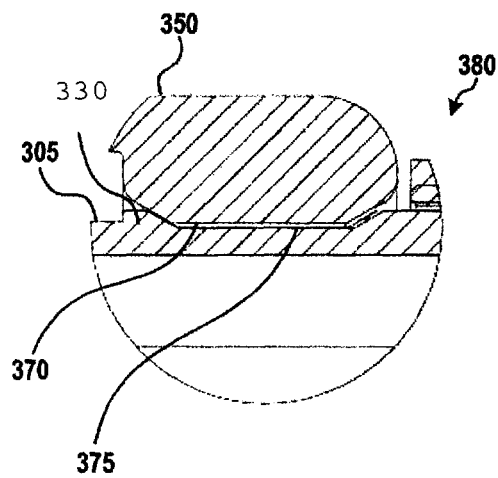
FIG. 3C depicts a detailed view of a latch component of a connector assembly according to an embodiment.

FIG. 3B depicts a cross-sectional view of the connector assembly 300 and FIG. 3C depicts detail 390 of FIG. 3B. FIG. 3B depicts thumb latch 355 formed as part of latch component 350 which is formed as part of ring portion 360. As shown in FIGS. 3A-3C, an external surface of the frame 380 may include one or more locking recesses 375 configured to receive one or more corresponding locking projections 370 arranged on an inner surface of the ring portion 360. The latch component 350 may include one or more compression sections 365b (compression section 365a is not visible in FIG. 3A, see FIG. 3E). As shown in FIGS. 3A and 3C, the locking projections 370 may engage the locking recesses 375 to prevent the rotation of the latch component 350 with respect to the frame 380.

Figure 3D:
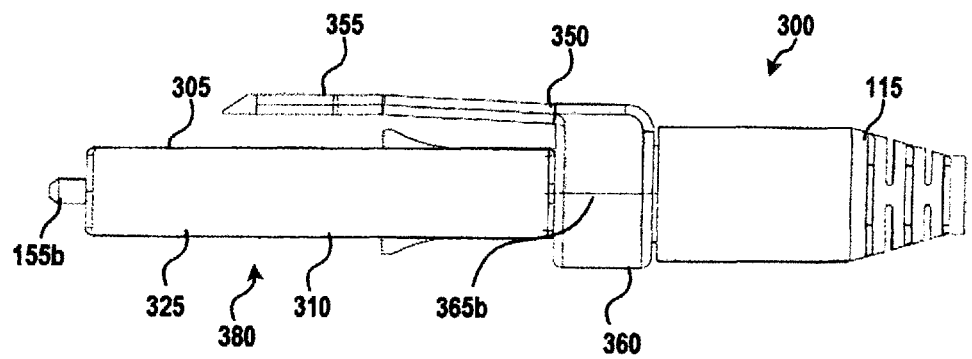
FIGS. 3D-3F depict a change in polarity of an illustrative connector assembly according to an embodiment.
Figure 3E:
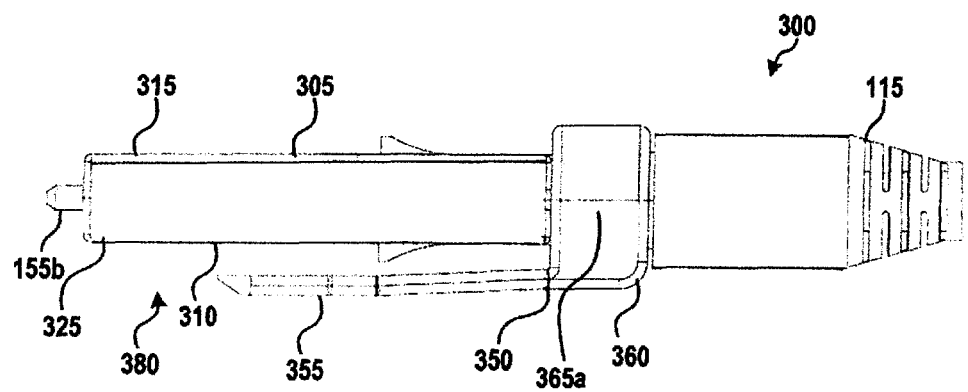

Referring to FIGS. 3C-3E, the compression of the compression sections 365a, 365b causes the shape of the ring portion 360 to become defaulted. As depicted in FIG. 3C, the shape of the ring portion 360 may be integral to the latch component 350. Additionally, the ring portion 360 may have a generally circular-shape when the compression sections 365a, 365b are not compressed and a generally oval-shape when the compression sections are compressed. As depicted in FIG. 3D, when the compression sections 365a, 365b are compressed, the locking projections 370 move out of the locking recesses 375 and the latch component 350 may rotate with respect to the frame 380, as shown in FIG. 3E. As depicted in FIG. 3C, when the compression sections 365a, 365b are not compressed, the locking projections 370 may be inserted into the locking recesses 375 and the latch component 350 may be locked in place with respect to the frame 380. Comparing FIG. 3D and FIG. 3E accordingly, latch component 350 may be rotated to the other side of frame 380 and connector assembly 300 may be rotated to connect with a corresponding adapter with a different polarity.

Figure 3F:
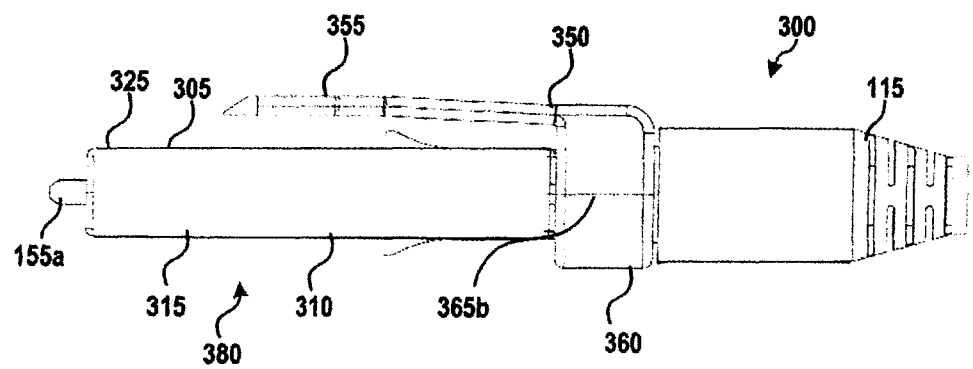

Referring to FIGS. 3D-3E, in some embodiments, sections 365a and 365b may become compressed when the user (e.g., via their fingers or a tool) twists the ring portion 360. As depicted in FIG. 3E and FIG. 3F, in some embodiments, the ring portion 360 impacts sections 365a (refer to FIG. 3E) and 365b (refer to FIG. 3F) causing compression. As depicted in FIG. 3C, in a further embodiment, when a user twists a ring portion 360 it becomes compressed against an integral surface (not shown) as it is rotated surface 370. If rotation continues surface 370 may engage a recess 375 thus allowing the connector to change polarity.

FIGS. 3D-3F depicts an illustrative polarity adjustment for the connector assembly 300. In FIG. 3D, the connector assembly 300 is arranged in a first polarity in which, the connector assembly is configured to connect with an adapter with the second ferrule 155b on the right side and the first ferrule 155a on the left side of the connector assembly from a top-down perspective. The latch component 350 is arranged in a first polarity position on the frame 380, with compression section 365b visible in FIG. 3D and the thumb latch 355 over plug frame portion 315. In FIG. 3E, the compression sections 365a, 365b have been compressed and the latch component 350 has been rotated to a second polarity position, in which compression section 365a is visible in FIG. 3E and the thumb latch 355 is under plug frame portion 325. In FIG. 3F, the entire connection assembly 300 has been rotated such that the connection assembly may connect with an adapter in a second polarity with the second ferrule 155b on the left side and the first ferrule 155a on the right side of the connector assembly from a top-down perspective. Accordingly, the polarity of the connector assembly 300 may be adjusted by rotating the latch component 350 from a first polarity position to a second polarity position and rotating the connector assembly such that the thumb latch 355 is orientated to engage a corresponding adapter.

Figure 4A:
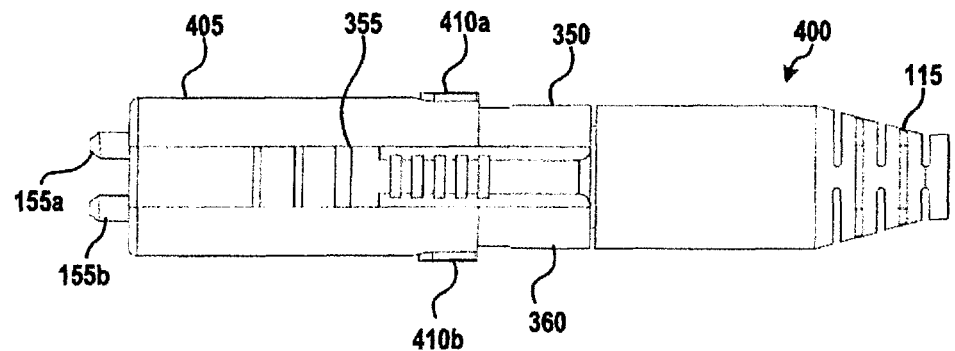
FIG. 4A depicts a top-down view of a connector assembly according to an embodiment.

FIGS. 4A-4I depicts an illustrative connector assembly according to a third embodiment. FIG. 4A depicts a top-down view of a connector assembly 400 having a housing and compression elements 410a, 410b. A latch component 350 may have a ring portion 360 disposed around a locking component 430 (not shown, see FIG. 4B). In some embodiments, the compression elements 410a, 410b may be resilient and biased outward. In some embodiments, compression of compression elements 410a, 410b may allow latch component 350 to rotate from a first polarity position to one or more other positions.

Figure 4B:
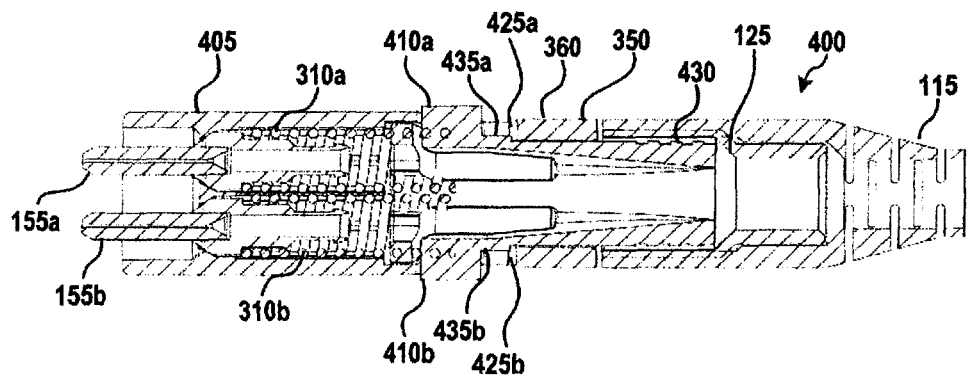
FIG. 4B depicts a cross-sectional view of a connector assembly according to an embodiment.

FIG. 4B depicts a cross-sectional view of the connector assembly 400 from a top-down perspective. As shown in FIG. 4B, the compression elements 410a, 410b may be arranged on a locking component 430. One or more cables (not shown) may extend through the connector assembly 400, for example, through the boot 115, the crimp ring 125, the locking component 430, and the housing 405, and terminating at the ferrules 155a, 155b. When the compression elements 410a, 410b are not compressed, locking elements 435a, 435b arranged on the locking component 430 may engage the latch component 350 to prevent rotation thereof. In some embodiments, the locking elements 435a, 435b may engage a locking recess 425a, 425b formed in the ring portion 360 of the latch component 350. Compression of the compression elements 410a, 410b may cause the locking elements 435a, 435b to move inward such that they no longer engage the latch component 350, thereby allowing the latch component to rotate about the locking component 430. As the latch component 350 rotates around the locking component 430, the outward bias of the locking elements 435a, 435b may cause the locking components to press against the inner surface of the ring portion 360. Accordingly, when a locking recess 425a, 425b is located over a locking element 435a, 435b without the compression elements 410a, 410b being compressed, the locking element may push outward and re-engage the locking recess 425a, 425b.

Figure 4C:
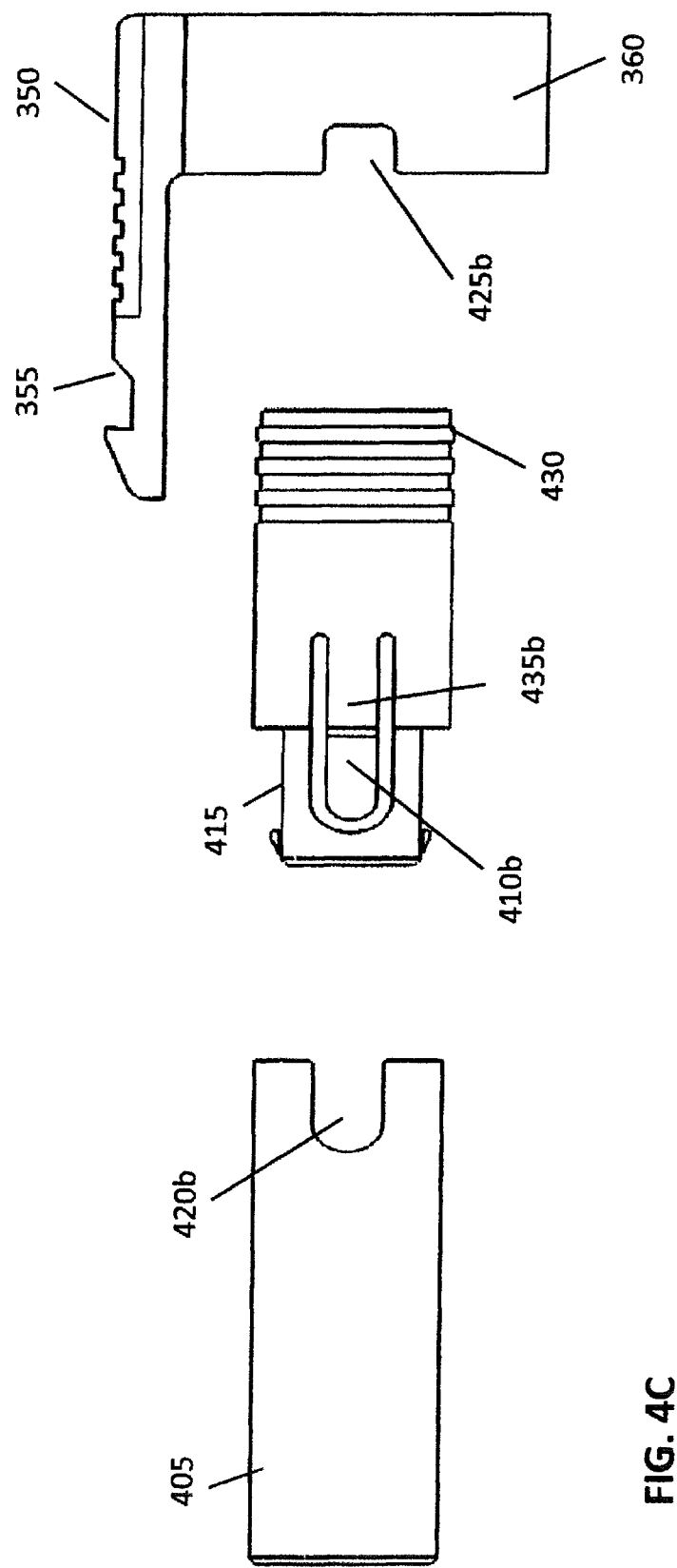
FIG. 4C depicts a side view of a connector assembly according to all embodiment.
Figure 4D:
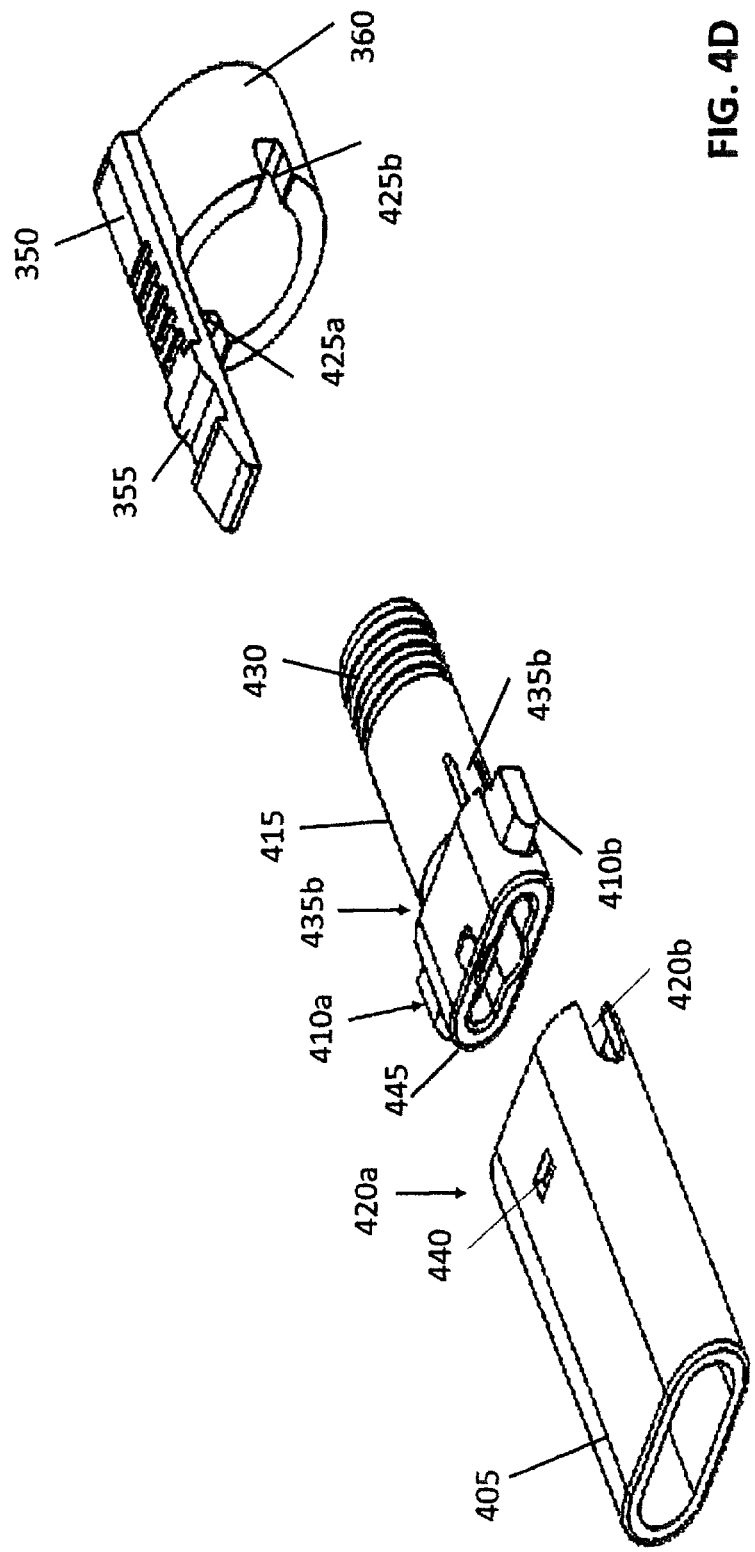
FIG. 4D depicts a perspective view of a connector assembly according to an embodiment.
Figure 4E:
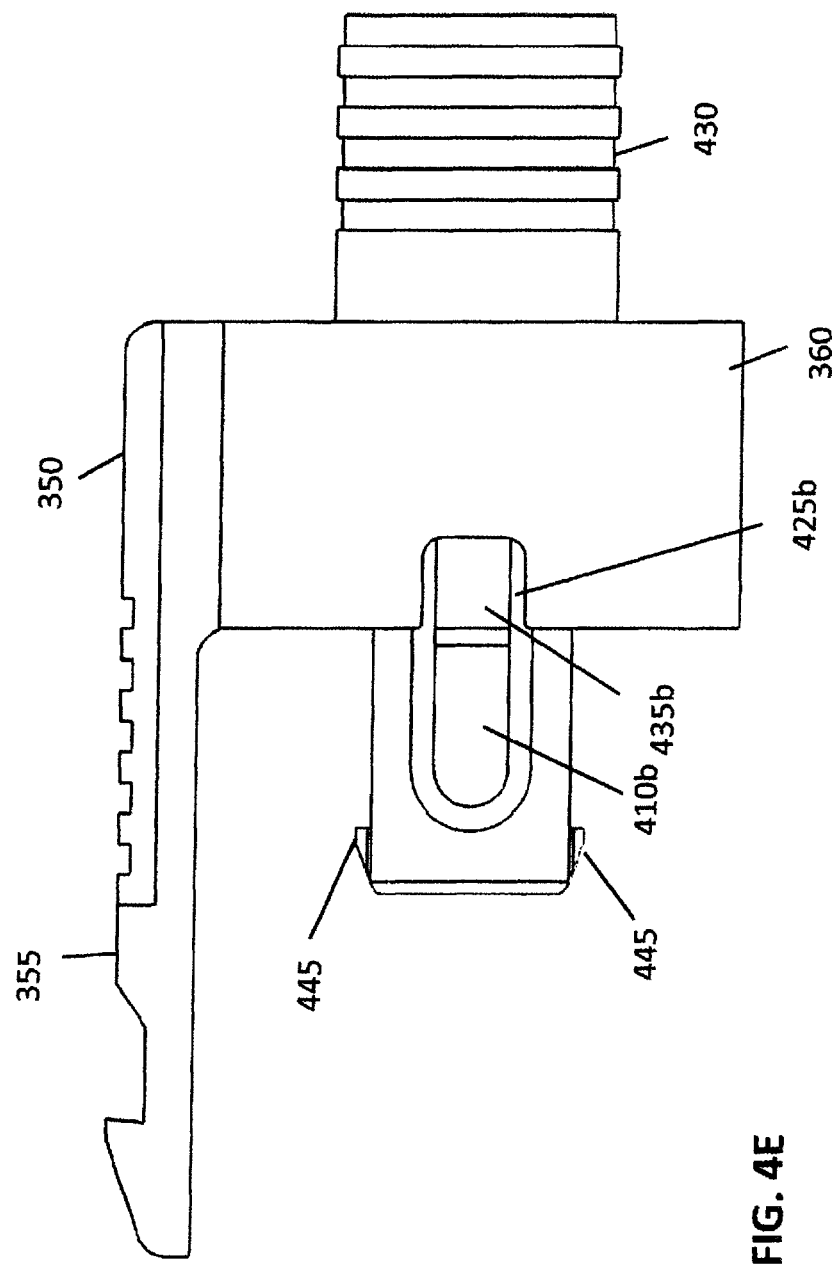
FIG. 4E depicts a side view of a latch component of a connector assembly according to an embodiment.
Figure 4F:
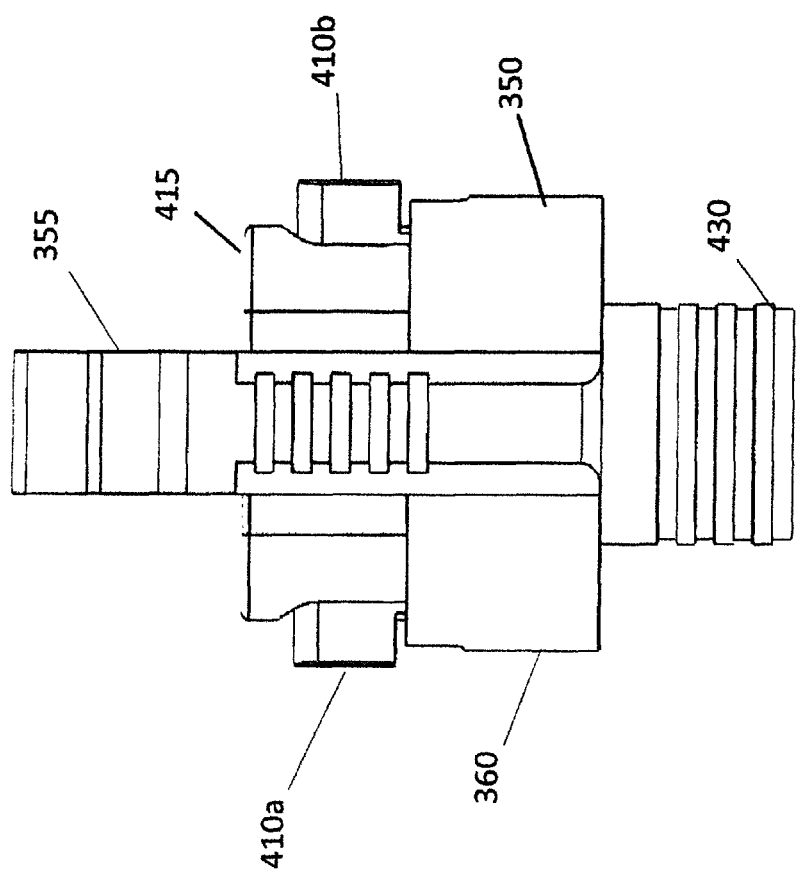
FIG. 4F depicts a top view of a latch component of a connector assembly according to an embodiment.

FIGS. 4C and 4D depict the housing (i.e., front portion) 405, rear portion 415 locking component 430, and latch component 350 in a side view and a perspective view, respectively. FIG. 4C depicts ring portion 360 prior to insertion over compression element 410b. As shown in FIGS. 4C and 4D, the housing 405 may include channels (420a, 420b) configured to receive the compression elements 410a, 410b. In some embodiments, the housing 405 may include one or more openings 440 configured to receive a complementary projection 445 on the locking component 430 to secure the locking component in place within the connector assembly 400. FIG. 4D is a perspective view of FIG. 4C, prior to assembly as depicted in FIG. 4E. In FIG. 4D, locking recess 425b engages compression element 410b, which is received in channel 420b when assembled as show in FIG. 4E. FIGS. 4E and 4F depict the latch component 350 and the locking component 430 as arranged within the connector assembly 400 from a side view and a top-down view, respectively. FIG. 4E depicts assembled latch component 350 and ring portion 360 about locking component 430. FIG. 4F depicts a top view of FIG. 4E assembled showing compression channels 410a, 410b engaging locking component 415.

Figure 4G:
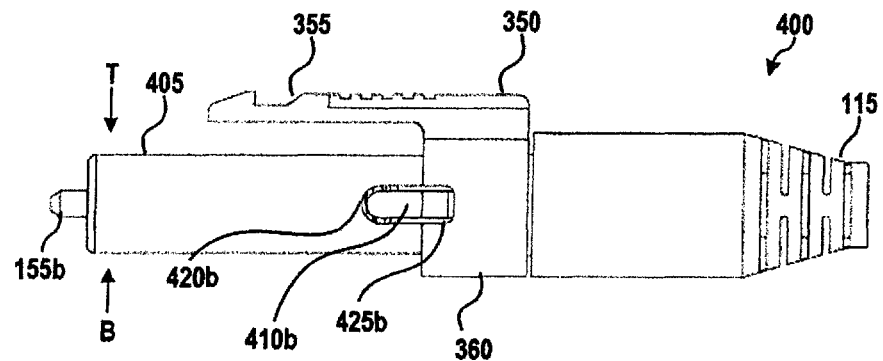
FIGS. 4G-4I depict a change in polarity of an illustrative connector assembly according to an embodiment.
Figure 4H:
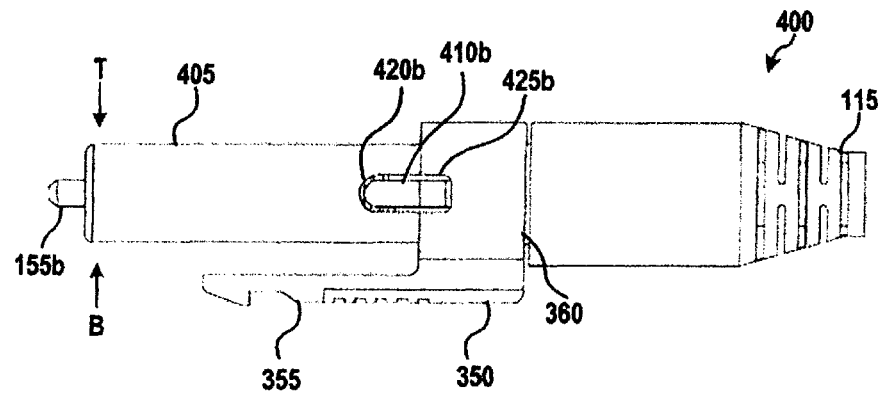
Figure 4I:
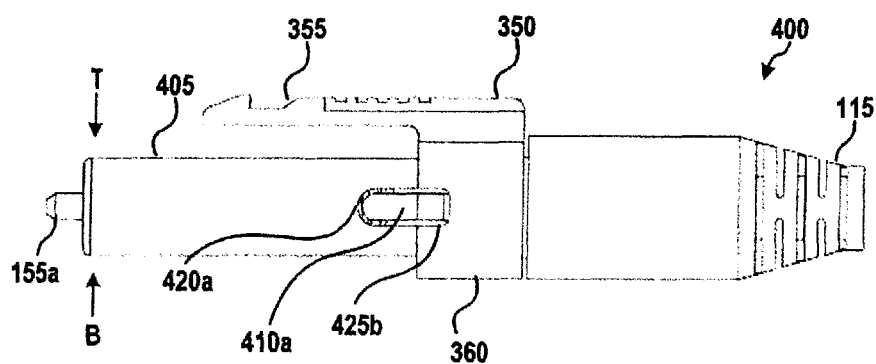

FIGS. 4G-4I depicts an illustrative polarity adjustment for connector assembly 400. In FIG. 4G, connector assembly 400 is arranged in a first polarity in which the connector assembly is configured to connect with an adapter with the second ferrule 155b on the right side and first ferrule 155a on the left side of the connector assembly from a top-down perspective. Latch component 350 is arranged in a first polarity position on locking component 430, with locking recess 425b visible in FIG. 4G and the thumb latch 355 being arranged over a top (T) surface of the housing 405. In FIG. 4H, latch component 350 has been rotated to a second polarity position, in which locking recess 425b is visible in FIG. 4H and thumb latch 355 is arranged under a bottom (B) surface of housing 405. In FIG. 4I, the entire connection assembly 400 has been rotated such that the connection assembly may connect with an adapter in a second polarity with second ferrule 155b on the left side and first ferrule 155a on the right side of the connector assembly from a top-down perspective. Accordingly, as depicted in FIGS. 4G-4I, the polarity of connector assembly 400 may be adjusted by rotating latch component 350 from a first polarity position to a second polarity position and rotating the connector assembly such that thumb latch 355 is orientated to engage a corresponding adapter.

Figure 5:
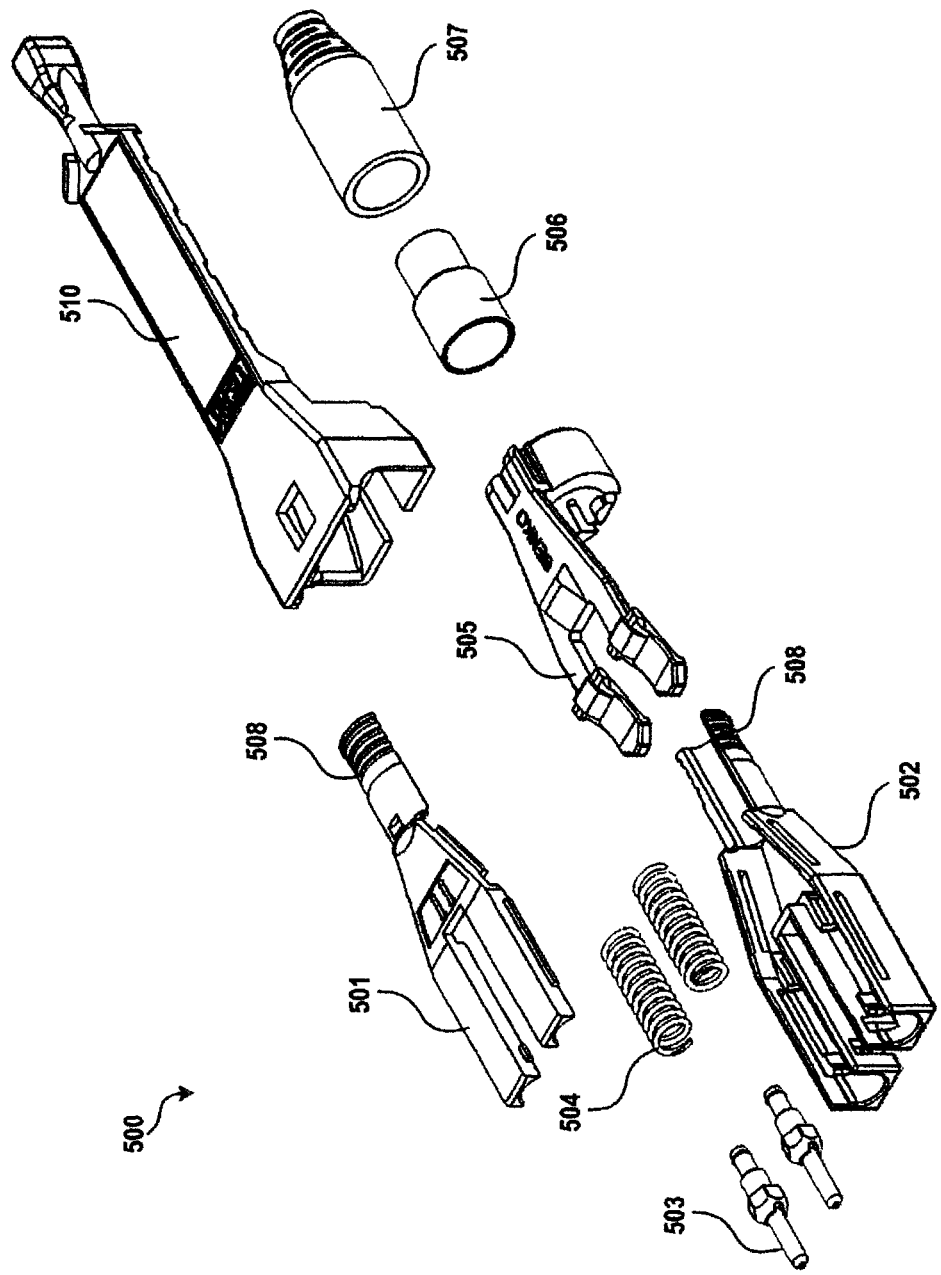
FIG. 5 depicts an exploded view of a connector assembly according to an embodiment.

FIG. 5 depicts an exploded view of an illustrative connector assembly according to various embodiments. As shown in FIG. 5, connector assembly 500 may include top housing component 501 and a\bottom housing component 502. In some embodiments, top housing 501 and bottom housing 502 may be joined together in a "closed" configuration when top housing 501 being coupled to bottom housing 502. Alternatively, some embodiments may have an "open" configuration when top housing component 501 is not coupled to bottom housing component 502. When in the closed configuration, top housing 501 and bottom housing 502 may be securely coupled to each other using various means, such as a snap-fit, a friction-fit, or the like.

Continuing with FIG. 5, a cable (not shown) may extend through boot 507, pass through crimp ring 506 and then into the housing formed by top housing 501 and bottom housing 502. The cable may include two optical fibers (for instance, a transmitting optical fiber and a receiving optical fiber) terminating at one or more ferrule(s) 503. In some embodiments, two ferrules may be utilized, wherein a first ferrule may be coupled to a terminal end of a transmitting optical fiber and the second ferrule may be coupled to a terminal end of a receiving optical fiber, or vice versa. The crimp ring and/or crimp tube 506, which may include a material, such as a heat-shrink material, may encase a portion of the cable and may be secured to the cable. Back post 508, which may be made up of the combination of top housing 501 and bottom housing 502 may engage crimp ring 506 at a distal end thereof.

Still referring to FIG. 5, in some embodiments, as crimp ring 506 may be secured to the cable, thus the crimp ring may prevent movement of back post 508 and, therefore, main housing (501 and 502), toward the distal end of connector assembly 500. In some further embodiments, back post 508 may be molded or otherwise affixed to a portion of top housing component 501 or bottom housing component 502.

Still referring to FIG. 5, ferrule(s) 503 may be arranged within main housing (501 and 502) in two separate channels (as shown), or in a single combined channel, first plug frame 150a and second plug frame 150b, respectively. In this manner, the ferrule(s) (and plug frame(s)) 503 may be secured within connector assembly 500 when top housing 501 bottom housing 502 are in the closed configuration. In further embodiments, ferrules(s) 503 may have a biasing force applied via one or more springs 504.

As also shown in FIG. 1, an embodiment may have connection device 505 that allows the connector assembly to securely fasten into a receiver (e.g., adapter and/or transceiver). Referring to FIG. 5, connection device 505, in some embodiments, may be placed over a portion of the connector assembly (e.g., the back post 508). In a further embodiment, connection device 505, may be rotatable around hack post 508 in order to allow for easy polarity change of connector assembly 500. Connector assembly 500 may also comprise push-pull tab 510, which will be discussed at further length herein.

Figure 6A:
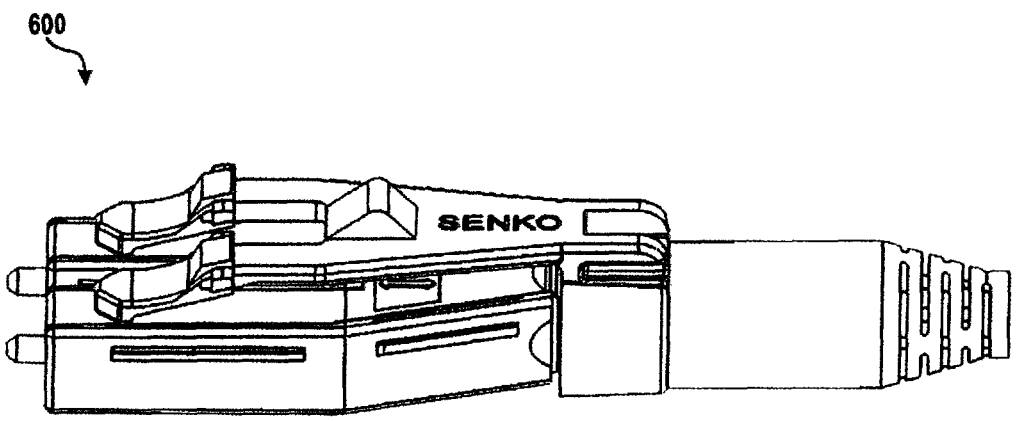
FIG. 6A depicts an illustrative example of connector assembly according to an embodiment.
Figure 6B:
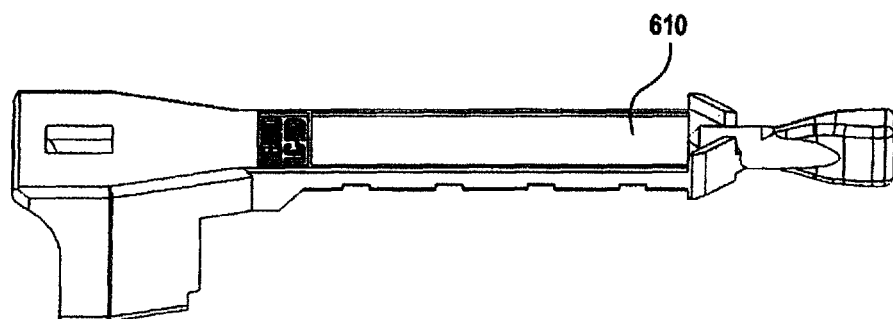
FIG. 6B depicts an illustrative example of push-pull tab according to an embodiment.
Figure 6C:
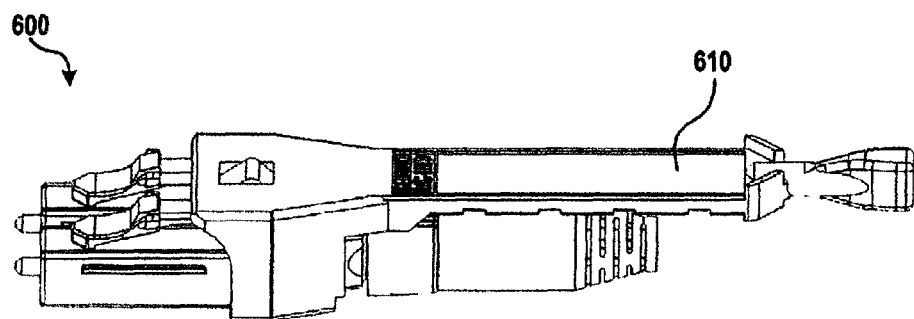
FIG. 6C depicts an illustrative example of the push-pull tab connected to the connector assembly according to an embodiment.
Figure 7A:
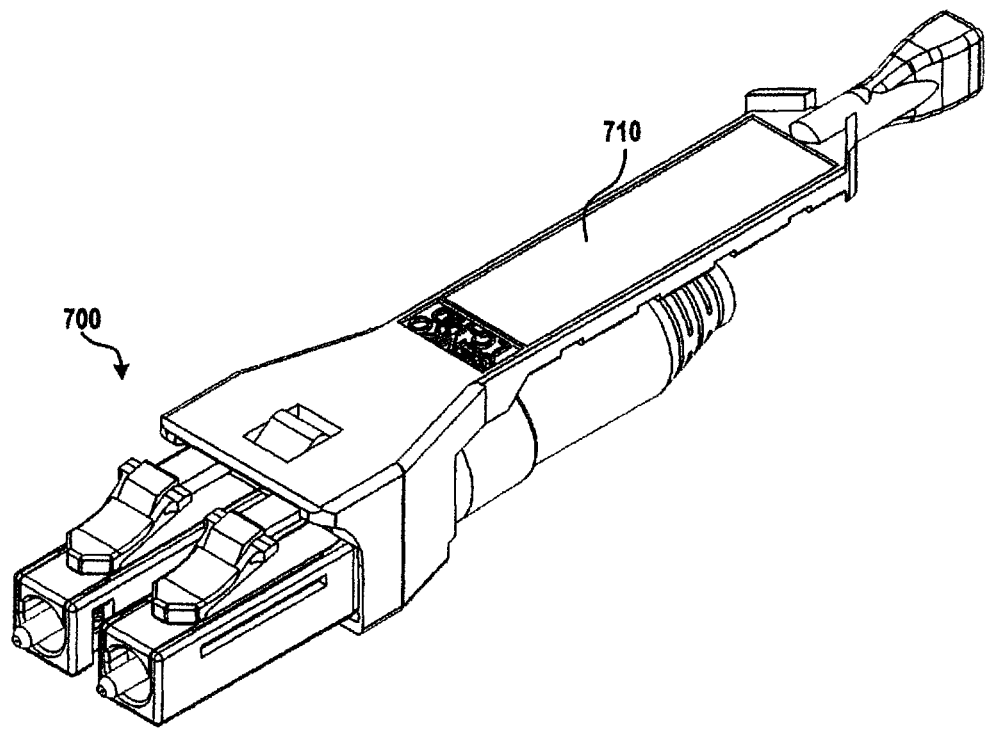
FIG. 7A depicts a perspective view of the push-pull tab connected to the connector assembly according to an embodiment.
Figure 7B:
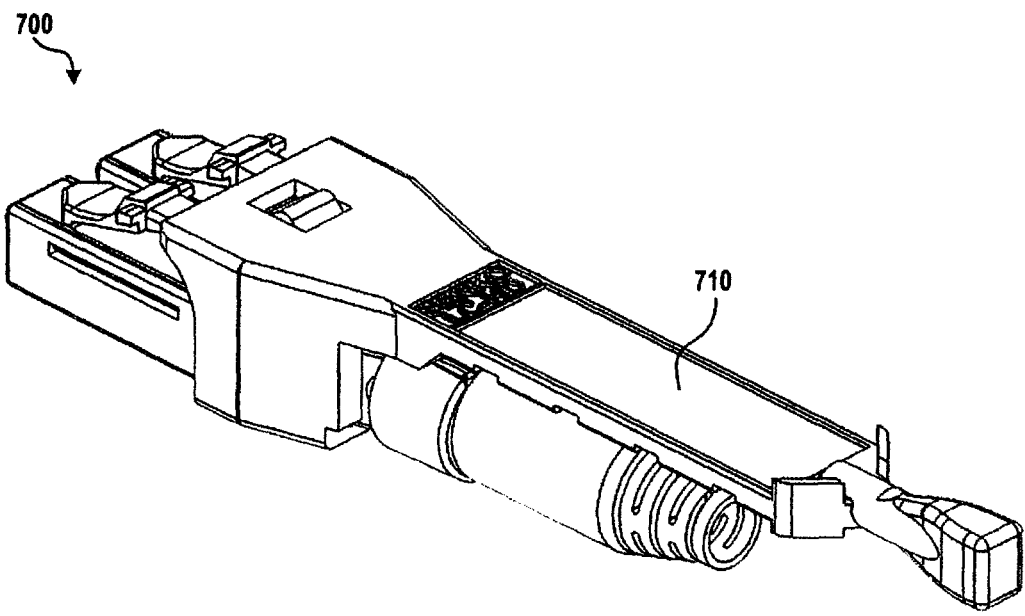
FIG. 7B depicts another perspective view of the push-pull tab connected to the connector assembly according to an embodiment.

A fully assembled connector assembly 600, is shown in FIG. 6A. FIG. 6B further shows a push-pull tab 610 according to a non-limiting example embodiment. In some embodiments, and as shown, the push-pull tab 610, may be removably and/or releasably attached to the connector assembly. Accordingly, and as shown in FIG. 6C, a connector assembly 600 and push-pull tab 610 may be combined into a single unit to allow for easy insertion and removal from a receiving device. Close up perspective views of connector assembly 700 and push-pull tab 710 are shown in FIGS. 7A and 7B. FIG. 7A depicts connector assembly 700 with push-pull tab 710 from a front side view. FIG. 7B depicts connector assembly 700 with push-pull tab 710 from a rear side view.

Figure 8A:
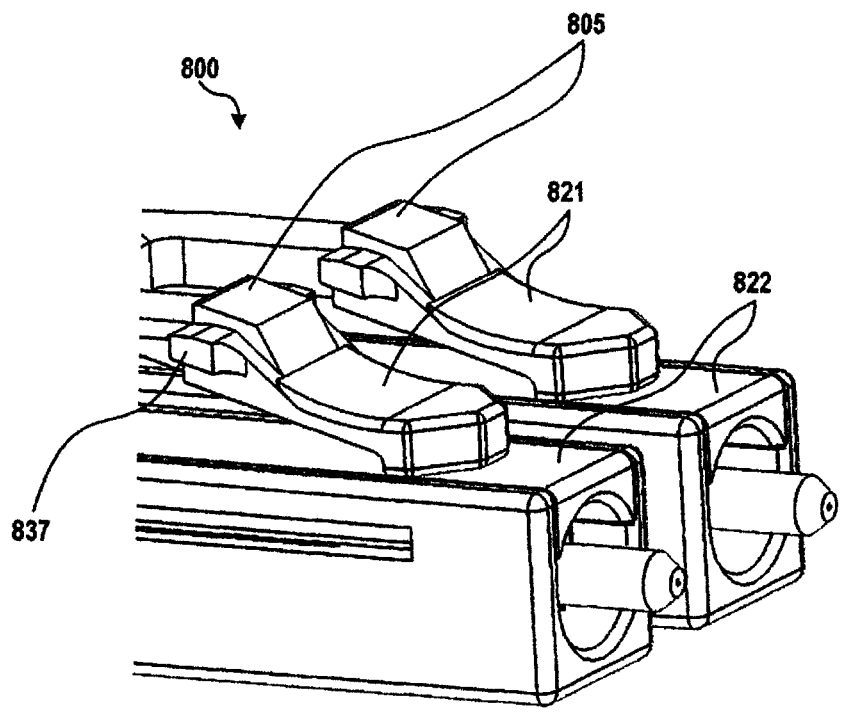
FIG. 8A depicts a detailed view of a portion of the connector assembly according to an embodiment.
Figure 8B:
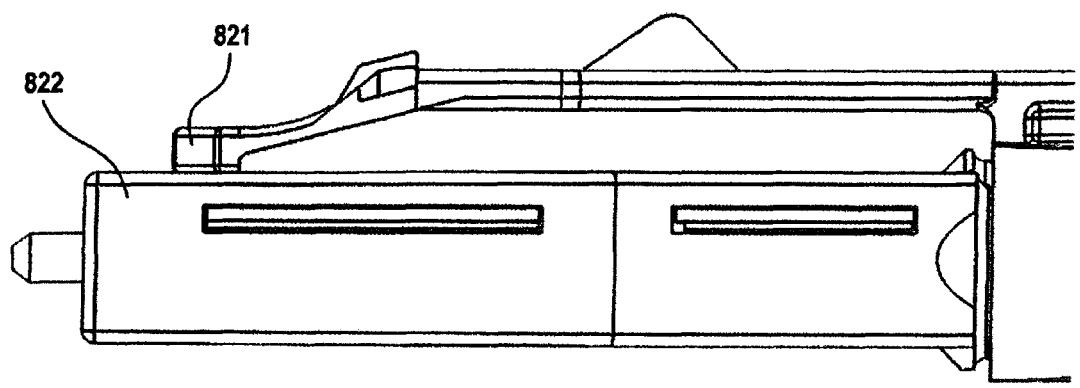
FIG. 8B depicts a side view of a portion of the connector assembly according to an embodiment.

Referring to FIGS. 8A and 8B, an embodiment is shown wherein the connector assembly 800 comprises one or more flexible latching arms 821. Referring to FIG. 8A, flexible latching arm 821 may have a connection device 805. Connection device 805 is further detailed herein as it relates to an adapter and/or transceiver. Specifically, the connection device 805 interlocks with a recess in an adapter/transceiver. Connection device 805 may also comprise one or more connector hooks 837. In some embodiments, connector hooks 837 may be used via a user's figures and/or tool to compress the connection device 805 in order allow for removal of connector assembly 800 from an adapter/transceiver.

Referring to FIG. 8B, as shown, one or more flexible latching arms 821 may contact the surface of one or more of the channels 822. The contact of the latching arm 821 with channel 822 provides additional support to the latching arm. In some embodiments, latching arm 821 is used to secure the connection of connector assembly 800 with a receiving device (e.g., and adapter and/or transceiver). Thus, the contact between latching arms 821 and channels 822 enables the one or more latching arms to more firmly connect and thereby better secure connector assembly 800 within the receiving device.

As discussed herein, connector assembly 900 may be configured such that a change in polarity of the connector is possible. As shown in FIG. 9A, the connection device may be rotated about a horizontal axis (i.e., rotated around the back post 908 (FIG. 5 at 508). In some embodiments, and as shown in FIG. 9B, recess 931 may be located on the back post 908. It should be understood, recess 931 may be located on various outer surfaces (e.g., the crimp ring (FIG. 5 at 506), the cable boot (FIG. 5 at 507), etc.). Furthermore, in some embodiments, there may be multiple recesses 931 located on the connector assembly 900, such as, for example, one on the top and one on the bottom of back post 908. Referring to FIG. 9C, connector device 905, may comprise protrusion 932 that is complementary (i.e., matching) to recess 931. Thus, in some embodiments, protrusion 932 may securely fasten connector device 905 to housing using recess 931.

Figure 10A:
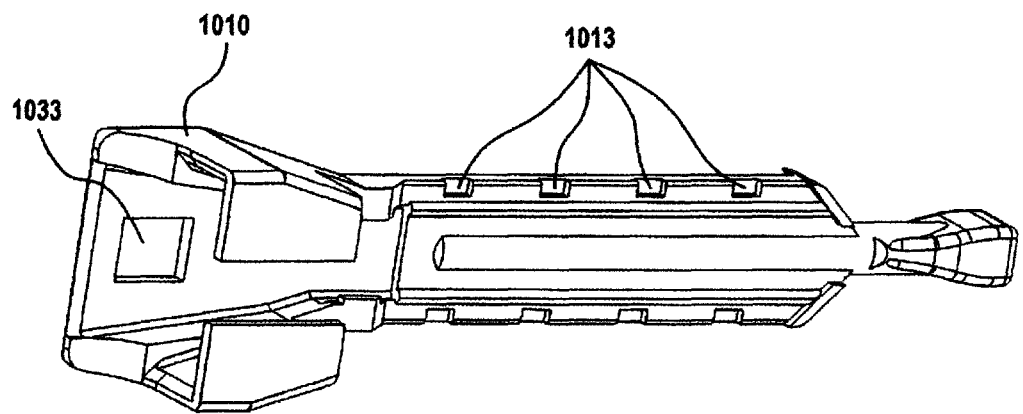
FIG. 10A depicts an underside view of a push-pull tab according to an embodiment.
Figure 10B:
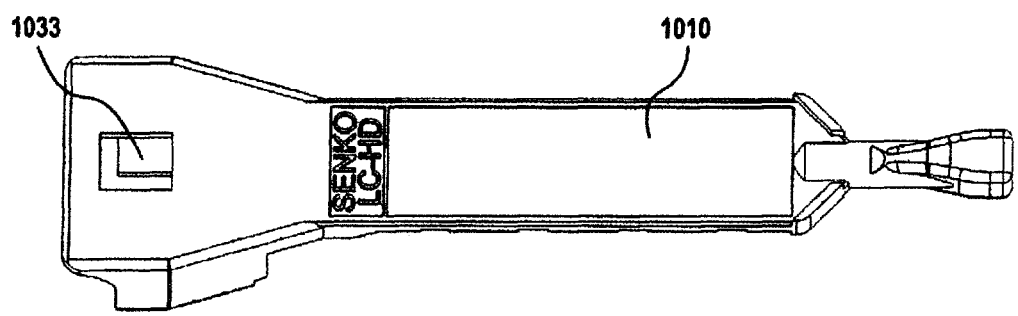
FIG. 10B depicts a topside view of a push-pull tab according to an embodiment.

Referring now to FIGS. 10A-10B, a top and bottom view of a push-pull tab 1010 is shown according to some embodiments. FIG. 10A depicts a bottom view showing one or more recesses 1013. As shown in FIG. 10B, push-pull tab 1010 may comprise a window or cutout 1033 at or near the proximal end of the push-pull tab and push-pull knob near the distal end. It should be understood that the location and dimensions of the window 1033 may vary with different embodiments, and that the dimensions and location as shown is for illustrative purposes only.

Figure 10C:
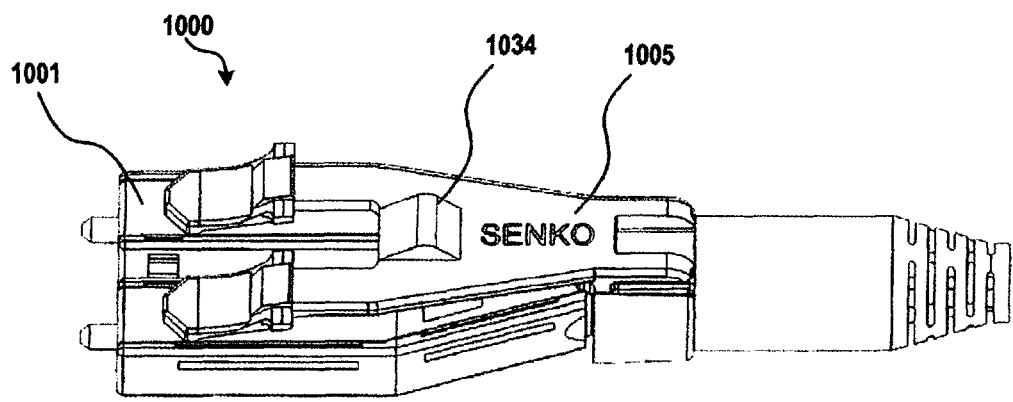
FIG. 10C depicts a perspective view of a connector assembly according to an embodiment.

As shown in FIG. 10C, in some embodiments, connector device 1005 may have protrusion 1034. Protrusion 1034 may be configured to fit through or inside of the cutout 1033 of push-pull tab 1010. Referring back to FIGS. 7A and 7B, an illustrative embodiment is shown where the push-pull tab is removably connected to the connector assembly.

Referring to FIG. 10B and FIG. 10C, when push-pull tab 1010 is moved longitudinally along connector assembly 1000, protrusion 1034 impacts the side of the window 1033. In some embodiments, when protrusion 1034 impacts the edge of the window 1033, the ramp portion of the protrusion slides along the edge of the window and forces connection device 1005 closer to top housing component 1001. When the connection device 1005 is compressed (i.e., forced closer to the top housing component 1001) connector assembly 1000, can be easily removed from a receiver (e.g., adapter and/or transceiver).

Figure 11:
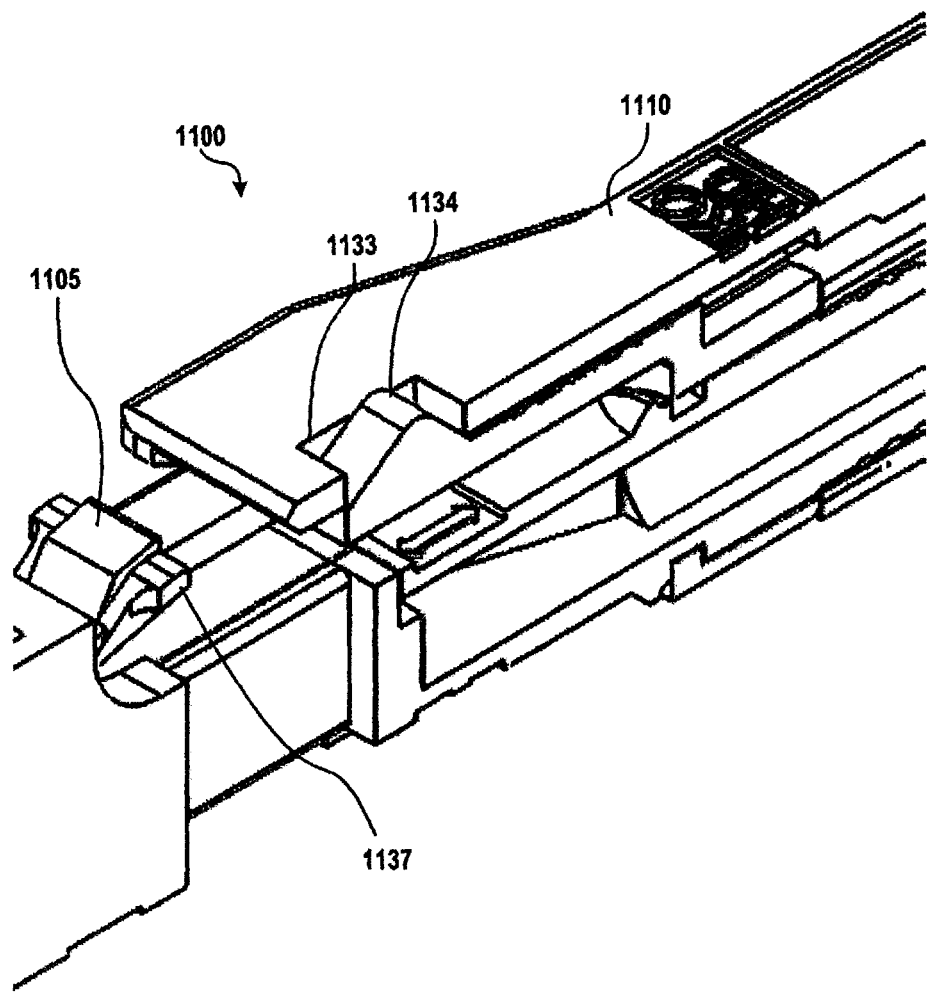
FIG. 11 depicts a detailed view of a protrusion and window interacting according to an embodiment.

A further example embodiment is shown in FIG. 11, which specifically shows a cross section of the connector assembly and push-pull tab 1110. As shown, the protrusion 1134 is placed through window 1133. Additionally, the small protrusion (not shown) resides in the recess (not shown) of the connector body. FIG. 11 also illustrates an example embodiment that has connection device 1105 with connector hooks 1137. The operation of FIG. 11 is described in the above paragraph on FIGS. 10B and 10C. As depicted, the connector assembly may be inserted into an adapter and/or transceiver. It should be understood, that various alternative embodiments may exist, and that those discussed herein and illustrated in the figures are simply for explanatory purposes.

Figure 12A:
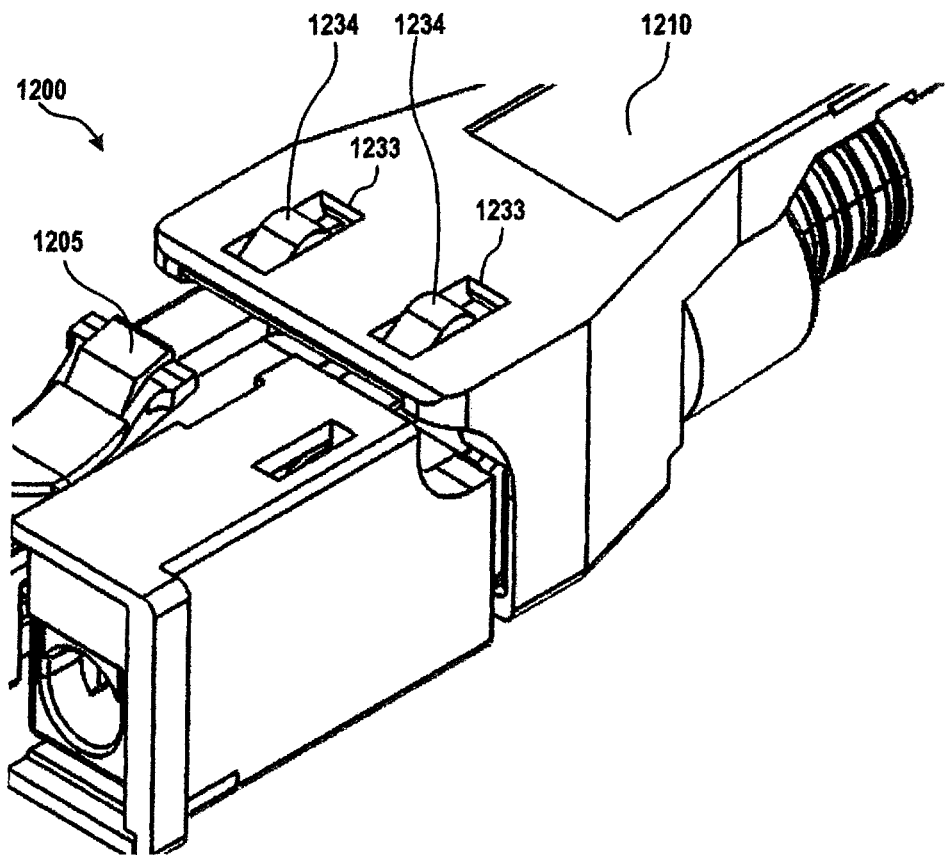
FIG. 12A depicts an illustrative view of a push-pull tab connected to a connector assembly according to an embodiment.
Figure 12B:
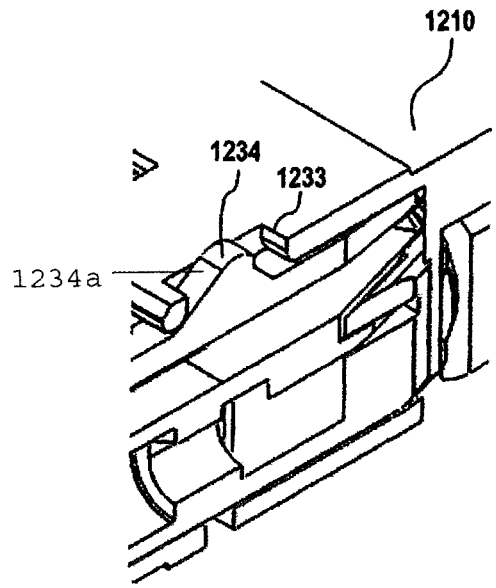
FIG. 12B depicts a detailed view of a portion of the illustrative view of a push-pull tab connected to a connector assembly according to an embodiment and shown in FIG. 12A.
Figure 12C:
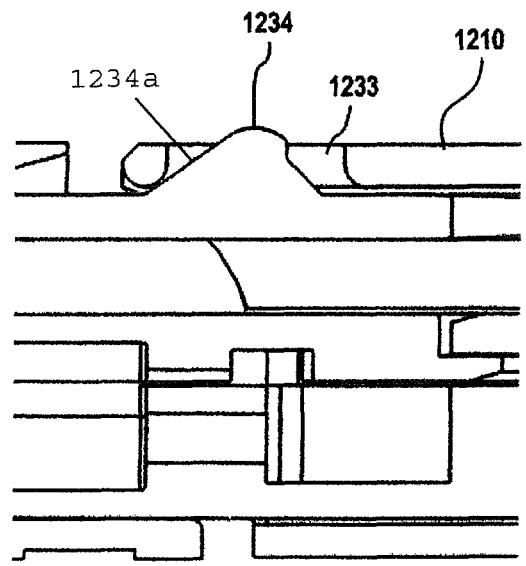
FIG. 12C depicts a detailed view of a portion of the illustrative view of a push-pull tab connected to a connector assembly according to an embodiment and shown in FIG. 12A.

For example, an as shown in FIGS. 12A-12C, some embodiments may have more than one protrusion 1234 and more than one window 1233. As depicted in FIG. 12A, when push-pull tab 1210 moved horizontally along the connector assembly 1200, the protrusion(s) 1234 impact the side of the window(s) 1233. As depicted in FIG. 12B, in some embodiments, when protrusions 1234 impact the edge of windows 1233, ramp portion 1234a of the protrusions slides along the edge of the windows and forces the connection device 1205 closer to the top housing component (not shown). When connection device 1205 is compressed (i.e., forced closer to the top housing component) connector assembly 1200, can be easily removed from a receiver (e.g., adapter and/or transceiver). As depicted in FIG. 12C cross section side view, ramp 1234a is being engaged by push-pull tab.

Figure 12D:
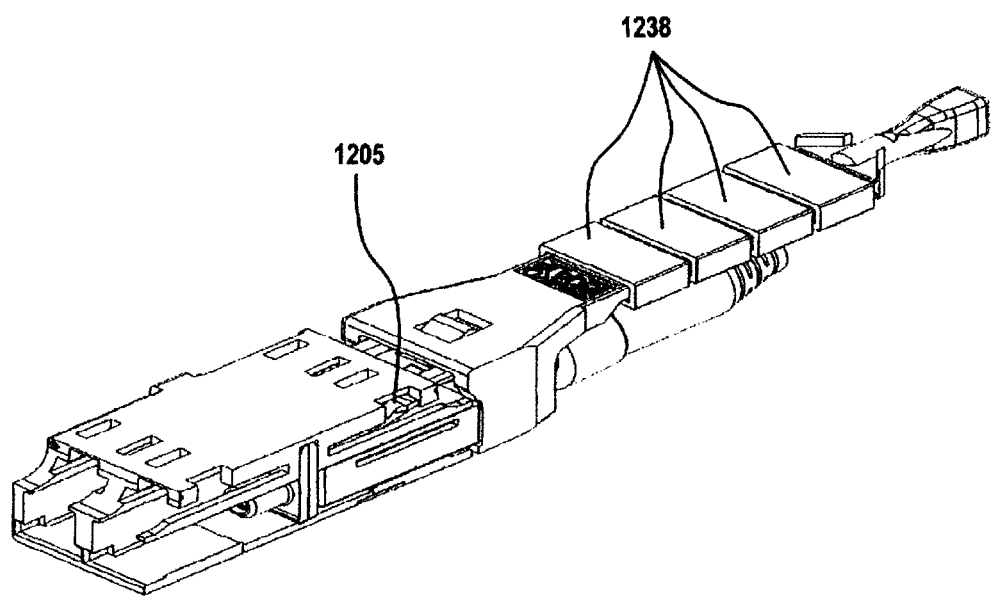
FIG. 12D depicts a connector installed in an adapter.

As shown in FIG. 12D, some embodiment may utilize identification tabs 1238 to identify a connector as inserted into an adapter/transceiver, via a connection device 1205 as shown. The identification tabs 1238 may be made of various materials and have various properties (i.e., color, etc.).

Figure 13:
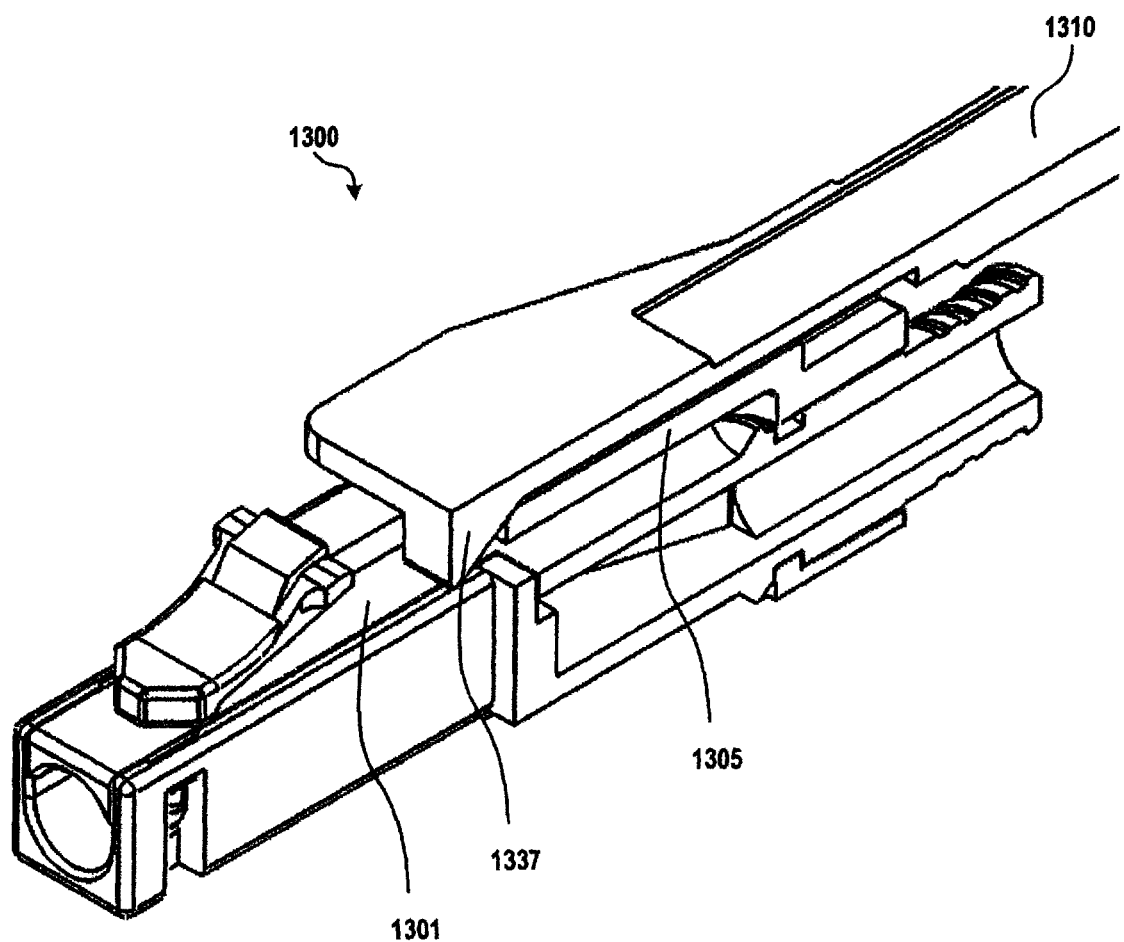
FIG. 13 depicts a cross-sectional view of a push-pull tab connected to a connector assembly according to an embodiment.

An alternative embodiment of a connector assembly 1300 is shown in FIG. 13 in a cross-sectional view. Accordingly, some embodiments, such as that shown in FIG. 13, may not utilize a protrusion/window arrangement as discussed herein. Instead, a push-pull tab 1310 may have an inverted ramp 1337 at the proximal end of the push-pull tab. Thus, when the push-pull tab 1310 is moved (e.g., horizontally to the connector assembly 1300) the inverted ramp 1337 impacts the connection device 1305 forcing the connection device down towards the top housing component 1301. When the connection device 1305 is compressed (i.e., forced closer to the top housing component 1301) the connector assembly 1300, can be easily removed from a receiver (e.g., adapter and/or transceiver).

Figure 14:
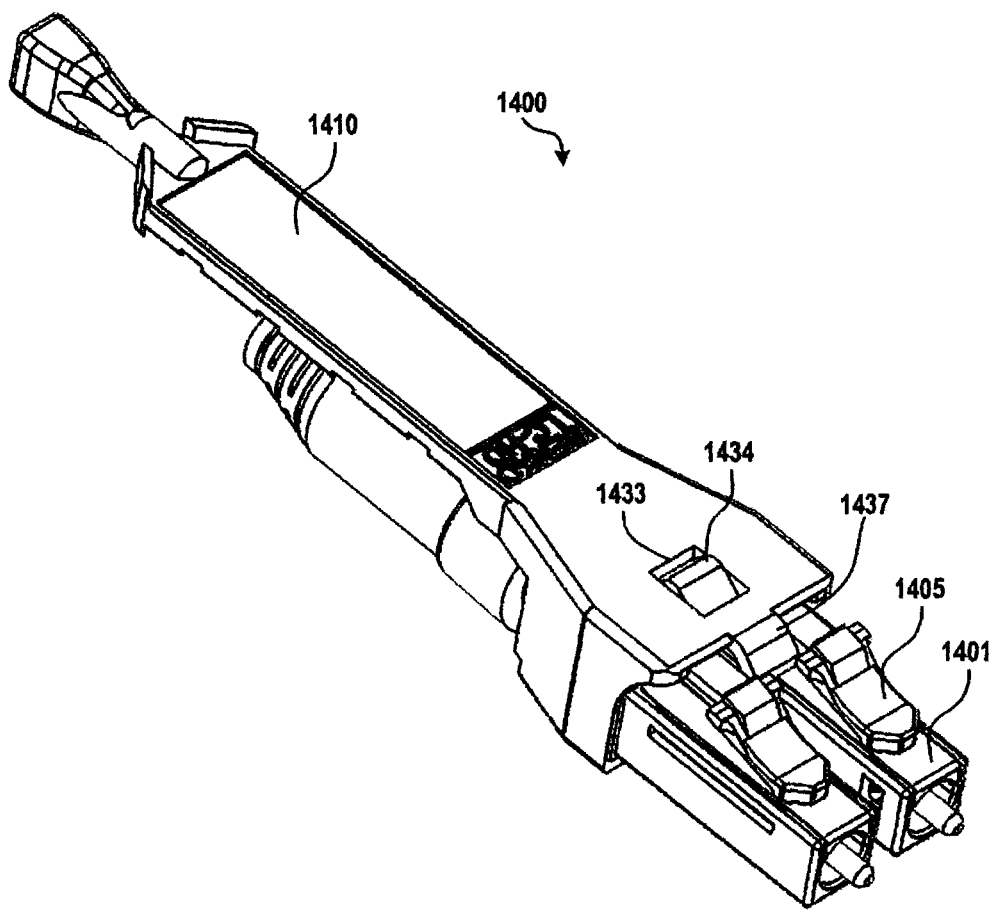
FIG. 14 depicts a perspective view of a push-pull tab connected to a connector assembly according to an embodiment.
Figure 15A:
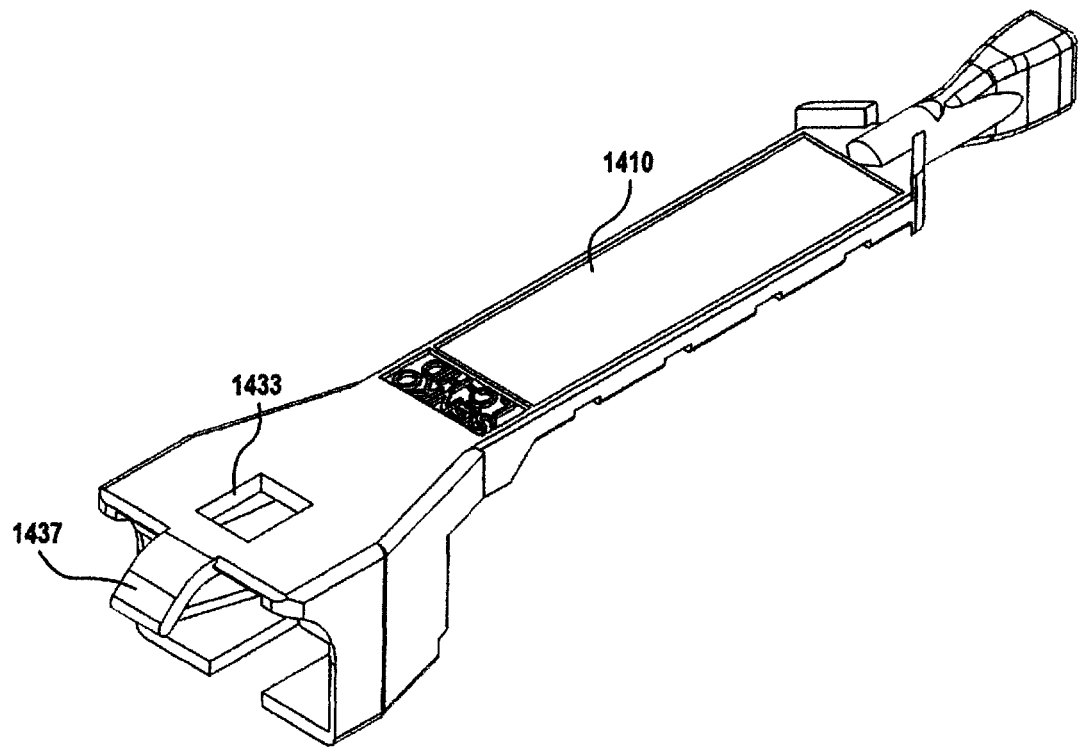
FIG. 15A depicts a perspective view of a push-pull tab according to an embodiment.
Figure 15B:
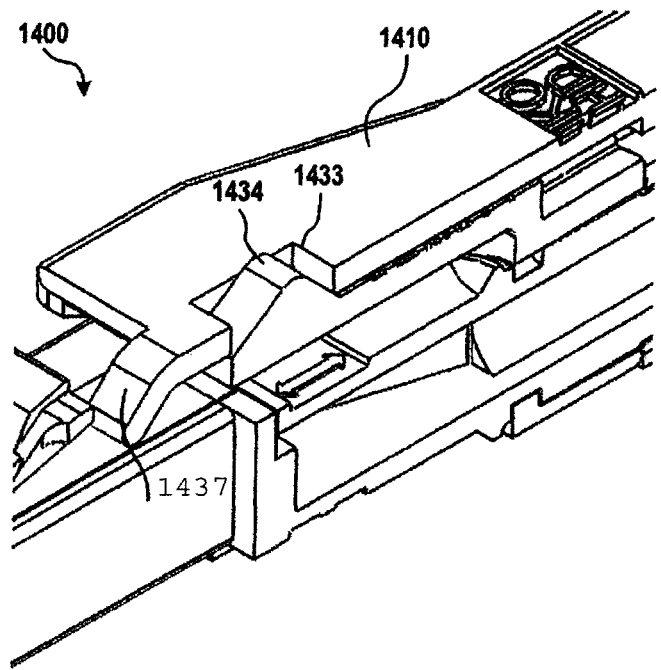
FIG. 15B depicts a detailed view of a push-pull tab connected to a connector assembly according to an embodiment.

A further alternative embodiment of a connector assembly 1400 is shown in FIG. 14. FIG. 14 depicts push-pull tab 1410 with protrusion 1434 thru window 1433. Push-pull tab 1410 is connected by inverted ramp 1437 to connection device 1405. Accordingly, some embodiments, such as that shown in FIG. 15B, may utilize both a protrusion 1434 and window 1433 arrangement as well as an inverted ramp 1437 (refer to FIG. 15A), at the proximal end of the push-pull tab. FIG. 15A depicts push-pull tab 1410 with window 1433 and inverted ramp 1437. As shown in FIG. 15B, when the push-pull tab 1410 is moved (e.g., horizontally to the connector assembly 1400) inverted ramp 1437 impacts the front connection device 1405 and the protrusion 1434 impact the edge of the window 1433 thus, similar to embodiments discussed previously, forcing the connection device down towards the top housing component 1401. When the connection device 1405 is compressed (i.e., forced closer to the top housing component 1401) connector assembly 1400, can be easily removed from a receiver (e.g., adapter and/or transceiver). Detailed views of the push-pull tab 1410 and a cross-sectional view of the connector assembly 1400 is presented in FIGS. 15A and 15B respectively.

Figure 17:
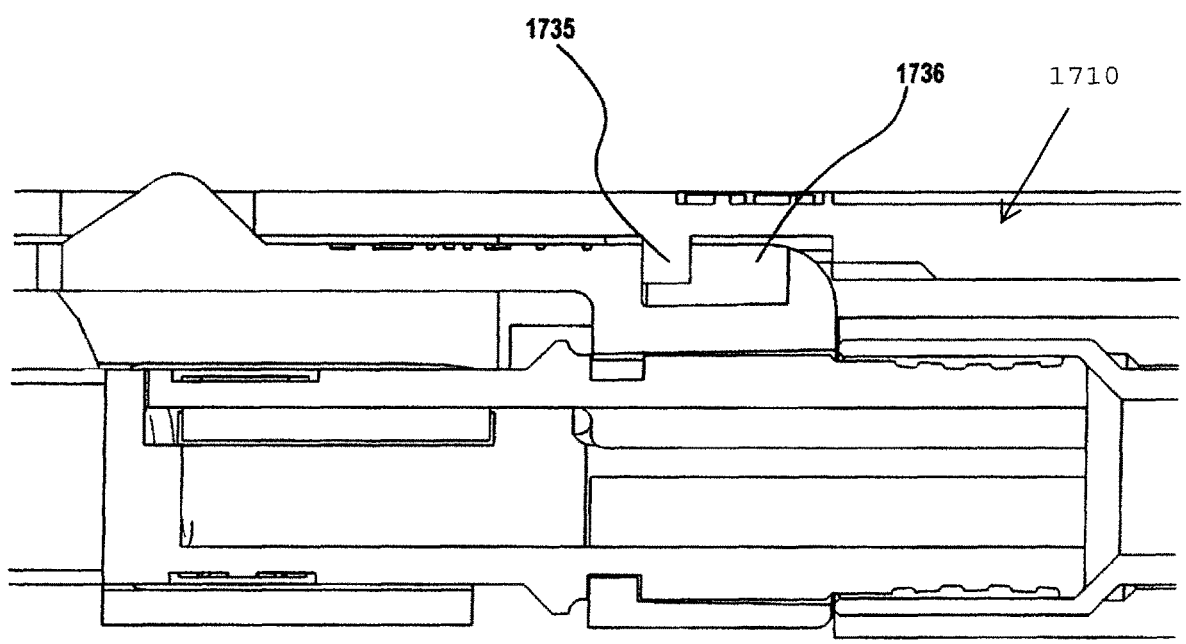
FIG. 17 depicts a detailed cross-sectional view of a small protrusion interacting with a small recess according to an embodiment.

In a further embodiment, such as that shown in FIGS. 16A-16B, in FIG. 16A push-pull tab 1610, may have a small protrusion 1635 on the underside of the push-pull tab. FIG. 16A.1 shows a detailed view of the small protrusion 1135 on the push-pull tab 1610. Refer to FIG. 16B, in some embodiments, the small protrusion 1635 is inserted into a recess 1636 on the connection device 1605. In some embodiments, this restricts the horizontal movement of the push-pull tab along the connector assembly (not shown). As shown in FIG. 17, the small protrusion 1735 easily fits into the recess 1736.

As shown in FIG. 17, the small protrusion 1735 is impacting the front wall of the recess 1736. This impact limits the forward movement of the push-pull tab 1710. This serves multiple functions in various embodiments. For example, the impact of the small protrusion 1735 with the recess 1736 allows a user to apply substantial forward force to the connector assembly (not shown) via the push-pull tab 1710.

Figure 18A:
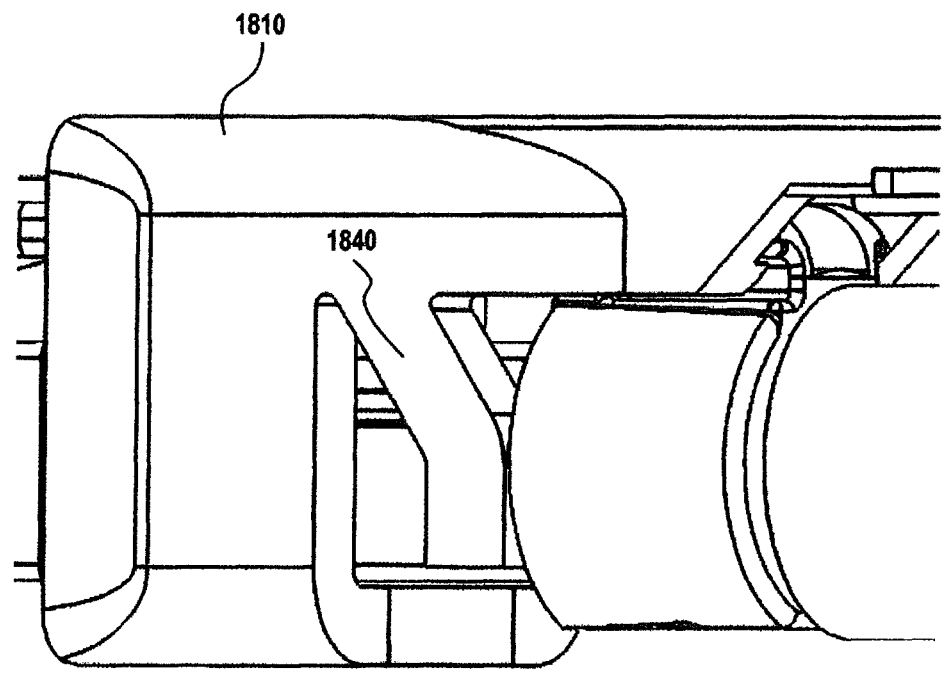
FIG. 18A depicts a perspective view of a tension bar on the push-pull tab.
Figure 18B:
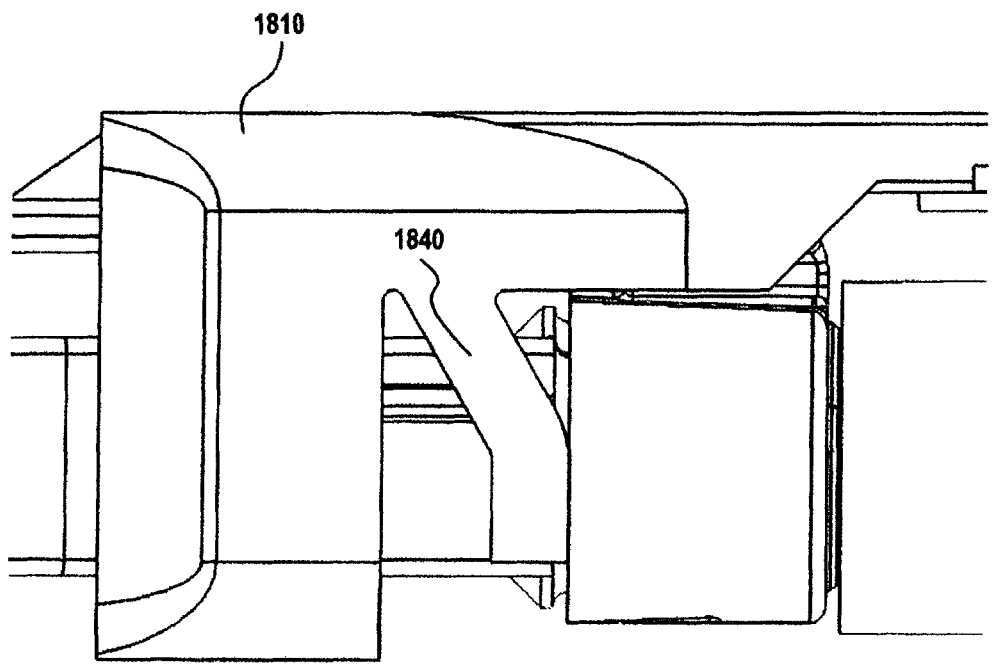
FIG. 18B depicts a side view of a tension bar on the push-pull tab.

Referring now to FIGS. 18A and 18B, as discussed herein, the push-pull tab 1810 may move in relation to the connector assembly (e.g., move horizontally with respect to the connector assembly). As depicted in FIG. 18A, in some embodiments, push-pull tab 1810 may have tension member 1840 which applies a biasing force against a portion of the connector assembly thus forcing the push-pull tab in one direction. The non-limiting example illustrated in FIGS. 18A and 18B, FIG. 18B depicts tension member 1840 applying a biasing force to move the push-pull tab 1810 toward the front of the connector assembly (i.e., the location of the ferrules). It should be understood that this is a non-limiting example, and that one or more tension members may be used, and that the biasing may be in different directions. Moreover, there may be tension members applying a biasing force in more than one direction or opposing directions. Additionally, as discussed herein, a spring system or any method of applying a biasing force may be utilized for the embodiments discussed herein.

Figure 19A:
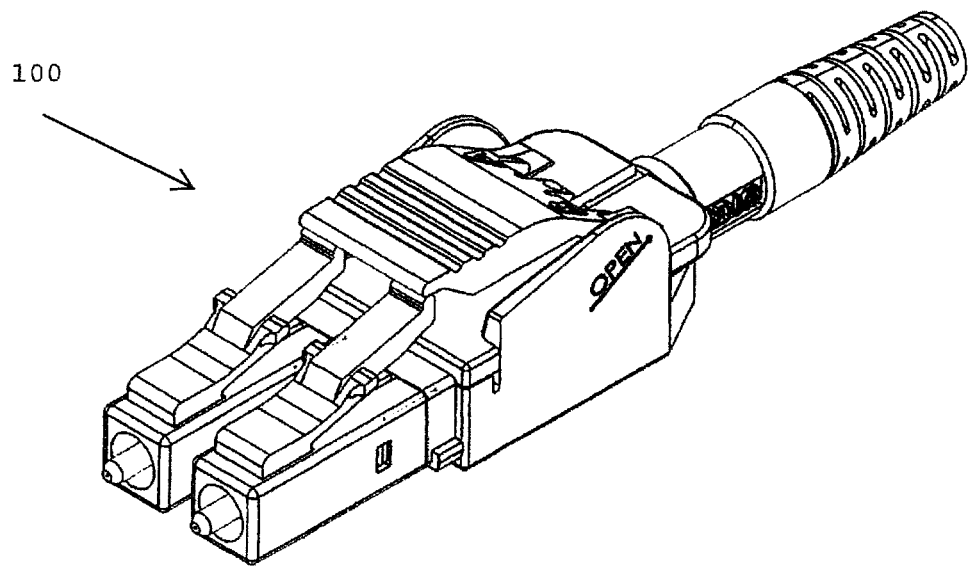
FIG. 19A depicts a perspective view of a connector assembly with a 6.25 mm pitch.
Figure 19B:
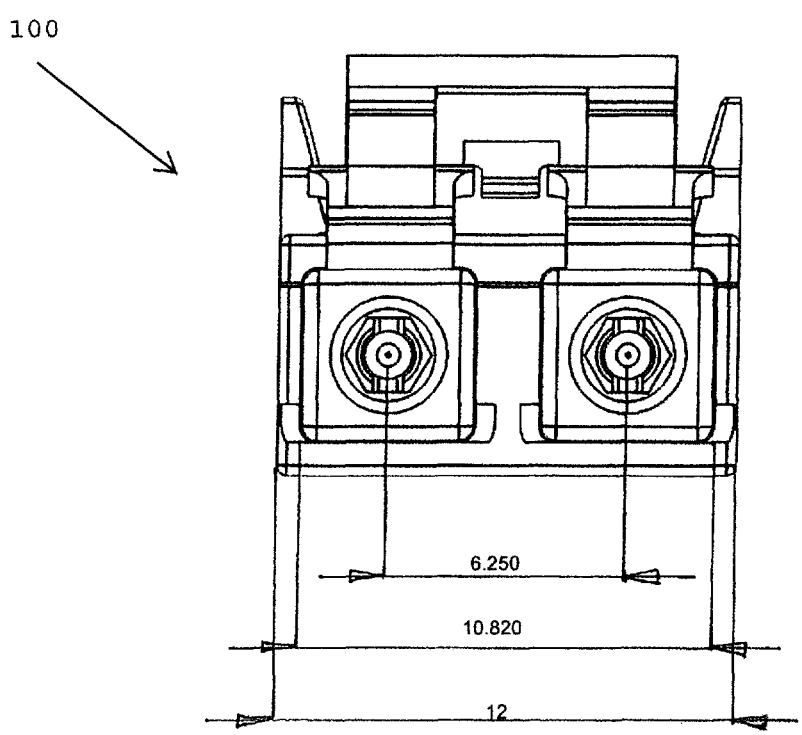
FIG. 19B depicts a front view of a connector assembly with a 6.25 mm pitch.

Referring now to FIGS. 19A and 19B, a connector is shown according to an embodiment. FIG. 19A depicts connector 100 of FIG. 1 assembled. In some embodiments, such as that shown in FIGS. 19A and 19B, a connector may have a ferrule to ferrule pitch of 6.25 mm, as shown in FIG. 19B. Still referring to FIG. 19B, the outer dimensions of the ferrule housing may be 10.82 mm, and the overall width dimension of the connector may be 12 mm. FIG. 19B is a front view of FIG. 19A.

Figure 20A:
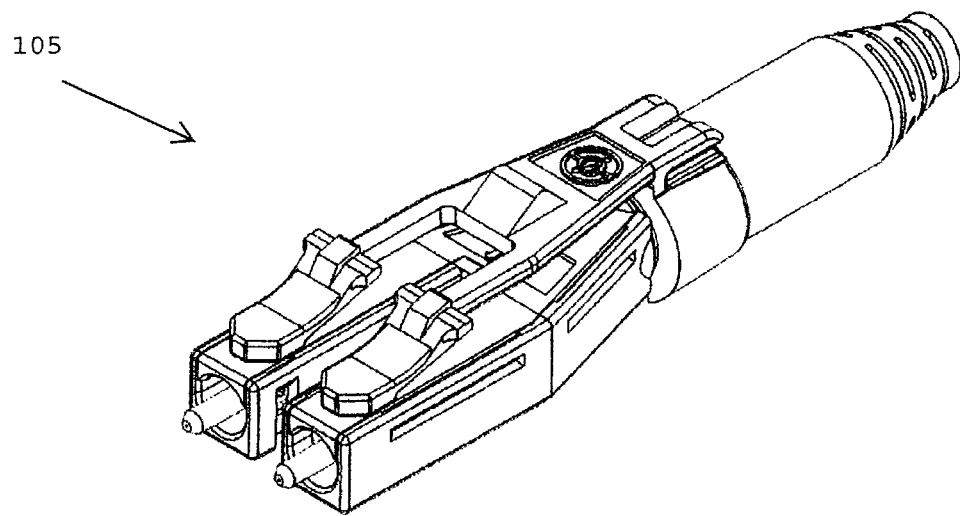
FIG. 20A depicts a perspective view of a connector assembly with a 6.25 mm pitch.
Figure 20B:
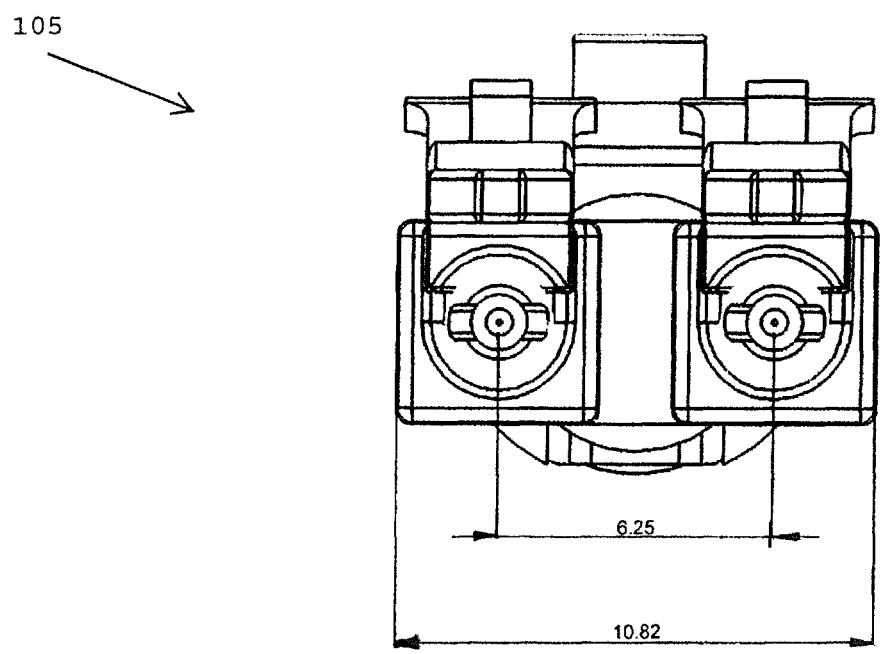
FIG. 20B depicts a front view of a connector assembly with a 6.25 mm pitch.

In an alternative embodiment, such as that shown in FIGS. 20A and 20B, some embodiments connector 105 may keep the 6.25 mm pitch between the ferrules (as shown in FIG. 20B), and even the 10.82 dimensions of the ferrule housing components, in order to remain within existing standards. However, the overall width dimension of the connector may be reduced to the existing dimension of the ferrule housing (e.g., 10.82 mm) (refer to FIG. 20B) instead of the 12 mm of FIGS. 19A and 19B. FIG. 20B is a front view of FIG. 20A connector 105. FIG. 20A is the connector described in FIGS. 9A-9C above.

Figure 21A:
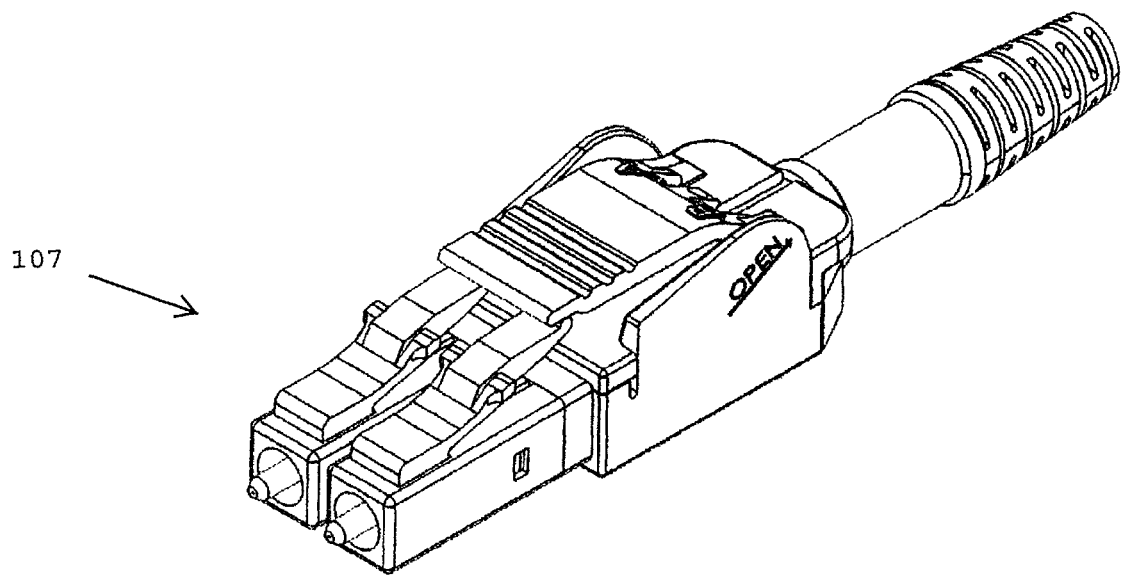
FIG. 21A depicts a perspective view of a connector assembly with a 5.25 mm pitch.
Figure 21B:
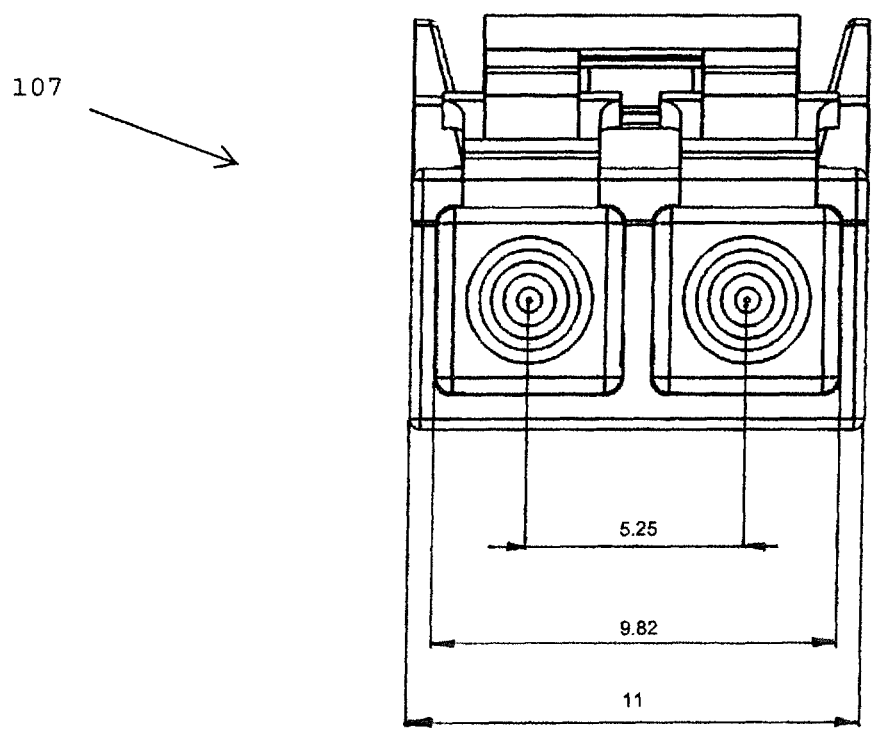
FIG. 21B depicts a front view of a connector assembly with a 5.25 mm pitch.

Referring now to FIGS. 21A and 21B, a connector 107 is shown according to an embodiment. FIG. 21A depicts connector as described in FIG. 1. In some embodiments, such as that shown in FIG. 21B, a connector may have a ferrule to ferrule pitch of 5.25 mm (i.e., 1 mm smaller than that of FIGS. 19A, 19B, 20A, and 20B). In a further embodiment, the outer dimensions of the ferrule housing may be 9.82 mm, and the overall width dimension of the connector may be 11 mm, as depicted in FIG. 21B. FIG. 21B is a front view of FIG. 21A connector 107.

Figure 22A:
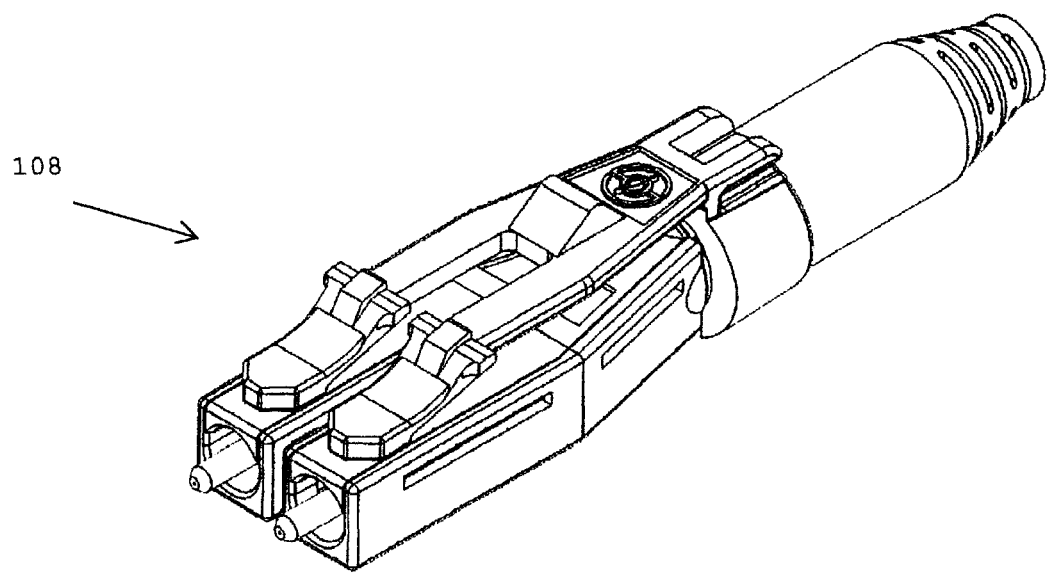
FIG. 22A depicts a perspective view of a connector assembly with a 5.25 mm pitch.
Figure 22B:
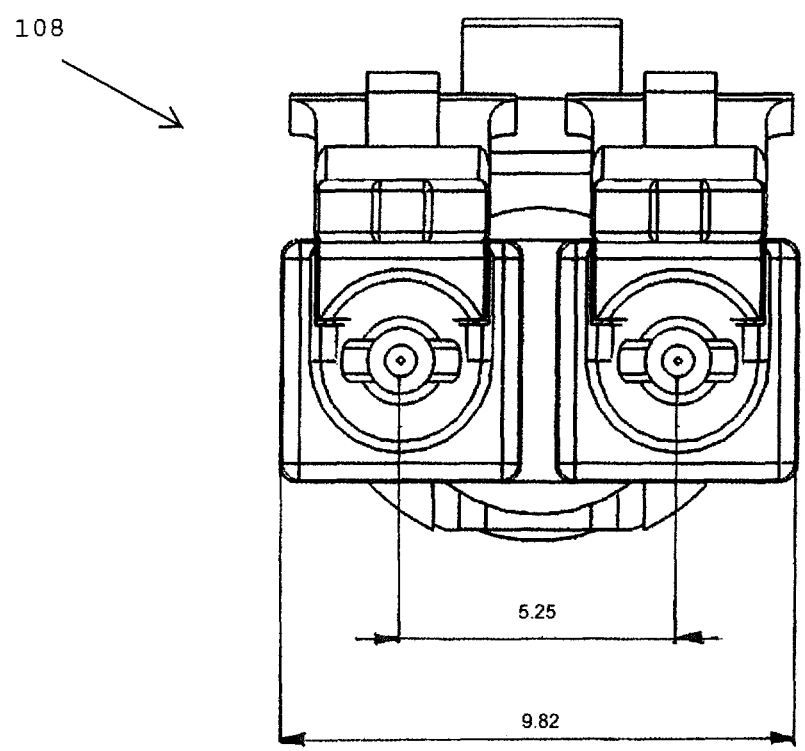
FIG. 22B depicts a front view of a connector assembly with a 5.25 mm pitch.

In an alternative embodiment, connector 108 such as that shown in FIGS. 22A and 22B, FIG. 22A is the connector described in FIGS. 9A-9C. In FIG. 22B, some embodiments may keep the 5.25 mm pitch between the ferrules, and even the 9.82 dimensions of the ferrule housing components, in order to remain within existing standards. As depicted in FIG. 22B, however, the overall width dimension of the connector may be reduced to the existing dimension of the ferrule housing (e.g., 9.82 mm) instead of the 11 mm of FIGS. 21A and 21B. FIG. 22B is a front view of FIG. 22A.

Figure 23A:
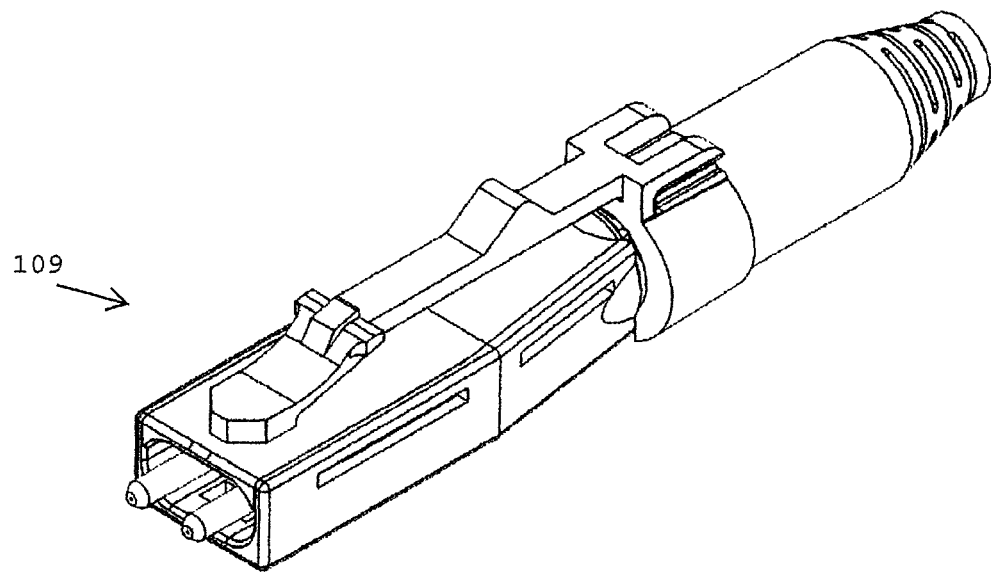
FIG. 23A depicts a perspective view of a connector assembly with a 3.4 mm pitch.
Figure 23B:
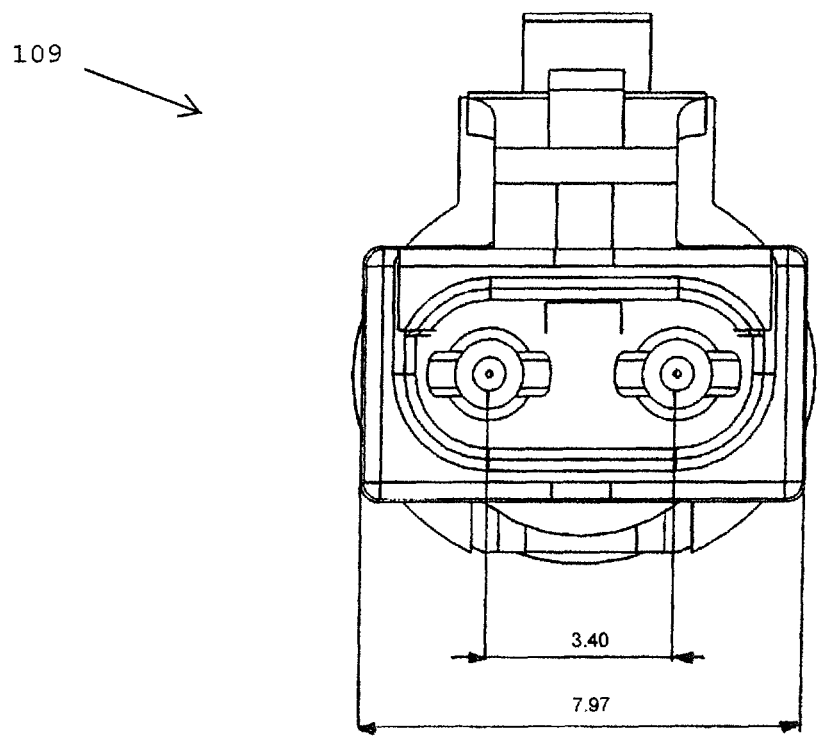
FIG. 23B depicts a front view of a connector assembly with a 3.4 mm pitch.

Referring now to FIGS. 23A and 23B, a connector 109 is shown according to an embodiment. In some embodiments, such as that shown in FIGS. 23A and 23B, a miniature footprint connector may have a ferrule to ferrule pitch of 3.4 mm, as shown in FIG. 23B. In a further embodiment, the outer dimensions of the ferrule housing may be 7.97 mm. FIG. 23B is a front view of FIG. 23A.

Figure 24A:
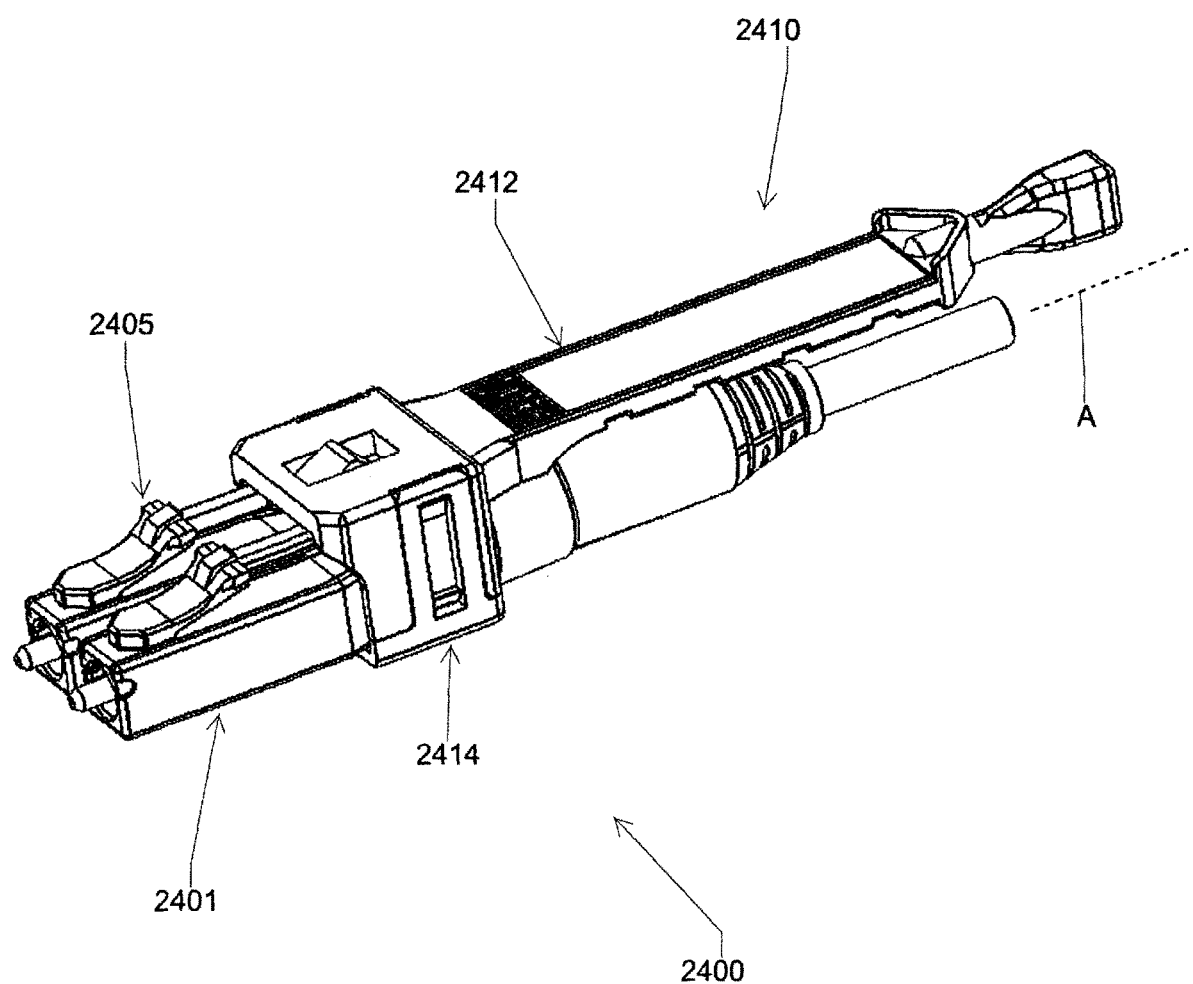
FIG. 24A is a perspective of another embodiment of an optical fiber connector.
Figure 24C:
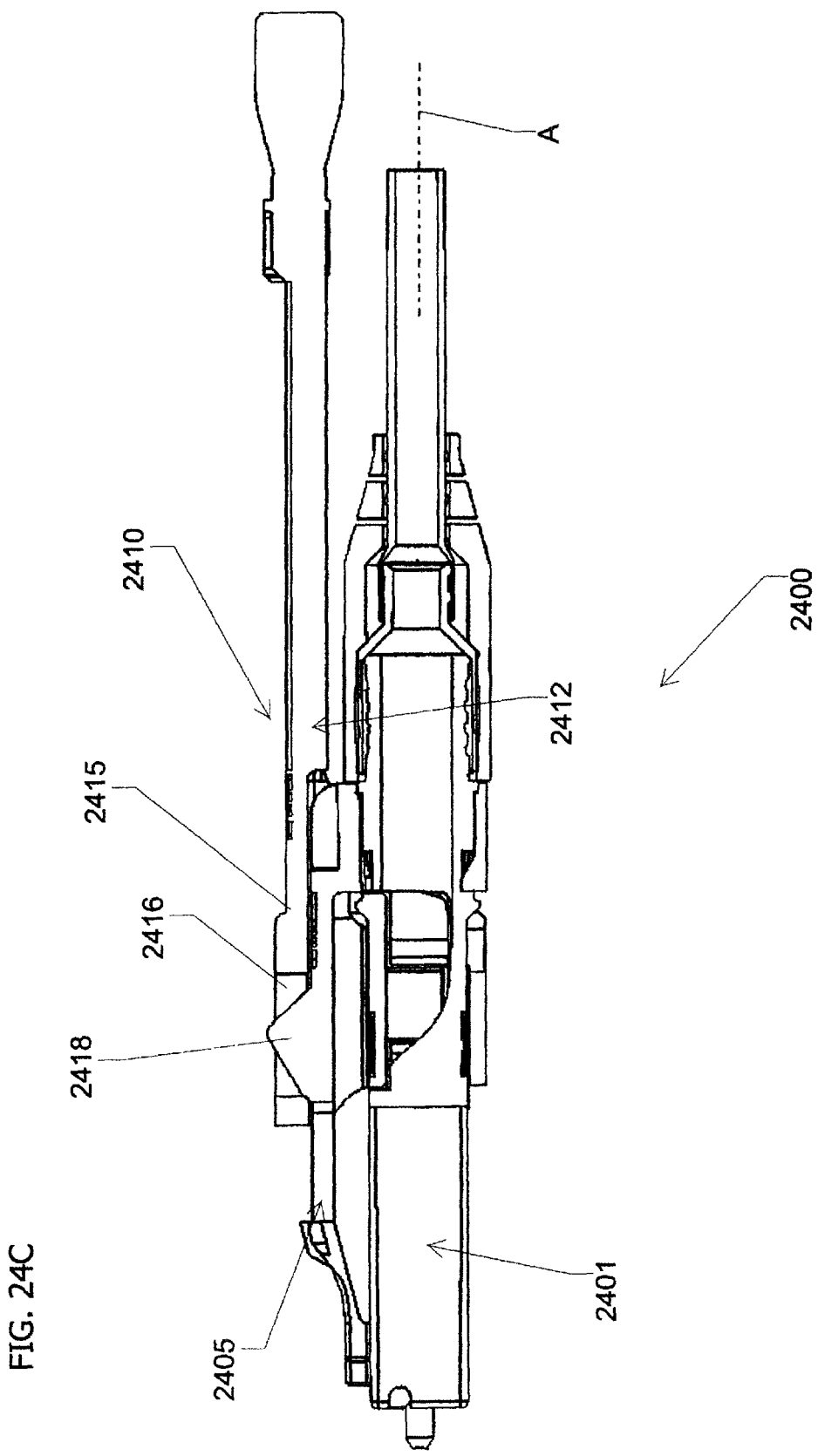
FIG. 24C is a section taken through the plane of line 24C-24C of FIG. 24B.
Figure 24D:
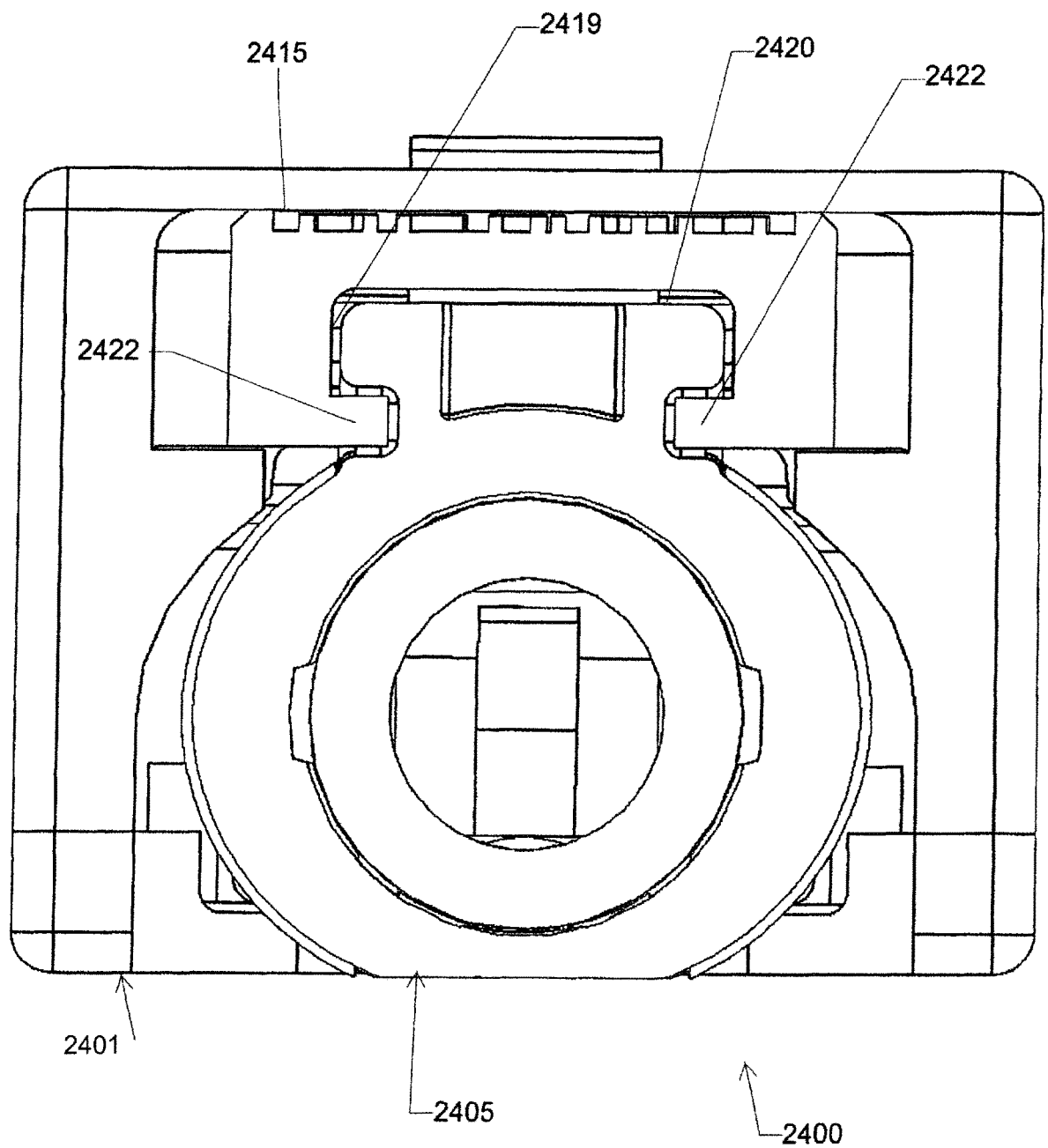
FIG. 24D is a section taken through the plane of line 24D-24D of FIG. 24B.

Referring to FIGS. 24A-24B, another embodiment of an optical fiber connector assembly is generally indicated at reference number 2400. Like the optical fiber connector assemblies discussed above, in FIG. 24A illustrated optical fiber connector assembly 2400 comprises housing 2401 that is configured to support one or more optical fiber ferrules and to be inserted into a receiver to establish an optical connection. The connector assembly 2400 also comprises connection member 2405 configured to lockingly engage a locking element of a receiver to lock the optical fiber connector into the receiver. The connector assembly 2400 further comprises a manipulator assembly 2410, which (except as described below) functions generally the same as the push-pull tabs described above. FIG. 24B shows connector assembly 2400 with section cuts along A-A, which is depicted in FIG. 24C, and a cross section as shown in FIG. 24D. FIG. 24C depicts along line A-A, connector assembly 2400 with manipulator assembly 2410, second locking member 2415, housing 2401, connection member 2405, protrusion 2418, and window 2416.

Referring to FIG. 24D, connection member 2405 is configured to rotate with respect to the housing 2401 about an axis of rotation A to change the polarity of the connector. Axis A is depicted in FIG. 24C. Referring to the orientation of the connector assembly 2400 as shown in FIG. 24A, FIG. 24D connector assembly has a first polarity orientation when the locking tabs/hooks or tongues 2420 of the connection member 2405 are angularly positioned at the top of the housing 2401, when tongue 2420 is position within a groove 2419 formed by lips 2422 and has a second polarity orientation when the locking tabs/hooks are angularly positioned at the bottom of the housing. It will be appreciated that the polarity orientations are relative angular orientations between the housing 2401 and the connection member 2405. The overall orientation of the connector assembly 2400 can vary in use. The terms "top" and "bottom" are used for convenience to describe locations of parts in relation to certain drawing figures. However, there is no absolute requirement that the parts have these positions in different reference frames or in use of the optical fiber connector assembly. FIG. 24B depicts connector 2400 cross-section cuts at 24D and 24C.

Figure 24E:
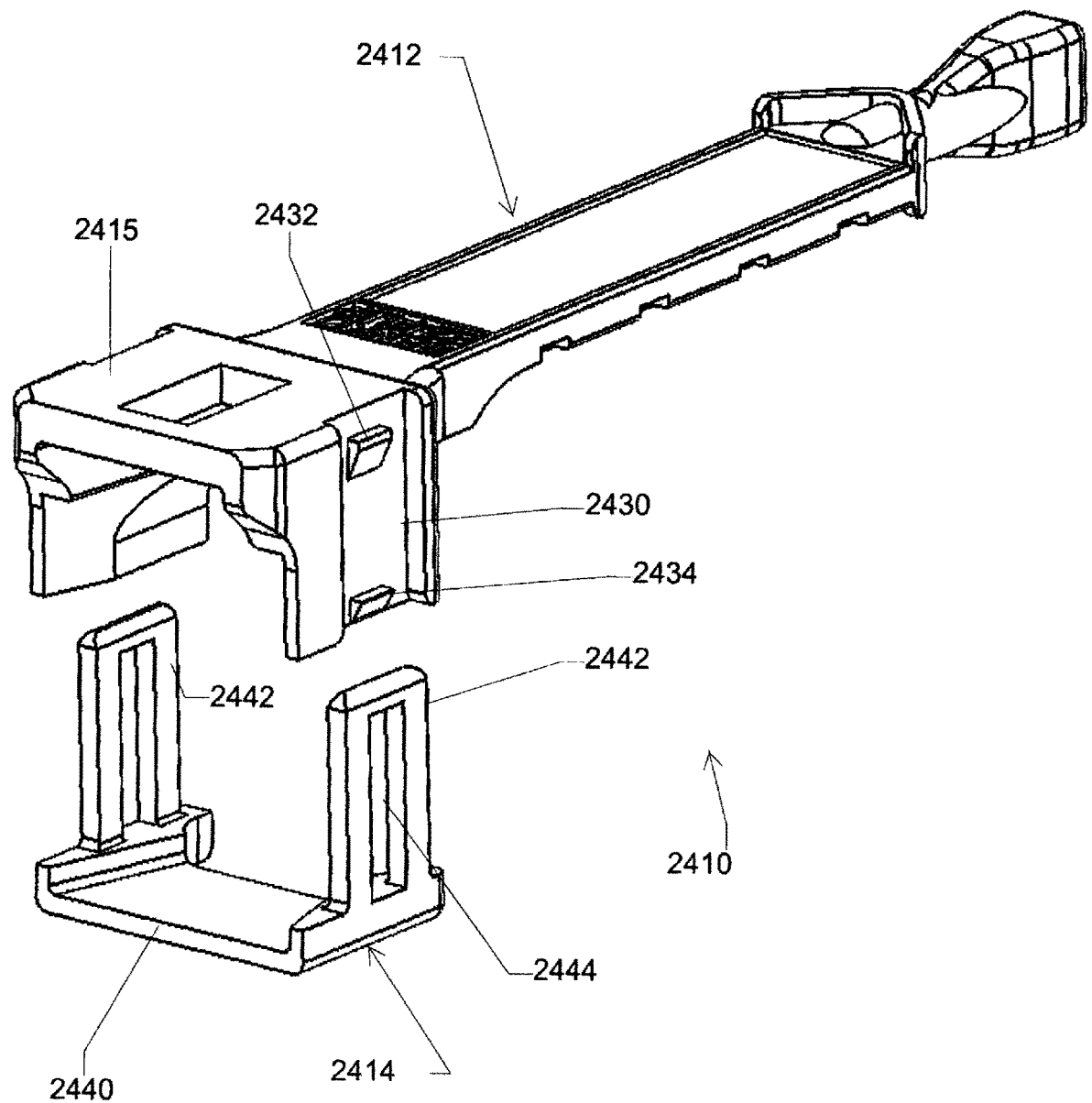
FIG. 24E is an exploded perspective of a manipulator assembly of the optical fiber connector of FIG. 24A.
Figure 24F:
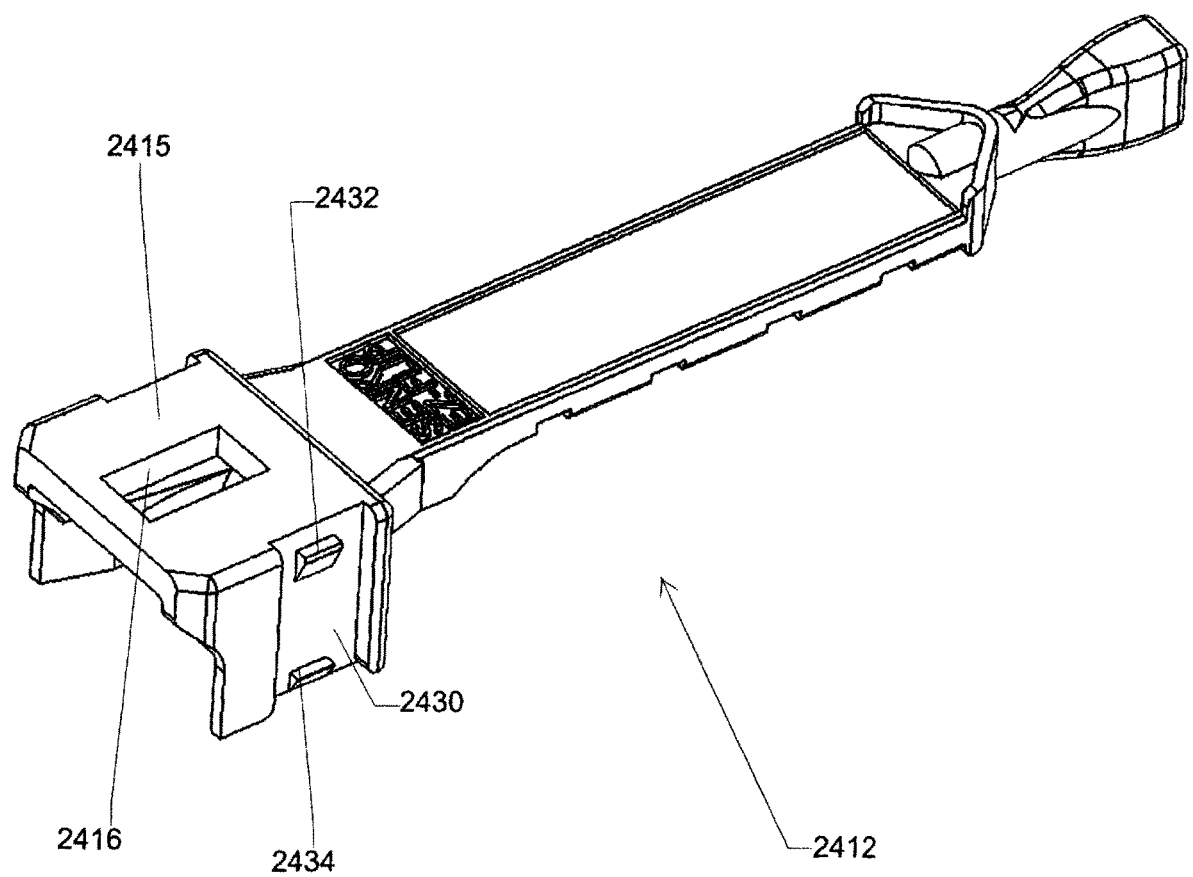
FIG. 24F is a perspective of a tab member of the manipulator assembly.

Referring to FIGS. 24C-24G, FIG. 24C depicts manipulator assembly 2410 coupled to the connection member 2405 such that the manipulator assembly and the connection member rotate conjointly about the axis of rotation A with respect to the housing 2401. FIG. 24E, in the illustrated manipulator assembly 2410 comprises tab member 2412 and a separate first locking member 2414. The tab member 2412 is configured to lockingly engage connection member 2405 to couple manipulator assembly 2410 to the connection member. Refer to FIG. 24F, like certain push-pull tabs described above, the tab member 2412 has a front end portion including a second locking member 2415 that defines a window 2416 that is configured to receive a protrusion 2418 of the connection member 2405 therein (also see FIG. 24C). FIG. 24F further shows side wall 2430 with locking tabs 2432. In the illustrated embodiment, the window 2416 is formed in a top wall of the second locking member 2415, at FIG. 24G. Referring to FIG. 24C, protrusion 2418 received in the window 2416 limits axial or lengthwise movement of the manipulator assembly 2410 with respect to the connection member 2405 along the axis of rotation A. If the user pushes the tab member 2412 forward, the forward force is transmitted to the connection member 2405 and the housing 2401. Likewise, if the user pulls the tab member 2412 rearward, the rearward force is transmitted to the connection member 2405 and the housing. Thus, a user can insert the connector assembly 2400 into a receiver and withdraw the connector assembly from the receiver by imparting push/pull forces on the tab member 2412.

Referring to FIG. 24D, to further connect the tab member 2412 to the connection member 2405, a bottom portion of the second locking member 2415 of the tab member defines a groove 2419 that is configured to receive a tongue 2420 of the connection member therein (FIG. 24D). In the illustrated embodiment depicted at FIG. 24D, tongue 2420 has a T-shaped cross-sectional shape and the tab member 2412 comprises lips 2422 that are configured to be received beneath lateral end segments of the top portion of the tongue 2420. The tongue 2420 being received in groove 2419 limits angular movement of the tab member 2412 with respect to the connection member 2405 about the axis of rotation A.

Figure 24G:
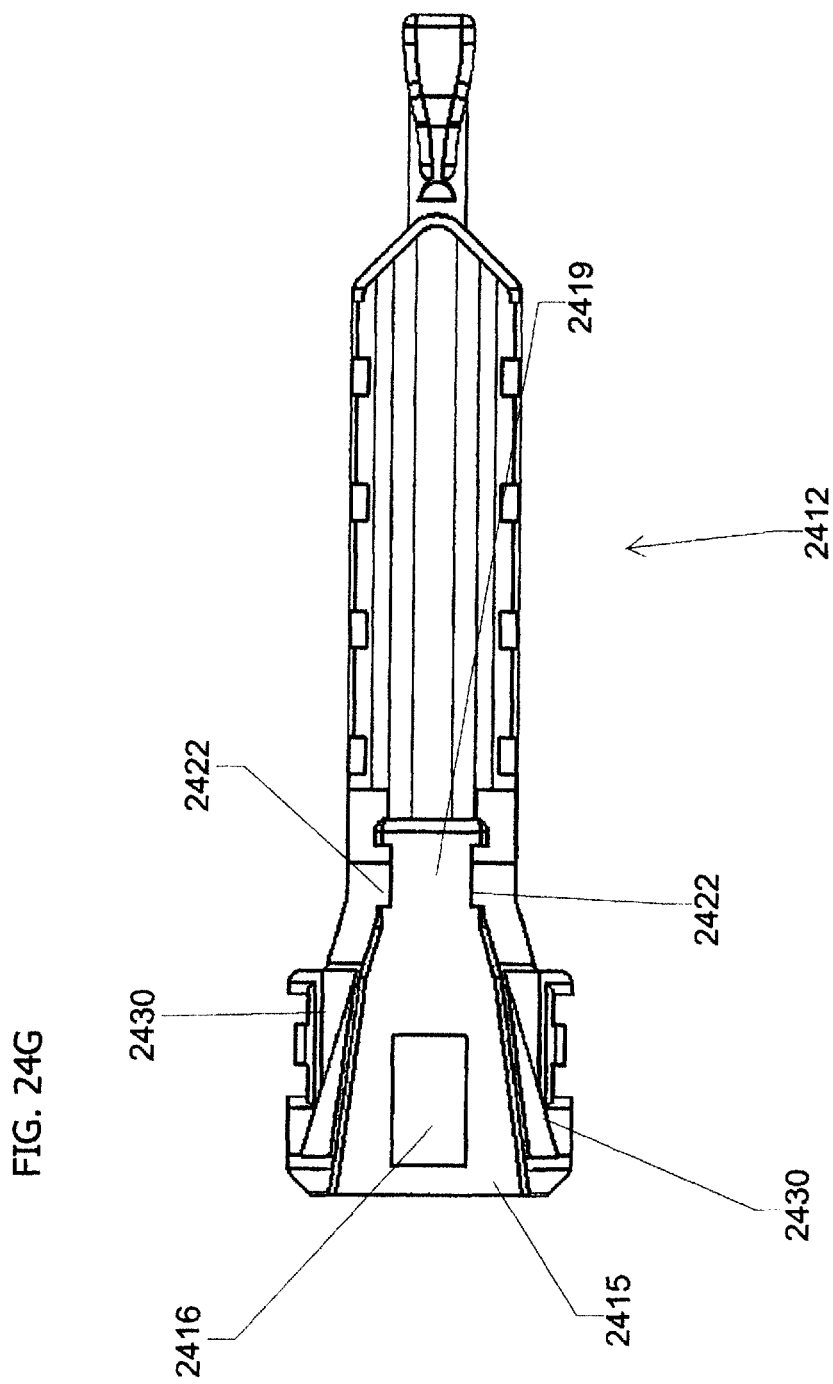
FIG. 24G is a bottom plan view of the tab member.

Referring to FIGS. 24E-24I, FIG. 24E and FIG. 24H depict locking member 2414 is movable with respect to the tab member 2412 between a locked position (in FIG. 24I) and an unlocked position (in FIG. 24J). In FIG. 24E, second locking member 2415 has side walls 2430 that extend downward from the top wall of the second locking member. The side walls 2430 are configured to lockingly engage the first locking member 2414 in the locked position to hold the first locking member in the locked position. In FIG. 24F, side walls 2430 are also configured to guide movement of the first locking member 2414 with respect to the tab member 2412 between the locked position and the unlocked position. In FIG. 24G, side walls 2430 are further configured to connect tab member 2412 to the first locking member 2414 when the first locking member is in the unlocked position. In FIG. 24E, side walls 2430 define vertical grooves forming races that guide movement of the first locking member 2414 between the locked and unlocked positions. In addition, the side walls define upper and lower locking tabs 2432, 2434. Each of the locking tabs 2432, 2434 has a bottom surface that is slanted with respect to the respective side wall 2430 and a top surface that is substantially perpendicular to the respective side wall.

Figure 24H:
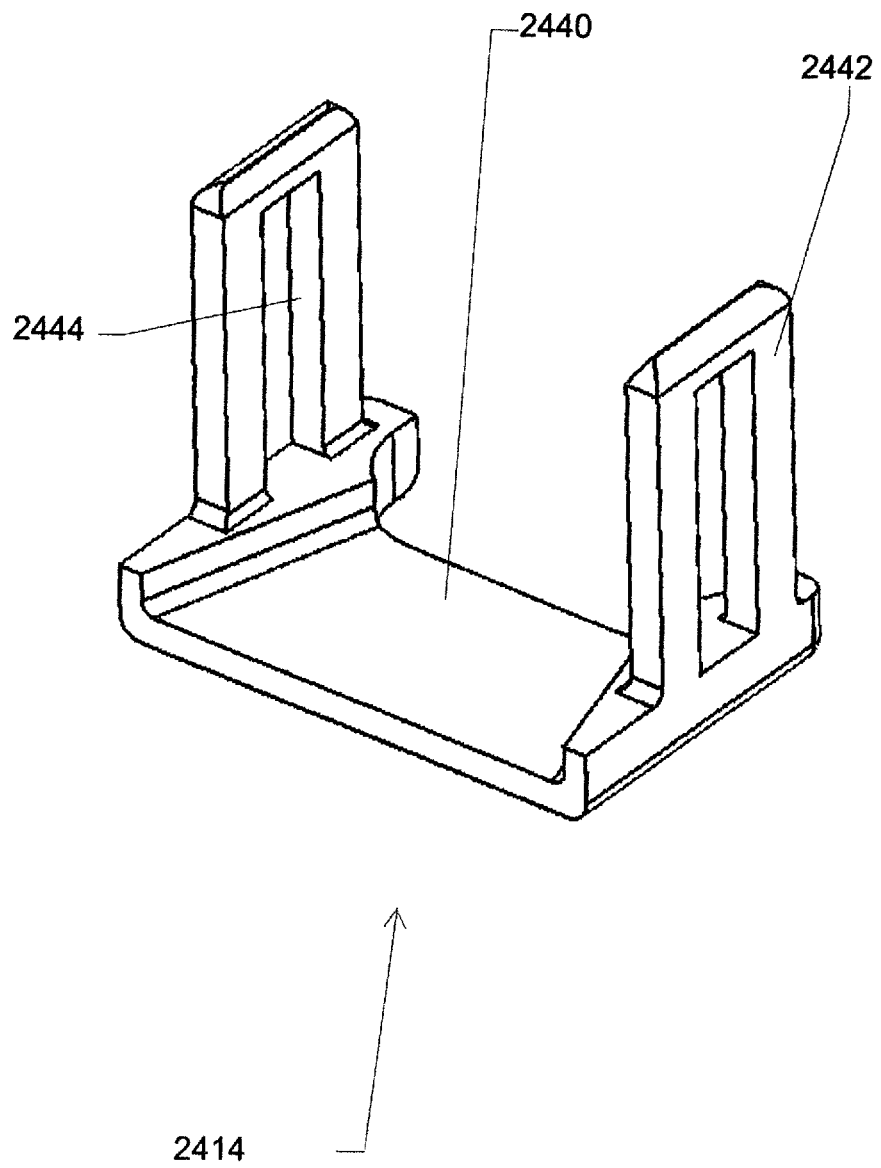
FIG. 24H is a perspective of a locking member of the manipulator assembly.
Figure 24I:
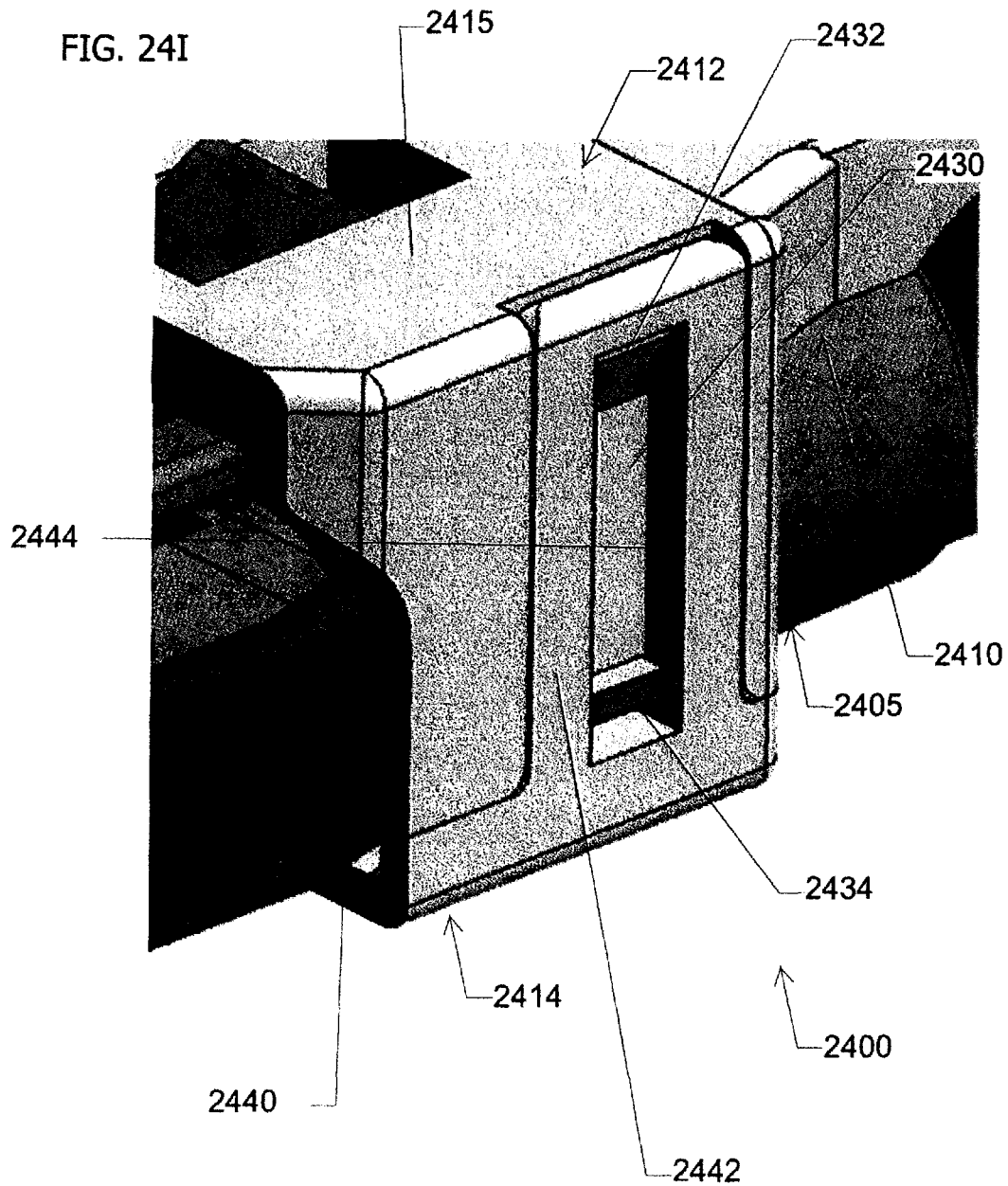
FIG. 24I is an enlarged fragmentary perspective of a portion of the optical fiber connector of FIG. 24A, illustrating a side of the manipulator assembly in a locked configuration.

FIG. 24H depicts, first locking member 2414 is generally U-shaped and comprises a bottom wall 2440 and first and second side walls 2442 extending up from the bottom wall. Bottom wall 2440 defines a tapered groove that is configured to receive a rear end portion of the housing 2401 therein when the first locking member 2414 is in the locked position. When the rear end portion of the housing 2401 is received in the tapered groove of the bottom wall 2440 in the locked position, the manipulator assembly 2410 engages the housing to prevent rotation of the manipulator assembly (and connection member 2405) with respect to the housing. Referring to FIG. 24I, side walls 2442 are shaped and arranged to be slidably received in the grooves formed in the tab member side walls 2430. Each side wall 2442 defines a vertical recess 2444 (e.g., opening) and has a top end portion above the vertical recess. The recesses 2444 are configured to slidably receive the locking tabs 2432, 2434 of the tab member 2412 therein.

FIG. 24J depicts, side walls 2430, 2442 of the tab member 2412 and the first locking member 2414 are configured to (i) guide movement of the first locking member relative to the tab member (ii) connect the first locking member to the tab member in the locked and unlocked positions. Unlocked position as shown in FIG. 24J, with first locking member 2414 open and locking tab 2434 at top of side wall 2442. As shown in FIG. 24I, in the locked position of the first locking member 2414, each of the locking tabs 2432, 2434 of each tab member side wall 2430 is received in the recess 2444 and the top end portions of the side walls 2442 lockingly engage the top surfaces of the upper locking tabs 2432. Referring to FIG. 24K, to unlock the first locking member 2414 from the tab member 2412, the top end portions of the side walls 2442 are resiliently bent laterally outward to release the upper locking tab 2432. Subsequently, the first locking member side walls 2442 can slide downward in the grooves defined in the tab member side walls 2430 to the unlocked position. In the unlocked position, the top portions of the first locking member side walls 2442 engage the top surfaces of the lower tab member 2434 to maintain the connection between the tab member 2412 and the first locking member 2414.

Figure 24L:
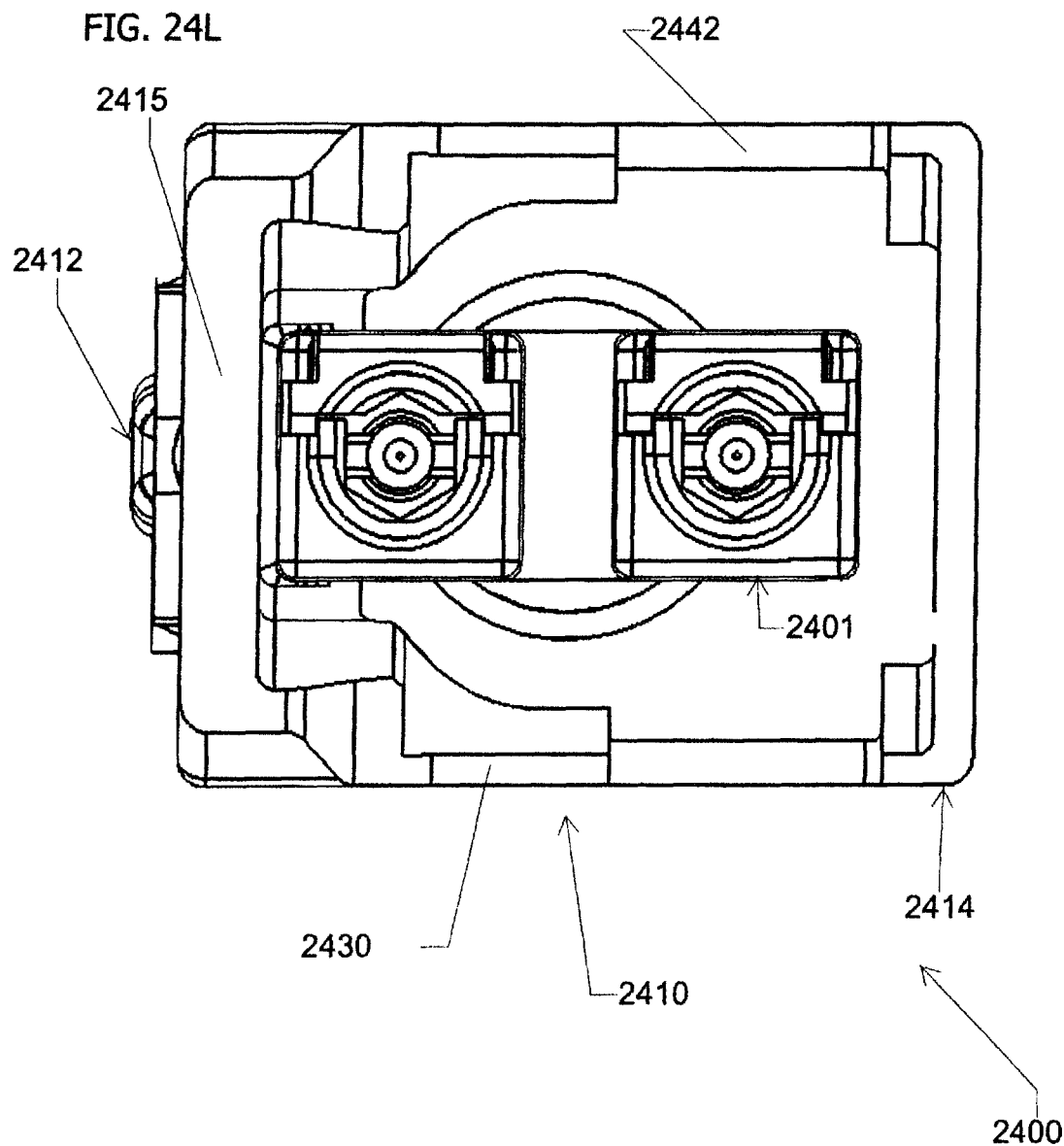
FIG. 24L is a front end elevation of the optical fiber connector of FIG. 24A in the orientation of FIG. 24K.
Figure 24M:
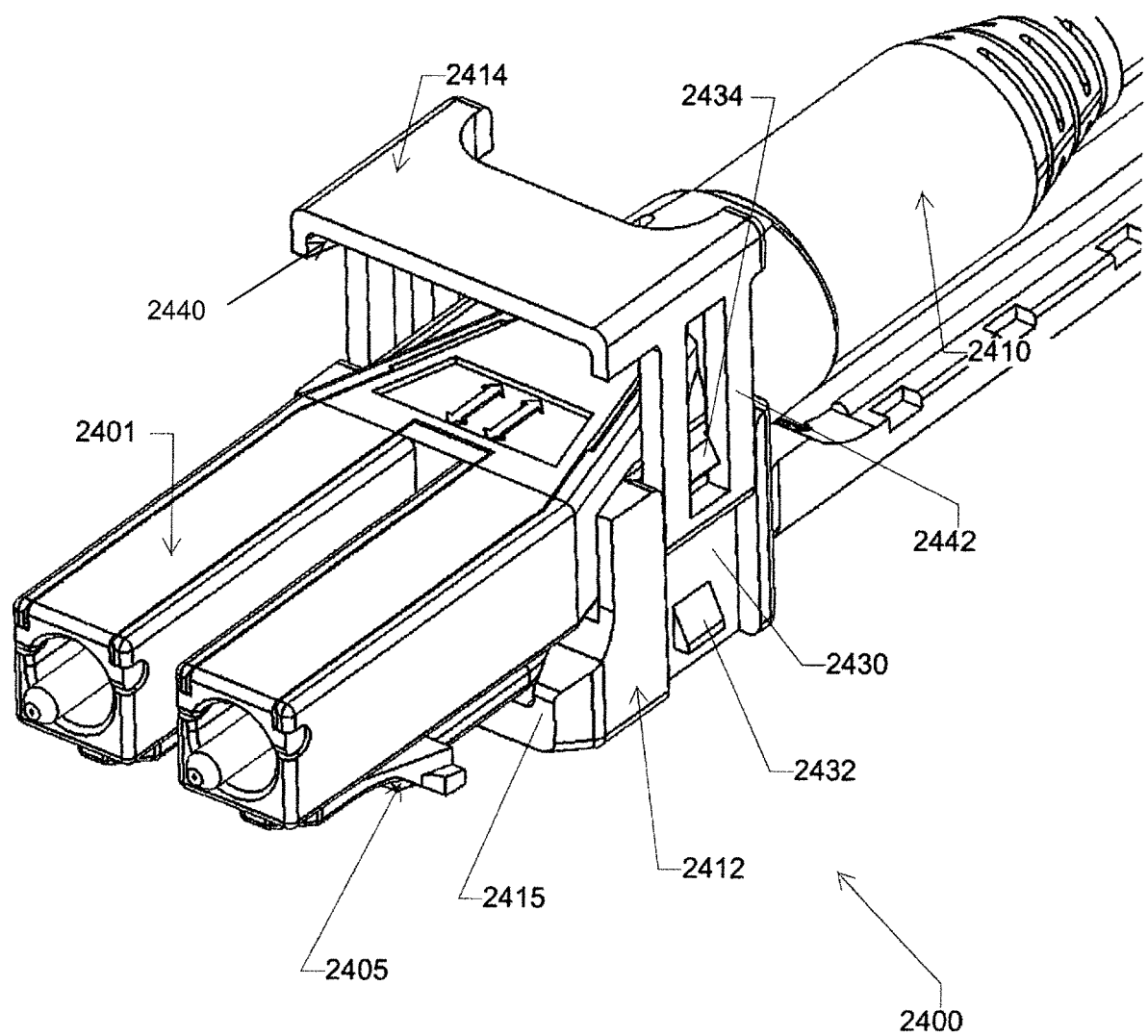
FIG. 24M is an enlarged fragmentary perspective similar to FIG. 24J illustrating the manipulator assembly in an unlocked configuration at the second polarity orientation.
Figure 24N:
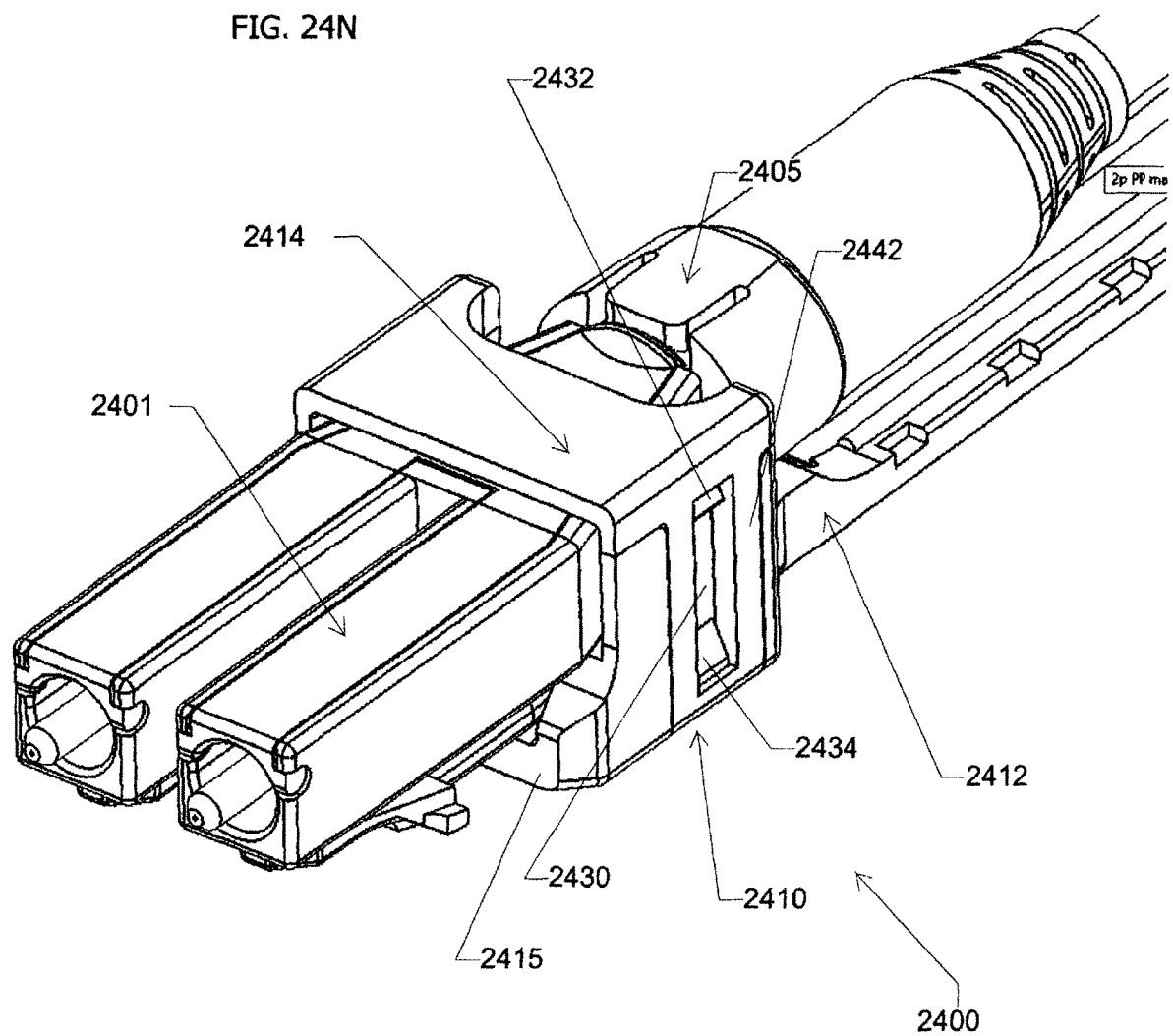
FIG. 24N is an enlarged fragmentary perspective similar to FIG. 24J illustrating the manipulator assembly in a locked configuration at the second polarity orientation.

Referring to FIGS. 24I-24N, referring to FIG. 24N in the locked position of the manipulator assembly 2410 (also FIG. 24I), the rear portion of the connector housing 2401 is captured between the closely spaced wall 2440 of the first locking member 2414 and opposed wall of the second locking member 2415 such that relative rotation between the manipulator assembly and the housing is inhibited in FIGS. 24I and 24N. Referring to FIG. 24M, in the unlocked position of the manipulator assembly 2410 (also FIG. 24J), bottom wall 2440 of the first locking member 2414 is spaced apart from the opposed wall of the second locking member 2415 by a greater distance such that the manipulator assembly can rotate about the rear end portion of the housing 2401. The first locking member 2414 is retained in connection with the second locking member 2415 by engagement of the resilient side walls 2442 with the lower locking tab 2434. And since the manipulator assembly 2410 is coupled to the connection member 2405 for conjoint rotation therewith, the unlocked manipulator assembly can be rotated to rotate connection member from a first polarity orientation (FIG. 24J) with respect to the housing 2401, through a range of motion that can include the angular positions shown in FIGS. 24L and 24M, to a second polarity orientation (FIG. 24M). FIG. 24L depicts side walls 2442 of first locking member 2414 downward in sidewall grooves 2430 in an unlocked position. In FIG. 24N, to fix the connection member 2405 in the second polarity orientation, the user pushes the first locking member 2414 to the locked position. The side walls 2442 snap over the upper locking tabs 2432 as the first locking member 2414 is pushed toward the second locking member 2415.

Referring to FIGS. 25A-25D, another embodiment of an optical fiber connector assembly is generally indicated at reference number 2500. Like the optical fiber connector assemblies discussed above, FIG. 25A depicts illustrated optical fiber connector assembly 2500 comprises housing 2501 that is configured to support one or more optical fiber ferrules and be inserted into a receiver to establish an optical connection. The connector assembly 2500 also comprises connection member 2505 configured to lockingly engage a locking element of a receiver to lock the optical fiber connector into the receiver. The connector assembly 2500 further comprises a manipulator assembly 2510, which functions similar to the manipulator assembly 2410 described above. First locking member 2514 operates about "HA" hinge axis of hinge 2550. Tab member 2512 of manipulator assembly 2510 is moved along axis defined by "A".

Referring to FIG. 25B, like the manipulator assembly 2410 (of FIG. 24), manipulator assembly 2510 comprises tab member 2512 and first locking member 2514, and the tab member includes second locking member 2515 that is configured to lockingly connect the first locking member to the tab member. The first locking member 2514 is movable with respect to the tab member 2512 between a locked position (FIGS. 25A and 25B) and an unlocked position (FIGS. 25C and 25D). Referring to FIG. 25C, as above manipulator assembly 2510 is configured to engage housing 2501 when first locking member 2514 is in the locked position such that the manipulator and the conjointly connected connection member 2505 are constrained from rotation about an axis of rotation A with respect to the housing. Referring to FIG. 25D, in the unlocked position, manipulator assembly 2510 is released from housing 2501 such that the manipulator assembly and connection member 2505 can rotate with respect to the housing about the axis A through an angular range of motion that includes a first polarity orientation and a second polarity orientation of the connection member (not shown).

Unlike the manipulator assembly 2410, hinge 2550 (FIG. 25B) pivotably connects first locking member 2514 of the manipulator assembly 2510 to the tab member 2512 such that the first locking member pivots relative to the tab member about a hinge axis HA between the locked and unlocked positions. As shown in FIG. 25B, the illustrated hinge 2550 comprises one or more collar portions 2552 of first locking member 2514 that are rotatably coupled to pin portion 2554 of the tab member. In the illustrated embodiment, hinge 2550 comprises collar portion 2452 and pin portion 2554 on each side of the manipulator assembly 2510. In other embodiments the hinge can have other configurations. For example, it is expressly contemplated that the hinge can comprise a living hinge in certain embodiments. In the illustrated embodiment, the hinge axis HA is oriented generally perpendicular to the axis of rotation A of the connection member 2505 (see FIG. 25A). The tab member 2512 can include one or more locking tabs 2532 (broadly, locking elements; FIG. 25B) for lockingly engaging the first locking member 2514 to fasten the first locking member in the locked position. The hinge 2550 suitably maintains the connection between the first locking member 2514 and the tab member 2512 in the unlocked position.

Referring to FIGS. 26A-26D, another embodiment of an optical fiber connector assembly is generally indicated at reference number 2600. Like the optical fiber connector assemblies discussed above, the illustrated optical fiber connector assembly 2600 comprises a housing 2601 that is configured to support one or more optical fiber ferrules and be inserted into a receiver to establish an optical connection. The connector assembly 2600 also comprises a connection member 2605 configured to lockingly engage a locking element of a receiver to lock the optical fiber connector into the receiver. The connector assembly 2600 further comprises a manipulator assembly 2610, which functions similar to the manipulator assemblies 2410, 2510 described above.

Figure 26A:
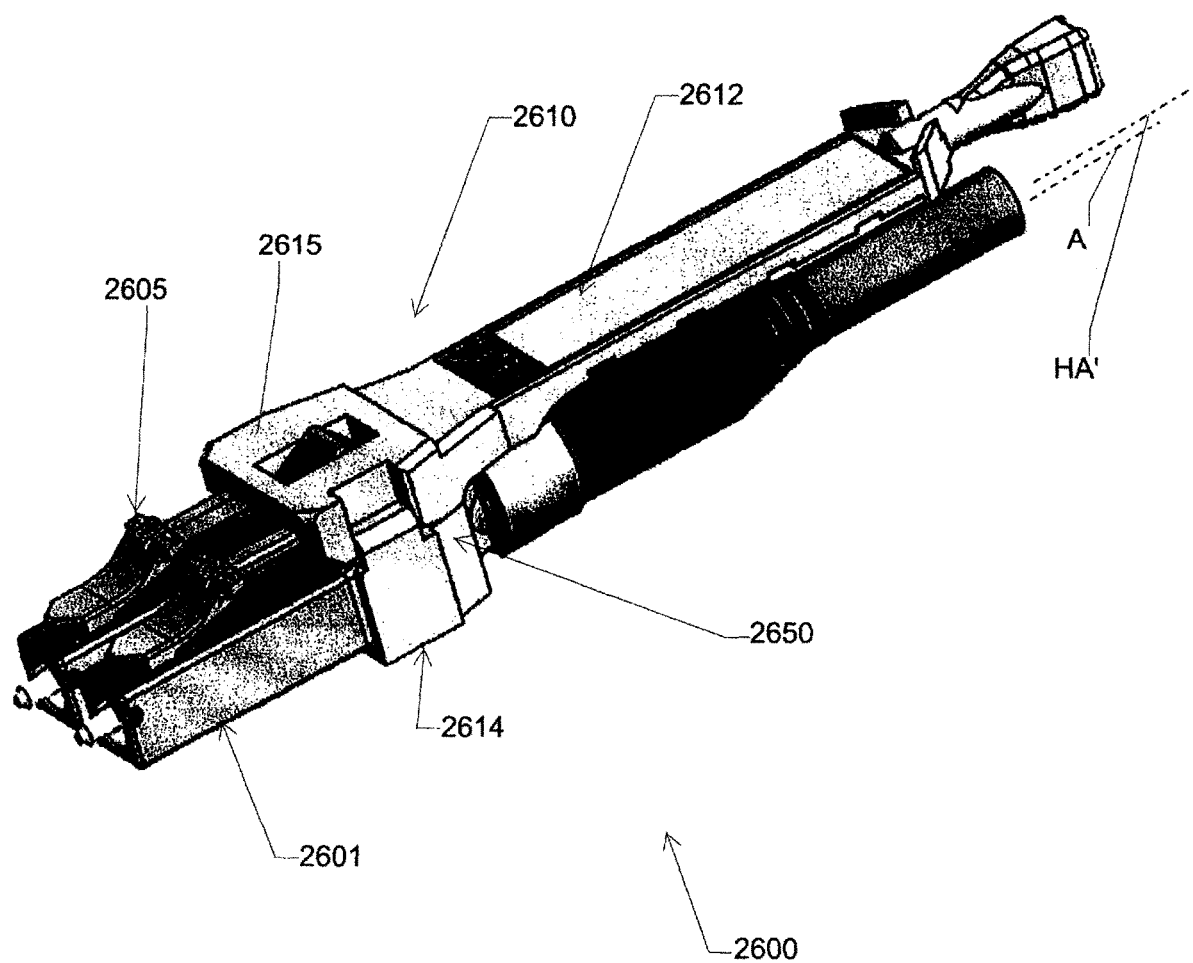
FIG. 26A is a perspective of another embodiment of an optical fiber connector illustrating a manipulator assembly in a locked configuration.
Figure 26B:
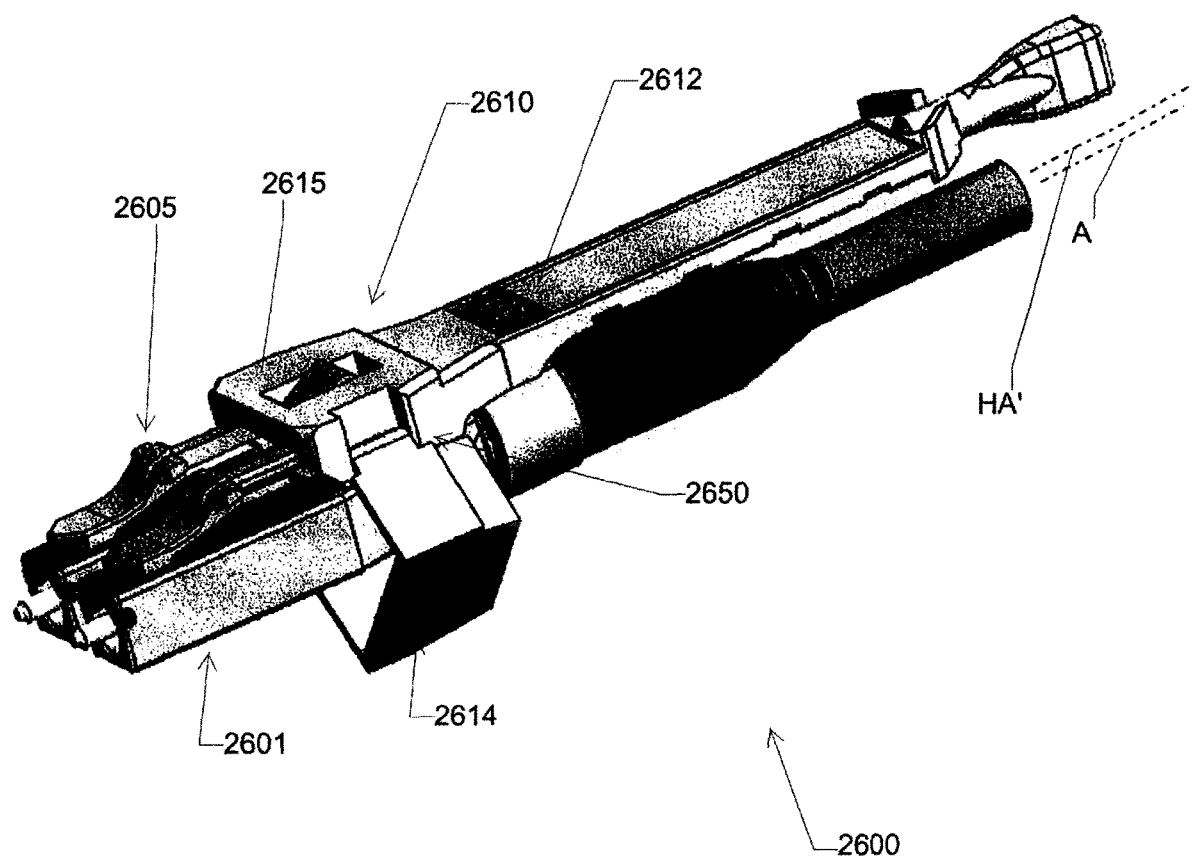
FIG. 26B is a perspective of the optical fiber connector of FIG. 26A illustrating a manipulator assembly thereof in an unlocked configuration.
Figure 26C:
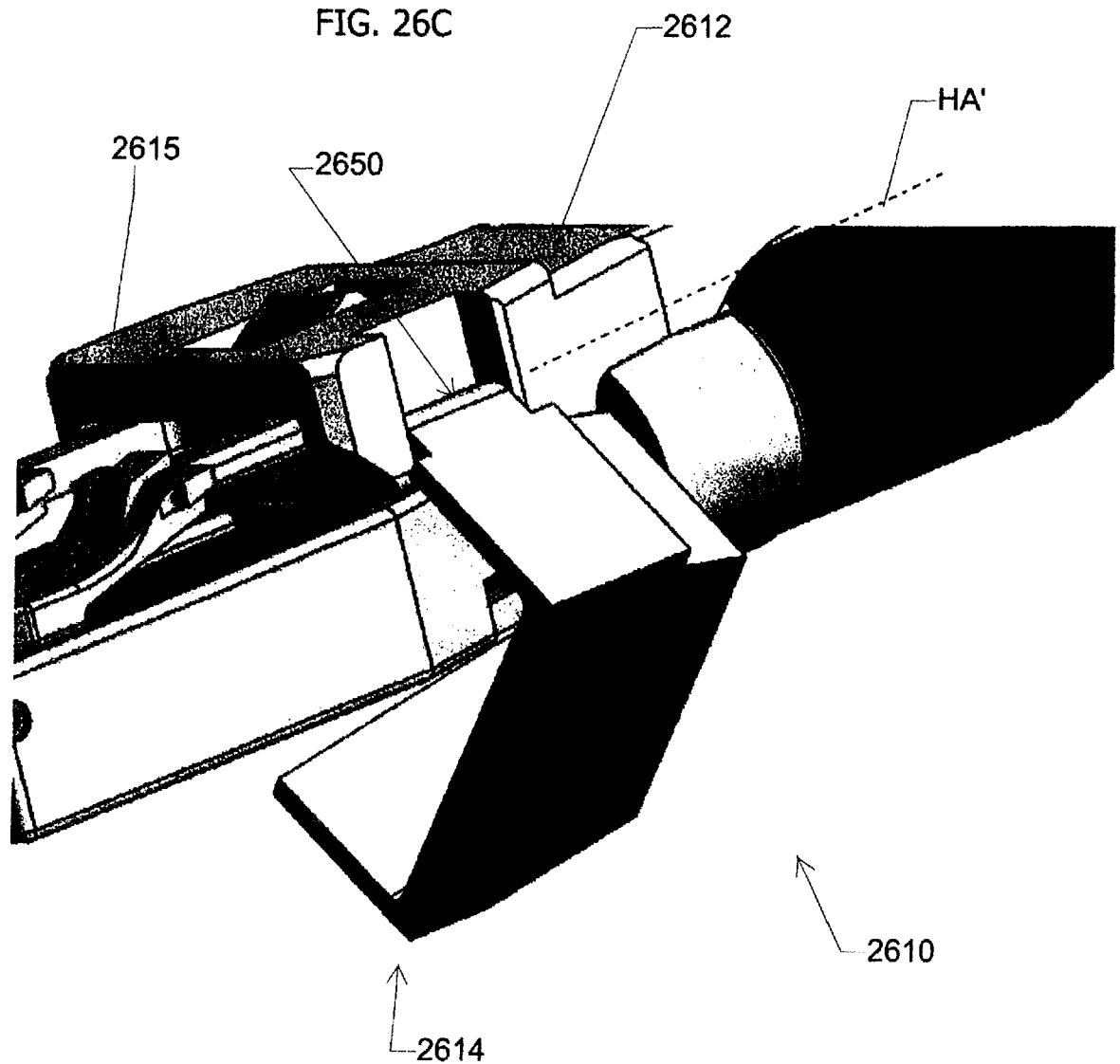
FIG. 26C is an enlarged fragmentary perspective of a portion of the optical fiber connector of FIG. 26A illustrating a side of the manipulator assembly in the unlocked configuration of FIG. 26B.
Figure 26D:
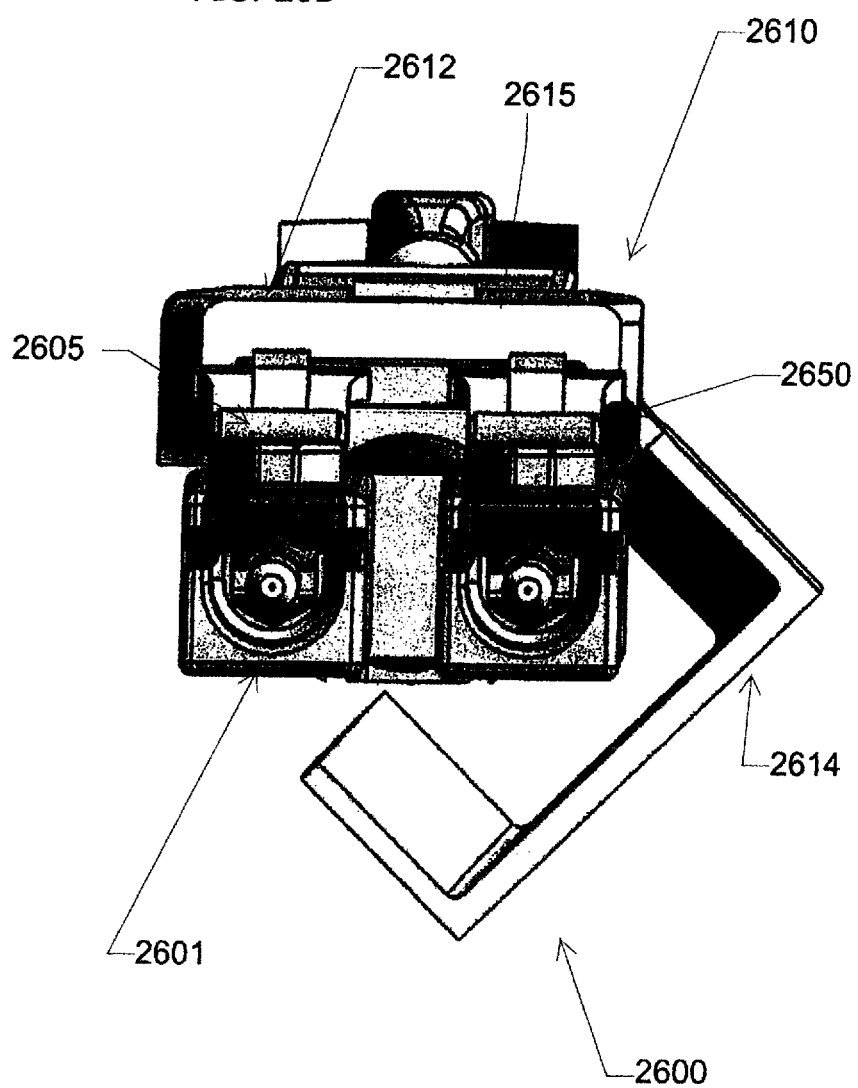
FIG. 26D is a front end elevation of the optical fiber connector of FIG. 26A in the configuration of FIG. 26B.

Referring to FIG. 26A, like the manipulator assemblies 2410, 2510, the manipulator assembly 2610 comprises tab member 2612 and first locking member 2614, and the tab member includes second locking member 2615 that is configured to lockingly connect the first locking member to the tab member. The first locking member 2614 is movable with respect to tab member 2612 between a locked position (FIG. 26A) and an unlocked position (FIGS. 26B-26D). As above, the manipulator assembly 2610 is configured to engage the housing 2601 when the first locking member 2614 is in the locked position such that the manipulator assembly and the conjointly connected connection member 2650 are constrained from relative rotation about an axis of rotation A. Referring to FIGS. 26B-26D, in the unlocked position, the manipulator assembly 2610 is released from the housing 2601 such that the manipulator assembly and the connection member 2605 can rotate with respect to the housing about the axis of rotation A through an angular range of motion that includes a first polarity orientation and a second polarity orientation of the connection member (not shown).

Referring to FIG. 26C, hinge 2650 pivotably connects first locking member 2614 of the manipulator assembly 2610 to the tab member 2612 such that the first locking member pivots relative to the tab member about a hinge axis HA' between the locked and unlocked positions. Unlike the hinge 2550, the hinge 2650 is configured so that the hinge axis HA' is oriented generally parallel to the axis of rotation A (e.g., the hinge axis HA' extends generally lengthwise of the connector assembly 2600, in a front-to-rear direction of the connector assembly, etc.). In the illustrated embodiment, the hinge 2650 is formed along a hinge side of the manipulator assembly. In one or more embodiments, the side wall one of the tab member 2612 and the first locking member 2614 comprises a pin (not shown) that is pivotably received in a collar portion (not shown) of the side wall of the other of the tab member and the first locking member to form the hinge 2650. In certain embodiments, the hinge 2650 comprises a living hinge formed between the tab member and the first locking member along the hinge side of the manipulator assembly 2510. Suitably, the side walls of the tab member 2612 and the first locking member 2614 at the side of the manipulator assembly 2410 opposite the hinge 2650 comprise locking elements (e.g., a tab and a recess; not shown) that are configured to lock the first locking member in the locked position with respect to the tab member. Referring to FIG. 26D, in one or more embodiments, the locking formations are releasable to allow the first locking member 2614 to move to the unlocked position about hinge 2650. Referring to FIG. 26B, hinge 2650 suitably maintains the connection between the first locking member 2614 and the tab member 2612 in the unlocked position. First locking member 2614 is hinged along hinge axis HA' and moves between a closed and open position of first locking member 2614 during polarity change.

Figure 27B:
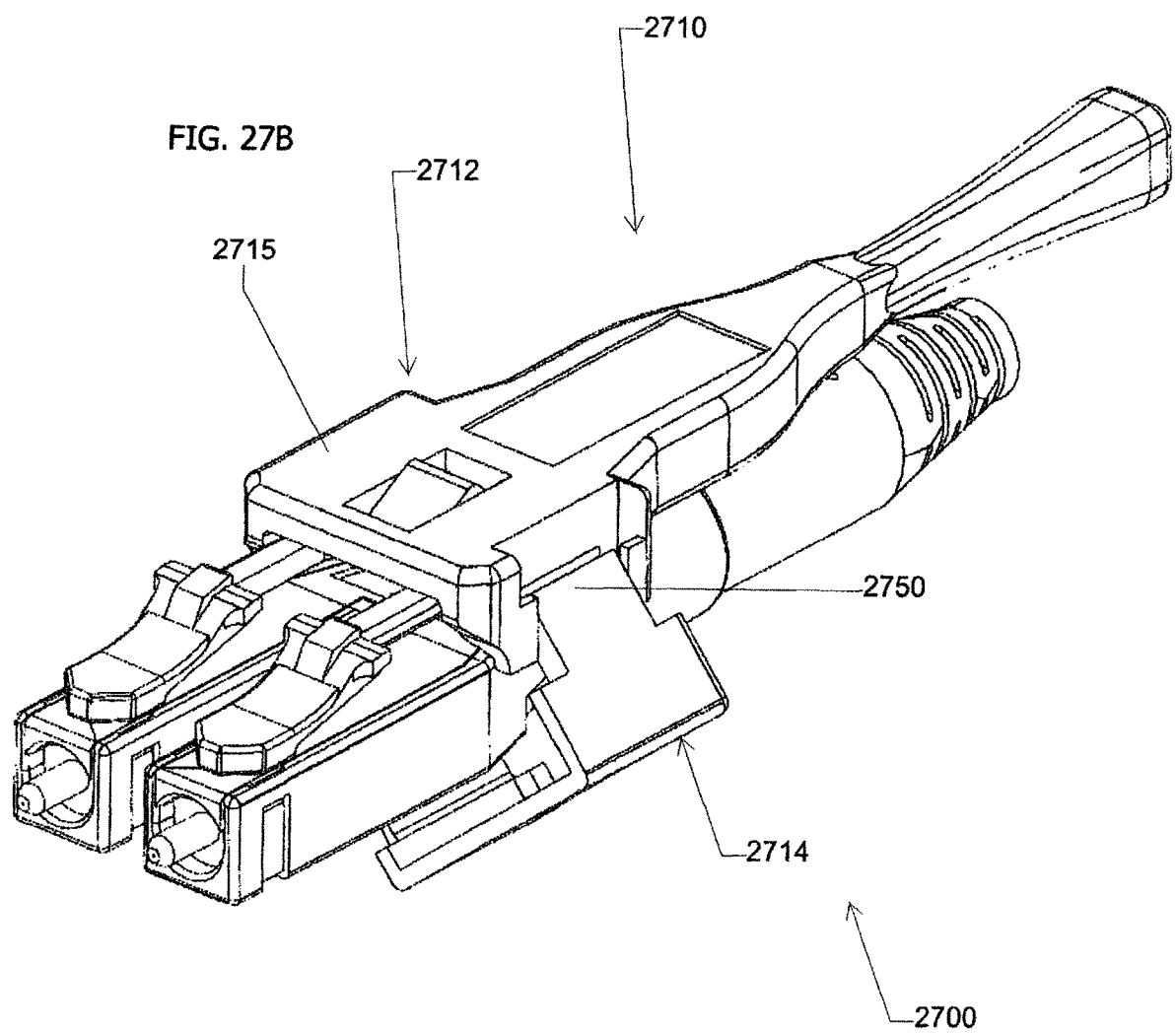
FIG. 27B is a perspective similar to FIG. 27A illustrating the manipulator assembly in an unlocked configuration.
Figure 27C:
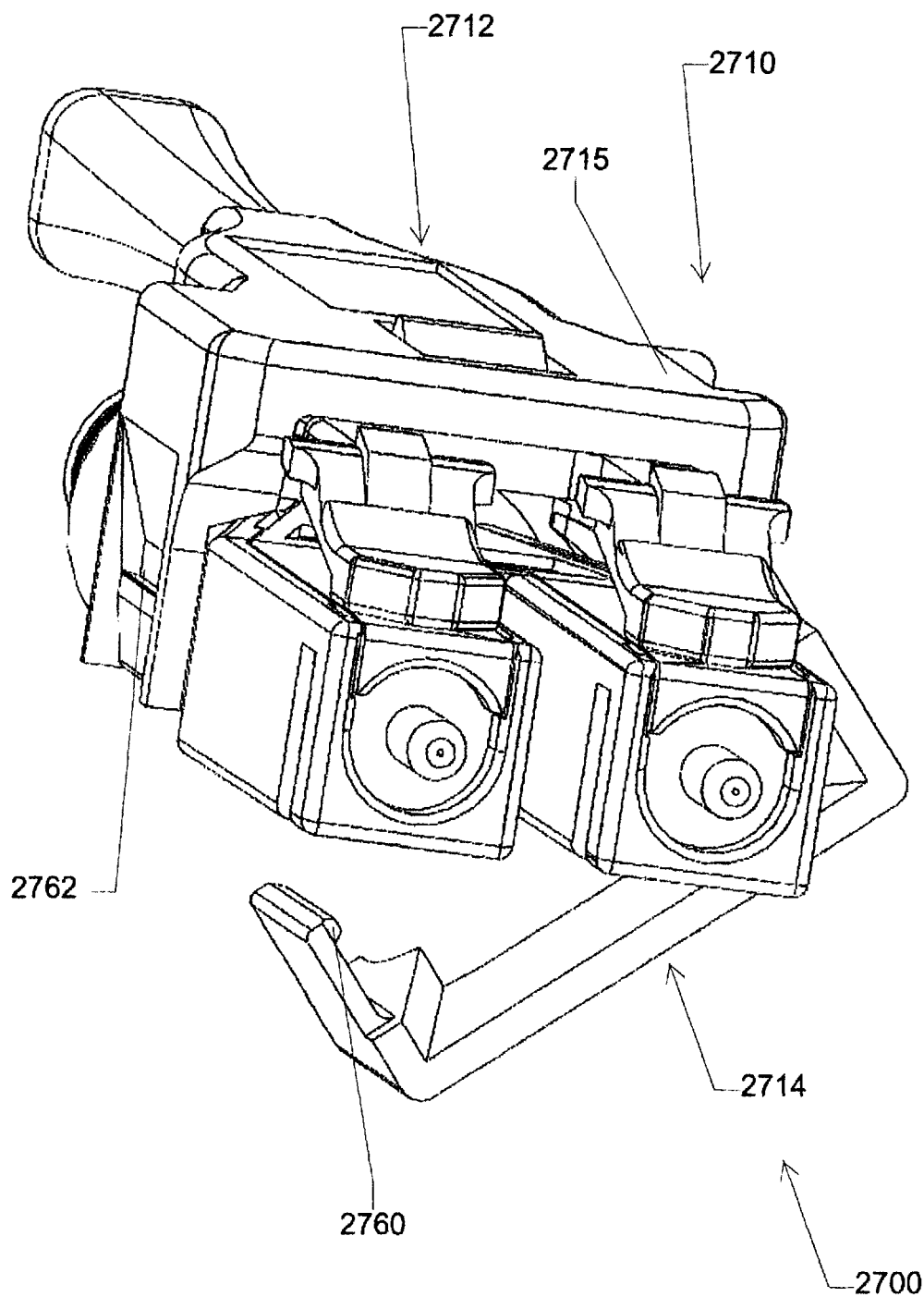
FIG. 27C is another perspective of the optical fiber connector of FIG. 27A with the manipulator assembly in the unlocked configuration.
Figure 27D:
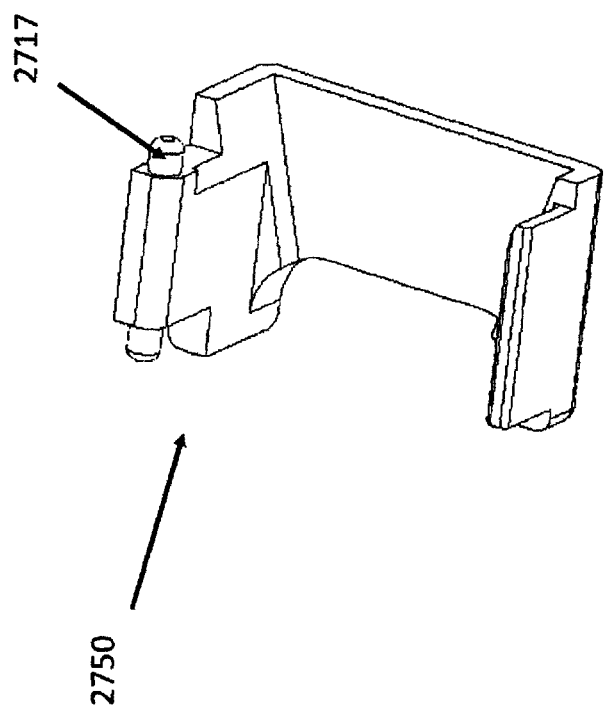
FIG. 27D is a perspective view of a hinge.

Referring to FIGS. 27A-27C, another embodiment of an optical fiber connector assembly is generally indicated at reference number 2700. The optical fiber connector 2700 is substantially similar to the optical fiber connector 2600 except that the tab member 2712 has a different configuration (e.g. is shorter and narrower), which may provide better finger access to a cable (not shown) extending from the rear of the connector. As depicted in FIG. 27A, like the optical fiber connector 2600, in connector 2700, the first locking member 2714 is pivotably connected to the second locking member 2715 of the tab member 2712 by a hinge 2750 (refer to FIG. 27B) on one side of the manipulator assembly 2710. As shown in FIG. 27C, the first locking member 2714 comprises hook 2760 that is configured to be lockingly received in recess 2762 formed in the second locking member 2715 on the unhinged side of the manipulator assembly to hold the first locking member in the locked position (FIG. 27A). Referring to FIG. 27C, to unlock the manipulator assembly 2710, hook 2760 can be released from recess 2762 by resiliently bending the unhinged side of the first locking member 2714. FIG. 27D depicts side hinge 2750 with a second pin 2717 that is molded into hinge 2750 to connect hinge 2750 to locking member 2715. The hinge 2750 of FIG. 27D is shown in the open position in FIG. 27B. In FIG. 27B the side hinge 2750, as shown in FIG. 27E, is pressed fitted in recess 2718 of locking member 2715. FIG. 27B depicts first locking member 2714 open or separated from second locking member 2715. This allows for polarity change. FIG. 27E depicts manipulator assembly prior to accepting side hinge 2750, of FIG. 27E.1. FIG. 27E.1 side hinge 2750 pins 2717 are accepted in recesses 2718 of FIG. 27E along dashed lines.

Figure 28A:
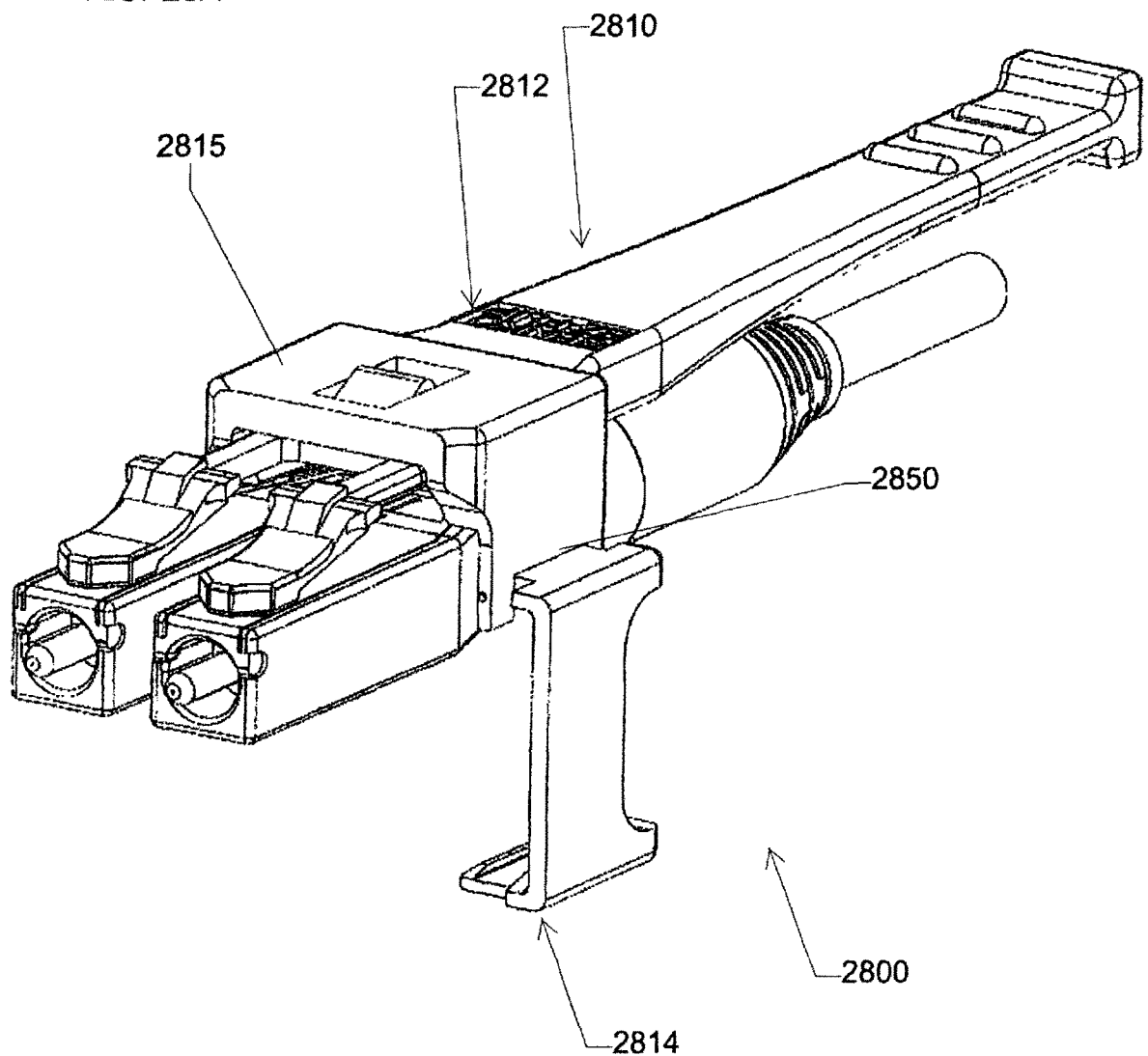
FIG. 28A is a perspective of another embodiment of an optical fiber connector illustrating a manipulator assembly thereof in an unlocked configuration.
Figure 28B:
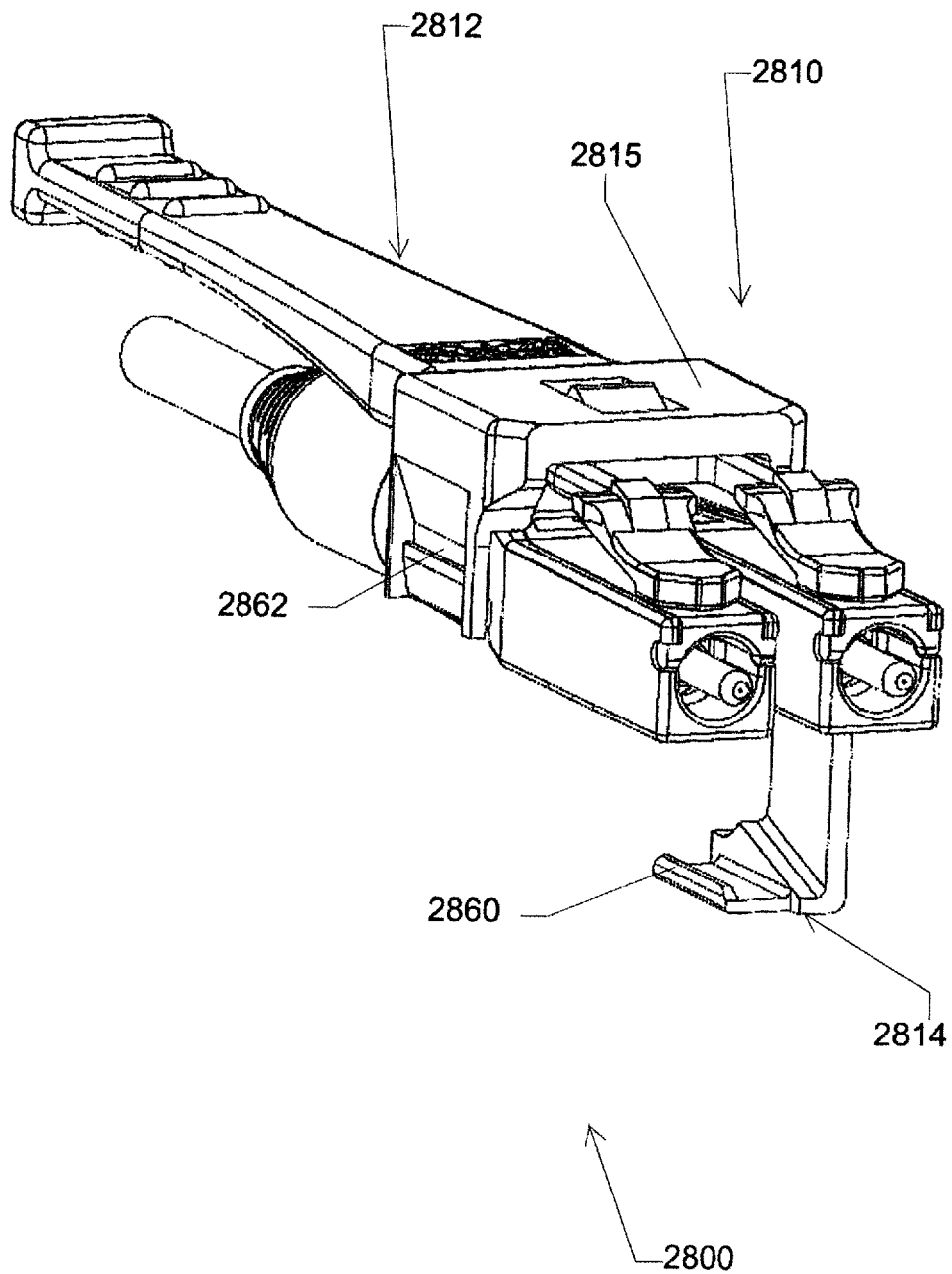
FIG. 28B is another perspective of the optical fiber connector of FIG. 28A.
Figure 28C:
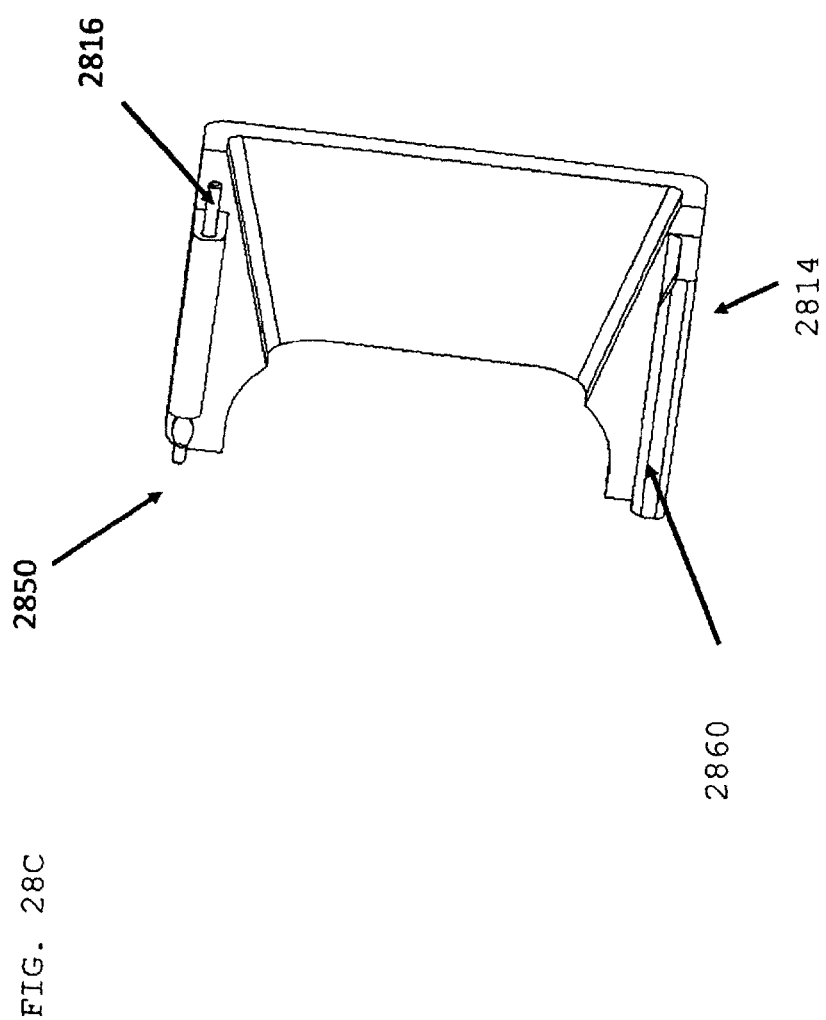
FIG. 28C is a perspective view of a hinge according to the present invention and FIG. 29 is a photograph of an optical fiber connector comprising a cable and a push-pull tab, wherein the cable is being manipulated by a user.

Referring to FIGS. 28A-28B, another embodiment of an optical fiber connector assembly is generally indicated at reference number 2800. Referring to FIG. 28A, optical fiber connector 2800 is substantially similar to the optical fiber connectors 2600, 2700 except that the side hinge 2850 connecting the first locking member 2814 to the second locking member 2815 of the tab member 2812 is located at the bottom edge margin of the hinged side of the second locking member. Referring to FIG. 28B, like the connector 2700, in connector 2800, first locking member 2814 comprises hook 2860 that is configured to be lockingly received in recess 2862 formed in second locking member 2815 on the unhinged side of the manipulator assembly 2810 to hold the first locking member in the locked position. FIG. 28C depicts pin 2816 through side hinge 2850 to connect it to second locking member 2815. The side hinge 2850 is shown in an unlocked position in FIG. 28A.

Figure 29:
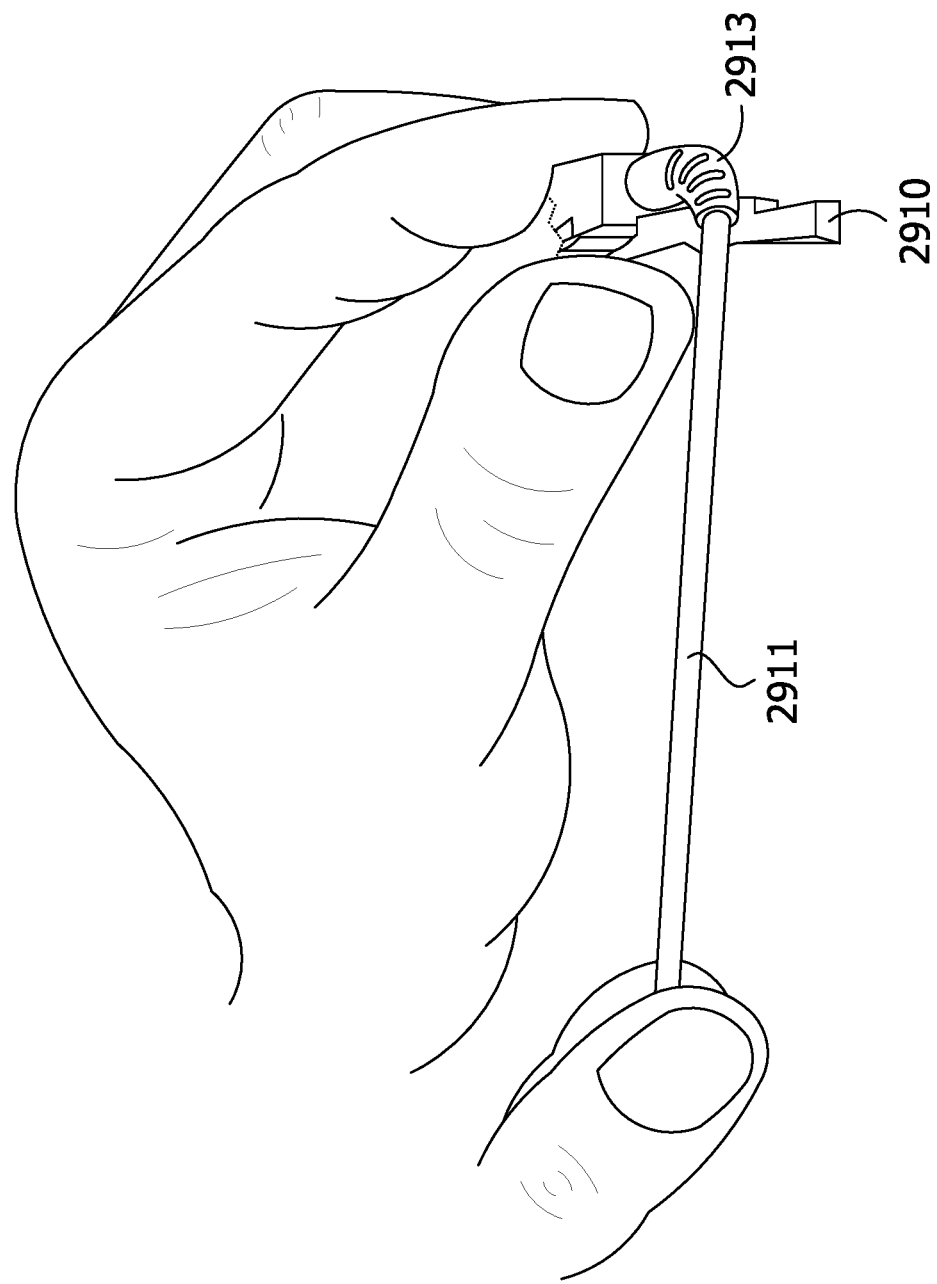

Referring to FIG. 29, in any of the connector assemblies discussed above, the connector can comprise push-pull tab 2910 having a narrow width. The narrow width push-pull tab 2910 allows cable 2911 extending from cable boot 2913 to be manipulated on the side of the push-pull tab as shown. In addition, the push-pull tab 2910 can be laterally offset from the cable boot 2913, be laterally flexible, and/or have one or more recesses to provide access to the cable 2911 on the side of the push-pull tab.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An optical fiber connector for making an optical connection in a receiver, the optical fiber connector comprising:
a housing having a front end portion and a rear end portion, the housing being configured to receive a ferrule therein such that the ferrule is exposed through the front end portion of the housing, the housing being configured to be received in the receiver;
a connection member that is configured to lockingly engage a locking element of the receiver when the housing is received in the receiver to lock the optical fiber connector into the receiver, the connection member being rotatably coupled to the housing for rotation with respect to the housing about an axis of rotation from a first polarity orientation to a second polarity orientation; and
a manipulator assembly comprising a tab member and a locking member movable relative to the tab member between a locked position and an unlocked position, the manipulator assembly being coupled to the connection member such that the manipulator assembly and the connection member rotate conjointly about the axis of rotation, the manipulator assembly being configured to engage the housing to prevent rotation of the manipulator assembly with respect to the housing when the locking member is in the locked position and to release the housing such that the manipulator assembly can rotate relative to the housing about the axis of rotation when the locking member is in the unlocked position;
wherein the tab member and the locking member are configured to both rotate conjointly with the connection member about the axis of rotation.

2. The optical fiber connector of claim 1, wherein the tab member has a front end portion including a second locking member that defines a window, the window is configured to receive a protrusion of the connection member therein.

3. The optical fiber connector of claim 1, wherein the connection member comprises locking tabs and the optical fiber connector has a first polarity orientation when the locking tabs of the connection member are angularly positioned at the top of the housing and has a second polarity orientation when the locking tabs are angularly positioned at the bottom of the housing.

4. The optical fiber connector of claim 2, wherein the protrusion received in the window limits axial or lengthwise movement of the manipulator assembly with respect to the connection member along the axis of rotation.

5. The optical fiber connector of claim 2, wherein to connect the tab member to the connection member, a bottom portion of the second locking member of the tab member defines a groove that is configured to receive a tongue of the connection member therein.

6. The optical fiber connector of claim 5, wherein the tongue has a T-shaped cross-sectional shape and the tab member comprises lips that are configured to be received beneath lateral end segments of the top portion of the tongue.

7. The optical fiber connector of claim 6, wherein tongue being received in the groove limits angular movement of the tab member with respect to the connection member about the axis of rotation.

8. A fiber optic connector comprising:
a housing having a front end portion and a rear end portion, the housing being configured to receive a ferrule therein such that the ferrule is exposed through the front end portion of the housing for making an optical connection in a receiver;
a connection member that is configured to lockingly engage a locking element of the receiver to lock the optical fiber connector into the receiver, the connection member being rotatably coupled to the housing for rotation with respect to the housing about an axis of rotation from a first polarity orientation to a second polarity orientation; and the connection member is movable with respect to a tab member between a locked position and an unlocked position;
the connection member further comprises a second locking member having side walls that extend downward from the top wall of the second locking member, the side walls are configured to lockingly engage a first locking member in the locked position; and wherein the side walls are configured to guide movement of the first locking member with respect to the tab member between the locked position and the unlocked position.

9. The fiber optic connector of claim 8, wherein the side walls are further configured to connect the tab member to the first locking member when the first locking member is in the unlocked position.

10. The fiber optic connector of claim 9, wherein the side walls define vertical grooves forming races that guide movement of the first locking member between the locked and unlocked positions.

11. The fiber optic connector of claim 10, wherein the side walls define upper and lower locking tabs, and further wherein each of the locking tabs has a bottom surface that is slanted with respect to the respective side wall and a top surface that is substantially perpendicular to the respective side wall.

12. An optical fiber connector comprising:
a housing having a front end portion and a rear end portion, the housing being configured to receive a ferrule therein such that the ferrule is exposed through the front end portion of the housing for making an optical connection in a receiver;
a connection member that is configured to lockingly engage a locking element of the receiver to lock the optical fiber connector into the receiver, the connection member being rotatably coupled to the housing for rotation with respect to the housing about an axis of rotation from a first polarity orientation to a second polarity orientation; and a manipulator assembly comprising a tab member having a second locking member and a first locking member movable relative to the tab member, and the second locking member is configured to lockingly connect the first locking element to the tab member between a locked position and an unlocked position, the manipulator assembly being coupled to the connection member such that the manipulator assembly and the connection member rotate conjointly about the axis of rotation; and wherein the manipulator assembly further comprises a hinge that pivotably connects first locking member of the manipulator assembly to the tab member such that the first locking member pivots relative to the tab member about a hinge axis HA between the locked and unlocked positions.

13. The fiber optic connector of claim 12, wherein the hinge comprises the one or more collar portions of the first locking member and are rotatably coupled to a pin portion of the tab member.

14. The fiber optic connector of claim 13, wherein the hinge axis HA is oriented generally perpendicular to an axis of rotation of the connection member.

15. The fiber optic connector of claim 12, wherein the tab member includes one or more locking elements for lockingly engaging the first locking member to fasten the first locking member in the locked position, and further wherein hinge suitably maintains the connection between the first locking member and the tab member in the unlocked position.

16. An optical fiber connector comprising:
a housing having a front end portion and a rear end portion, the housing being configured to receive a ferrule therein such that the ferrule is exposed through the front end portion of the housing for making an optical connection in a receiver;
a connection member that is configured to lockingly engage a locking element of the receiver to lock the optical fiber connector into the receiver, the connection member being rotatably coupled to the housing for rotation with respect to the housing about an axis of rotation from a first polarity orientation to a second polarity orientation; and a manipulator assembly comprising a tab member having a second locking member and a first locking member movable relative to the tab member, and the second locking member is configured to lockingly connect the first locking element to the tab member between a locked position and an unlocked position, the manipulator assembly being coupled to the connection member such that the manipulator assembly and the connection member rotate conjointly about the axis of rotation; and wherein the manipulator assembly further comprises a hinge that pivotably connects first locking member of the manipulator assembly to the tab member such that the first locking member pivots relative to the tab member about a hinge axis HA' between the locked and unlocked positions, the hinge along hinge axis HA' is oriented generally parallel to the an axis of rotation A along connector.

17. The fiber optic connector of claim 16, wherein the first locking member comprises a pin pivotably received in a collar portion of a side wall of the tab member and the first locking member forming the hinge.

18. The fiber optic connector of claim 17, wherein the side walls of the tab member and the first locking member at the side of the manipulator assembly opposite the hinge comprise locking elements configured to lock the first locking member in the locked position with respect to the tab member.

19. The fiber optic connector of claim 18, wherein the first locking member is moveable to the locked position, and wherein the hinge maintains a connection between the first locking member and the tab member.

20. The fiber optic connector of claim 17, wherein the pin is molded and positioned through hinge thereby connecting hinge to first locking member.

* * * * *